United States Patent
Egi et al.

(10) Patent No.: US 7,738,055 B2
(45) Date of Patent: Jun. 15, 2010

(54) DISPLAY DEVICE HAVING STACKED POLARIZERS THAT DIFFER IN DEGREES OF LIGHT ABSORBING BANDS AND THAT ARE BETWEEN A PAIR OF PROTECTIVE LAYERS SUCH THAT NO PROTECTIVE LAYER IS LOCATED BETWEEN THE STACKED POLARIZERS

(75) Inventors: Yuji Egi, Kanagawa (JP); Tetsuji Ishitani, Kanagawa (JP); Takeshi Nishi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 531 days.

(21) Appl. No.: 11/626,115

(22) Filed: Jan. 23, 2007

(65) Prior Publication Data

US 2007/0177071 A1 Aug. 2, 2007

(30) Foreign Application Priority Data

Jan. 31, 2006 (JP) .............................. 2006-023853

(51) Int. Cl.
G02F 1/1335 (2006.01)

(52) U.S. Cl. ........................................ 349/96

(58) Field of Classification Search ............ 349/96–106
See application file for complete search history.

(56) References Cited

U.S. PATENT DOCUMENTS

| | | | |
|---|---|---|---|
| 4,592,623 A | 6/1986 | Yamamoto et al. | |
| 4,769,242 A | 9/1988 | Shibanai | |
| 4,769,292 A | 9/1988 | Tang et al. | |
| 4,968,120 A | 11/1990 | Depp et al. | |
| 5,050,965 A * | 9/1991 | Conner et al. ............. 349/6 |
| 5,142,393 A | 8/1992 | Okumura et al. | |
| 5,237,438 A | 8/1993 | Miyashita et al. | |
| 5,283,132 A | 2/1994 | Ogura et al. | |
| 5,305,143 A | 4/1994 | Taga et al. | |
| 5,396,406 A | 3/1995 | Ketchpel | |
| 5,583,677 A | 12/1996 | Ito et al. | |

(Continued)

FOREIGN PATENT DOCUMENTS

EP 0 365 778 5/1990

(Continued)

OTHER PUBLICATIONS

J. Chen et al.; "21.2: Optimum Film Compensation Modes for TN and VA LCDs"; *SID 98 Digest—SID International Symposium Digest of Technical Papers*; pp. 315-318; 1998.

(Continued)

*Primary Examiner*—John Heyman
(74) *Attorney, Agent, or Firm*—Fish & Richardson P.C.

(57) ABSTRACT

To provide a display device having a high contrast ratio by a simple and easy method and to manufacture a high-performance display device at low cost, in a display device having a display element between a pair of light-transmitting substrates, layers each including a polarizer having different wavelength distribution of extinction coefficient from each other with respect to the absorption axes are stacked and provided on an outer side of the light-transmitting substrates. Further, a retardation plate may be provided between the stacked polarizers.

16 Claims, 37 Drawing Sheets

U.S. PATENT DOCUMENTS

| | | | |
|---|---|---|---|
| 5,831,375 A | 11/1998 | Benson, Jr. | |
| 5,856,819 A | 1/1999 | Vossler | |
| 6,011,580 A | 1/2000 | Hattori et al. | |
| 6,023,317 A | 2/2000 | Xu et al. | |
| 6,097,147 A | 8/2000 | Baldo et al. | |
| 6,147,734 A | 11/2000 | Kashima | |
| 6,201,592 B1 | 3/2001 | Terashita et al. | |
| 6,291,255 B1 | 9/2001 | Huang et al. | |
| 6,356,029 B1 | 3/2002 | Hunter | |
| 6,445,005 B1 | 9/2002 | Yamazaki et al. | |
| 6,577,361 B1 | 6/2003 | Sekiguchi et al. | |
| 6,583,770 B1 | 6/2003 | Antila et al. | |
| 6,621,508 B1 | 9/2003 | Shiraishi et al. | |
| 6,646,698 B2 | 11/2003 | Mori | |
| 6,656,608 B1 | 12/2003 | Kita et al. | |
| 6,657,260 B2 | 12/2003 | Yamazaki et al. | |
| 6,689,492 B1 | 2/2004 | Yamazaki et al. | |
| 6,706,339 B1 | 3/2004 | Miyatake et al. | |
| 6,762,436 B1 | 7/2004 | Huang et al. | |
| 6,765,721 B2 | 7/2004 | Kawazu et al. | |
| 6,774,877 B2 | 8/2004 | Nishitoba et al. | |
| 6,778,229 B2 | 8/2004 | Inoue et al. | |
| 6,784,457 B2 | 8/2004 | Yamazaki et al. | |
| 6,816,217 B2 | 11/2004 | Sone | |
| 6,830,828 B2 | 12/2004 | Thompson et al. | |
| 6,863,997 B2 | 3/2005 | Thompson et al. | |
| 6,869,695 B2 | 3/2005 | Thompson et al. | |
| 6,872,472 B2 | 3/2005 | Liao et al. | |
| 6,887,592 B2 | 5/2005 | Hieda et al. | |
| 6,893,743 B2 | 5/2005 | Sato et al. | |
| 6,894,312 B2 | 5/2005 | Yamazaki et al. | |
| 6,897,916 B2 | 5/2005 | Hamamoto | |
| 6,911,271 B1 | 6/2005 | Lamansky et al. | |
| 6,934,081 B2 | 8/2005 | Higashio et al. | |
| 6,939,624 B2 | 9/2005 | Lamansky et al. | |
| 6,942,931 B2 | 9/2005 | Lee et al. | |
| 6,951,694 B2 | 10/2005 | Thompson et al. | |
| 6,970,144 B1 | 11/2005 | Swift et al. | |
| 6,970,218 B2 | 11/2005 | Fukuda et al. | |
| 6,985,291 B2 | 1/2006 | Watson et al. | |
| 6,995,816 B2 | 2/2006 | Mi et al. | |
| 6,998,772 B2 | 2/2006 | Terumoto | |
| 7,015,990 B2 | 3/2006 | Yeh et al. | |
| 7,034,451 B2 | 4/2006 | Senbonmatsu | |
| 7,057,682 B2 | 6/2006 | Watson et al. | |
| 7,059,718 B2 | 6/2006 | Masterson | |
| 7,060,370 B2 | 6/2006 | Kinoshita et al. | |
| 7,060,371 B2 | 6/2006 | Akiyama et al. | |
| 7,064,740 B2 | 6/2006 | Daly | |
| 7,126,659 B2 | 10/2006 | Fukuda et al. | |
| 7,139,053 B2 | 11/2006 | Yuuki et al. | |
| 7,144,608 B2 | 12/2006 | Paukshto et al. | |
| 7,148,502 B2 | 12/2006 | Yamazaki et al. | |
| 7,161,185 B2 | 1/2007 | Yamazaki et al. | |
| 7,161,649 B2 | 1/2007 | Lee et al. | |
| 7,175,898 B2 | 2/2007 | Lühmann et al. | |
| 7,176,619 B2 | 2/2007 | Miyachi et al. | |
| 7,176,999 B2 | 2/2007 | Miyachi | |
| 7,211,823 B2 | 5/2007 | Tung et al | |
| 7,218,365 B2 | 5/2007 | Chang et al. | |
| 7,265,383 B2 | 9/2007 | Yamazaki et al. | |
| 7,301,591 B2 | 11/2007 | Akiyama | |
| 7,307,679 B2 | 12/2007 | Toyooka et al. | |
| 7,315,338 B2 | 1/2008 | Yeh et al. | |
| 7,317,279 B2 | 1/2008 | Chen | |
| 7,324,180 B2 | 1/2008 | Kashima | |
| 7,327,335 B2 | 2/2008 | Yamazaki et al. | |
| 7,333,077 B2 | 2/2008 | Koyama et al. | |
| 7,339,316 B2 | 3/2008 | Adachi et al. | |
| 7,375,464 B2 | 5/2008 | Chin et al. | |
| 7,381,479 B2 | 6/2008 | Lamansky et al. | |
| 7,453,640 B2 | 11/2008 | Yeh et al. | |
| 7,468,769 B2 | 12/2008 | Nakagawa | |
| 2001/0048405 A1 | 12/2001 | Salley | |
| 2002/0025419 A1 | 2/2002 | Lee et al. | |
| 2002/0027416 A1 | 3/2002 | Kim et al. | |
| 2002/0093284 A1 | 7/2002 | Adachi et al. | |
| 2002/0113546 A1 | 8/2002 | Seo et al. | |
| 2002/0140343 A1 | 10/2002 | Hirabayashi | |
| 2002/0159003 A1 | 10/2002 | Sato et al. | |
| 2002/0186469 A1 | 12/2002 | Kawazu et al. | |
| 2003/0017361 A1 | 1/2003 | Thompson et al. | |
| 2003/0053011 A1 | 3/2003 | Mori | |
| 2003/0054199 A1 | 3/2003 | Oh | |
| 2003/0057419 A1 | 3/2003 | Murakami et al. | |
| 2003/0063456 A1 | 4/2003 | Katahira | |
| 2003/0103022 A1 | 6/2003 | Noguchi et al. | |
| 2003/0129452 A1 | 7/2003 | Tsuji et al. | |
| 2003/0147030 A1 | 8/2003 | Sone | |
| 2003/0210360 A1 | 11/2003 | Yoshida | |
| 2004/0105049 A1 | 6/2004 | Yeh et al. | |
| 2004/0141122 A1 | 7/2004 | Nakagawa | |
| 2004/0144974 A1 | 7/2004 | Lee et al. | |
| 2004/0146663 A1 | 7/2004 | Paukshto et al. | |
| 2004/0151829 A1 | 8/2004 | Boroson et al. | |
| 2004/0169461 A1 | 9/2004 | Moriyama et al. | |
| 2004/0169624 A1 | 9/2004 | Yamazaki et al. | |
| 2004/0174478 A1 | 9/2004 | Fukuda et al. | |
| 2004/0183082 A1 | 9/2004 | Yamazaki | |
| 2004/0201341 A1 | 10/2004 | Miyachi et al. | |
| 2004/0202893 A1 | 10/2004 | Abe | |
| 2004/0227698 A1 | 11/2004 | Yamazaki et al. | |
| 2004/0233362 A1 | 11/2004 | Kashima | |
| 2004/0239658 A1 | 12/2004 | Koyama et al. | |
| 2004/0245529 A1 | 12/2004 | Yamazaki et al. | |
| 2004/0251823 A1 | 12/2004 | Park et al. | |
| 2004/0257497 A1 | 12/2004 | Paukshto et al. | |
| 2004/0262576 A1 | 12/2004 | Thompson et al. | |
| 2004/0263056 A1 | 12/2004 | Seo et al. | |
| 2004/0263066 A1 | 12/2004 | Abe et al. | |
| 2004/0263069 A1 | 12/2004 | Yamazaki et al. | |
| 2005/0012686 A1 | 1/2005 | Osame et al. | |
| 2005/0024339 A1 | 2/2005 | Yamazaki et al. | |
| 2005/0073627 A1 | 4/2005 | Akiyama | |
| 2005/0077817 A1 | 4/2005 | Yamazaki et al. | |
| 2005/0093438 A1 | 5/2005 | Chen | |
| 2005/0100660 A1 | 5/2005 | Ito et al. | |
| 2005/0123791 A1 | 6/2005 | Deaton et al. | |
| 2005/0127820 A1 | 6/2005 | Yamazaki et al. | |
| 2005/0140895 A1 | 6/2005 | Watson et al. | |
| 2005/0157225 A1 | 7/2005 | Toyooka et al. | |
| 2005/0157255 A1 | 7/2005 | Masterson | |
| 2005/0162092 A1 | 7/2005 | Yamazaki et al. | |
| 2005/0179835 A1 | 8/2005 | Lee et al. | |
| 2005/0202278 A1 | 9/2005 | Mishima et al. | |
| 2005/0253789 A1 | 11/2005 | Ikeda | |
| 2006/0007376 A1 | 1/2006 | Fukuda et al. | |
| 2006/0024526 A1 | 2/2006 | Thompson et al. | |
| 2006/0055847 A1 | 3/2006 | Yamazaki et al. | |
| 2006/0114375 A1 | 6/2006 | Yeh et al. | |
| 2006/0114376 A1 | 6/2006 | Yeh et al. | |
| 2006/0114384 A1 | 6/2006 | Yeh et al. | |
| 2006/0158096 A1 | 7/2006 | Adachi et al. | |
| 2006/0164571 A1 | 7/2006 | Broer et al. | |
| 2006/0215096 A1 | 9/2006 | Iwamoto et al. | |
| 2007/0014009 A1 | 1/2007 | Cross et al. | |
| 2007/0054066 A1 | 3/2007 | Usukura et al. | |
| 2007/0120475 A1 | 5/2007 | Ishitani et al. | |
| 2007/0121033 A1 | 5/2007 | Ishitani et al. | |
| 2007/0126962 A1 | 6/2007 | Egi et al. | |
| 2007/0146579 A1 | 6/2007 | Egi et al. | |
| 2007/0146580 A1 | 6/2007 | Ishitani et al. | |
| 2007/0159044 A1 | 7/2007 | Ishitani et al. | |
| 2007/0177084 A1 | 8/2007 | Ishitani et al. | |

| | | | | | |
|---|---|---|---|---|---|
| 2007/0177086 A1 | 8/2007 | Ishitani et al. | JP | 2000-249832 | 9/2000 |
| 2007/0182885 A1 | 8/2007 | Egi et al. | JP | 3174367 | 6/2001 |
| 2007/0200977 A1 | 8/2007 | Egi et al. | JP | 2001-242320 | 9/2001 |
| 2007/0200978 A1 | 8/2007 | Ishitani et al. | JP | 2002-277867 | 9/2002 |
| 2007/0285777 A1* | 12/2007 | Toyoshima et al. ......... 359/485 | JP | 2003-172819 | 6/2003 |
| 2009/0179549 A1 | 7/2009 | Abe et al. | JP | 2003-172819 A | 6/2003 |
| | | | JP | 2003-279963 | 10/2003 |

FOREIGN PATENT DOCUMENTS

| | | |
|---|---|---|
| JP | 2004-139052 A | 5/2004 |
| JP | 2004-354818 | 12/2004 |
| EP | 1 152 282 | 11/2001 |
| WO | WO 00/34821 | 6/2000 |
| JP | 62-206524 | 9/1987 |
| WO | 2004/036272 A1 | 4/2004 |
| JP | 64-082014 | 3/1989 |
| WO | WO-2005/050269 | 6/2005 |
| JP | 03-257429 | 11/1991 |
| JP | 05-034731 | 2/1993 |
| JP | 05-100114 | 4/1993 |
| JP | 06-222357 | 8/1994 |
| JP | 06-265728 | 9/1994 |
| JP | 07-142170 | 6/1995 |
| JP | 07-181476 | 7/1995 |
| JP | 2761453 | 6/1998 |
| JP | 10-255976 | 9/1998 |
| JP | 10-255976 A | 9/1998 |
| JP | 2000-180843 | 6/2000 |

OTHER PUBLICATIONS

European Search Report (European Application No. 07001333.9), 6 pages, mailed Apr. 25, 2008.

P. Lazarev et al,: "Thin Crystal Films (TCF) for LCD Contrast Enhancement" SID Digest '03 : SID International Symposium Digest of Technical Papers, pp. 669-671 (2003).

Office Action (Application No. 200710006165.X;CN9372) Dated Jul. 3, 2009.

* cited by examiner

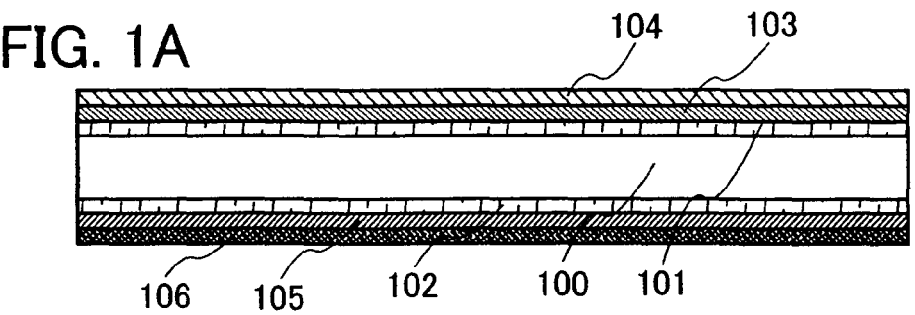
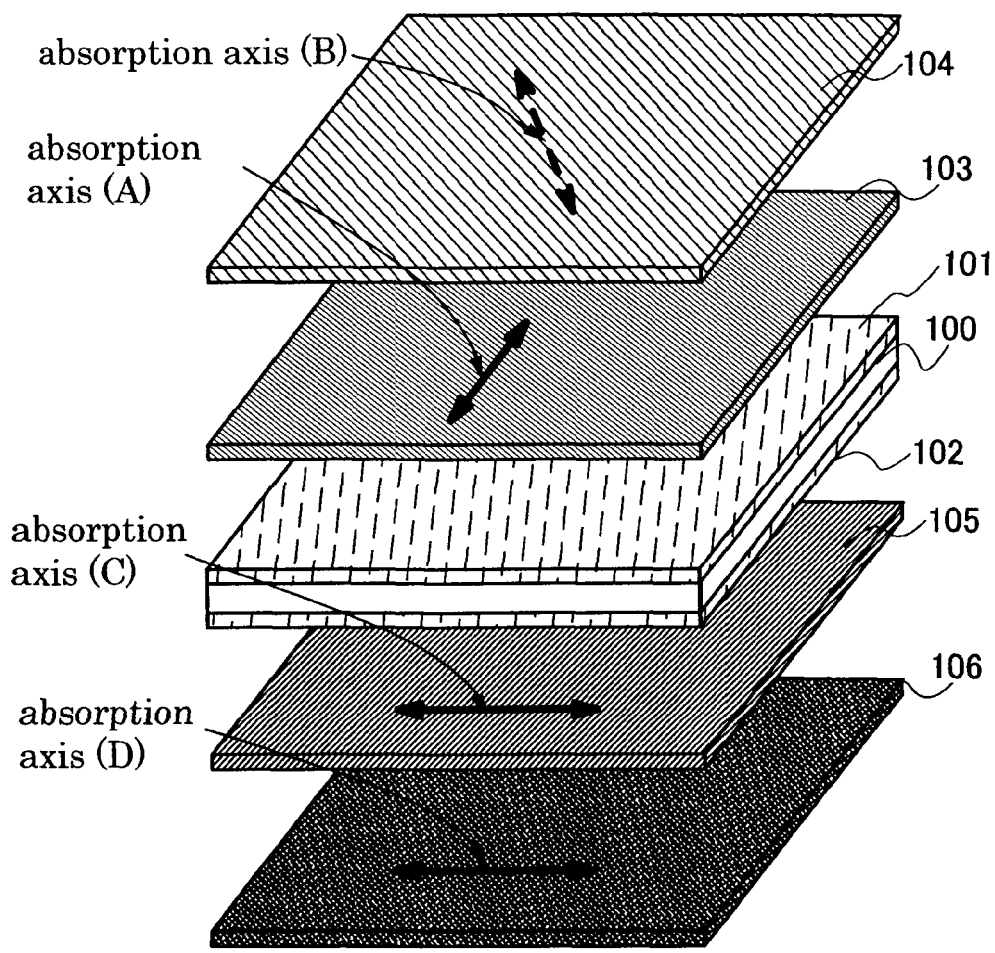

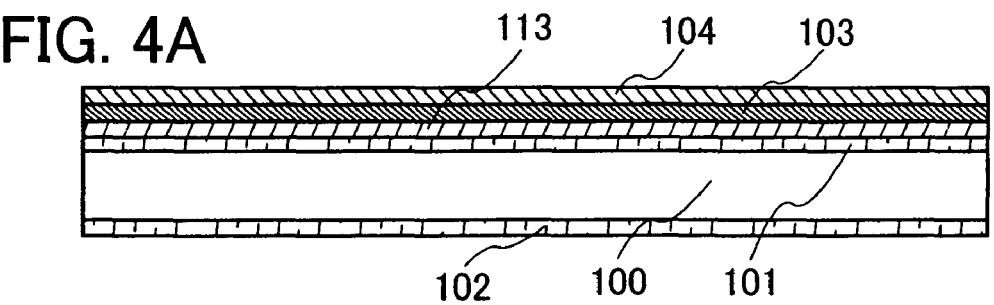
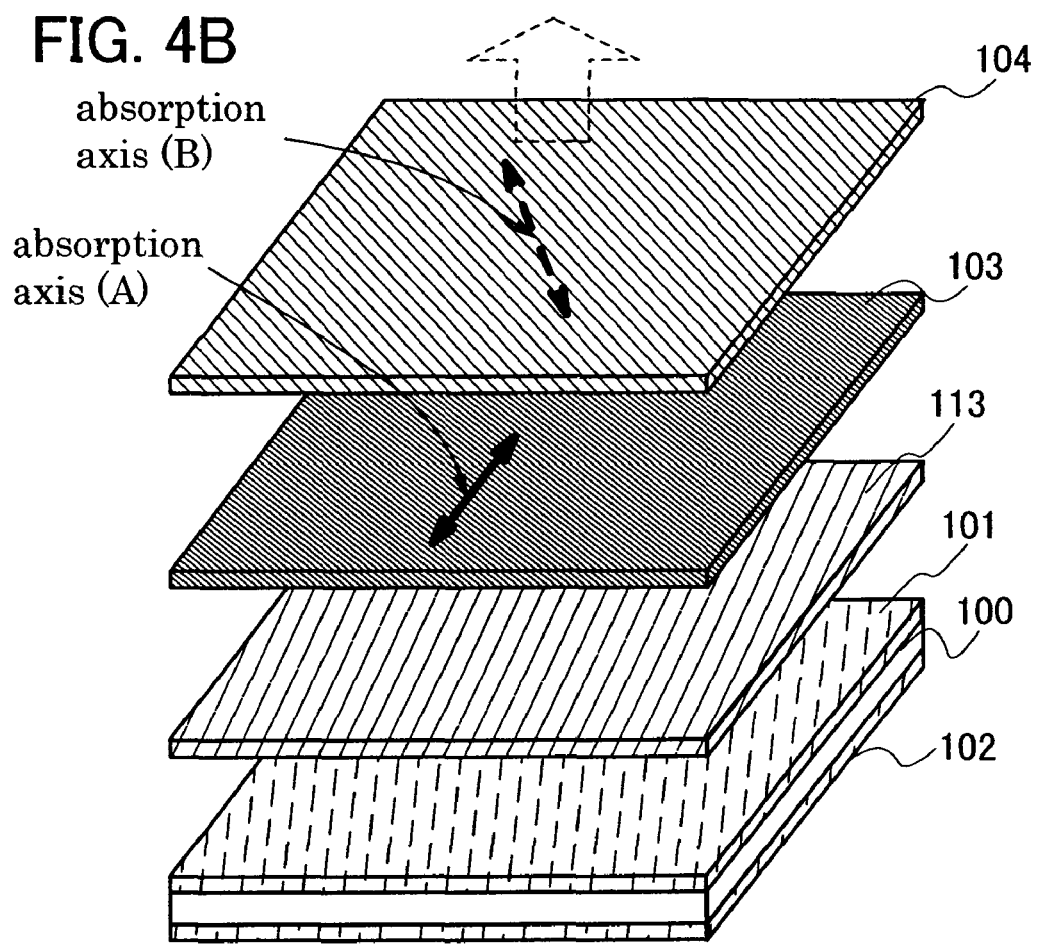

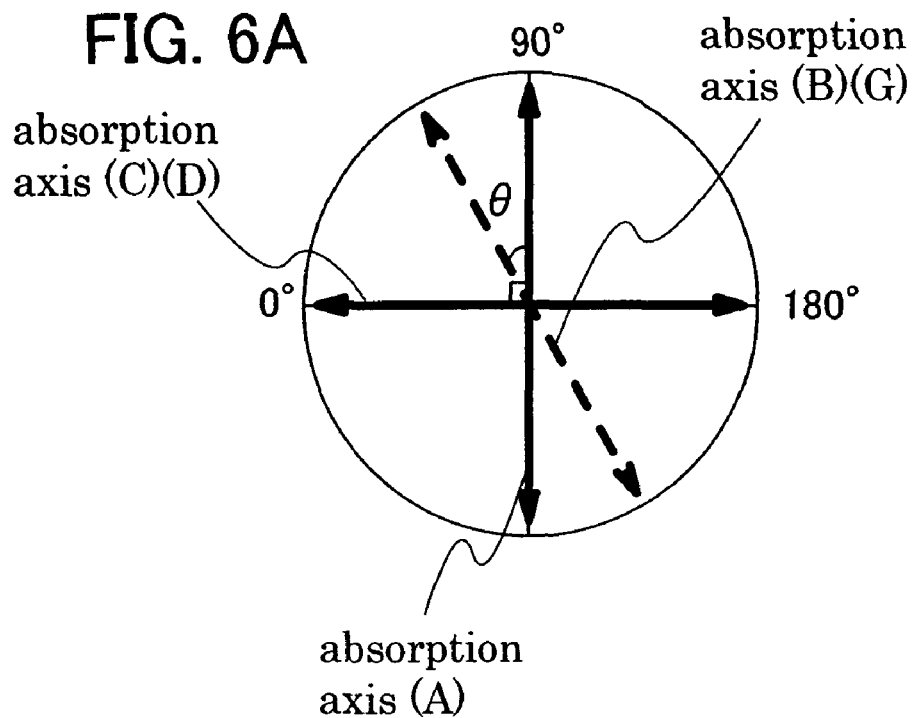
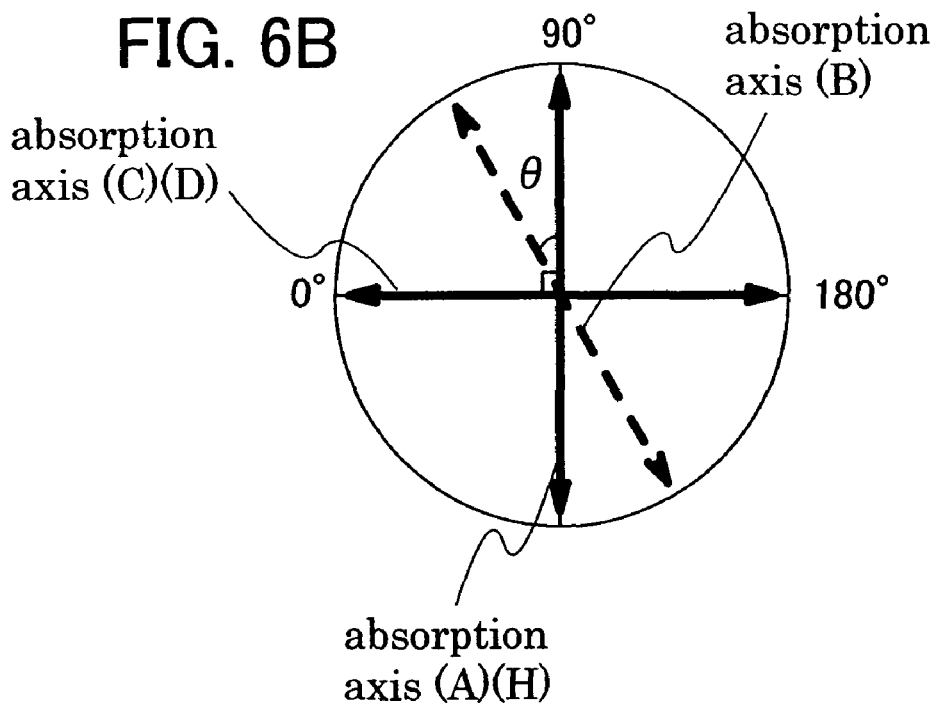

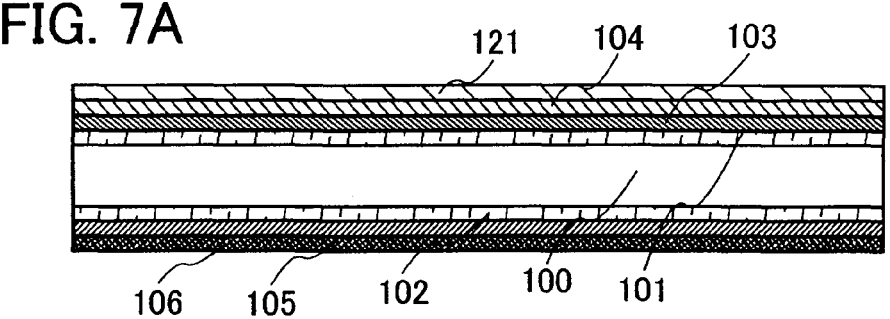
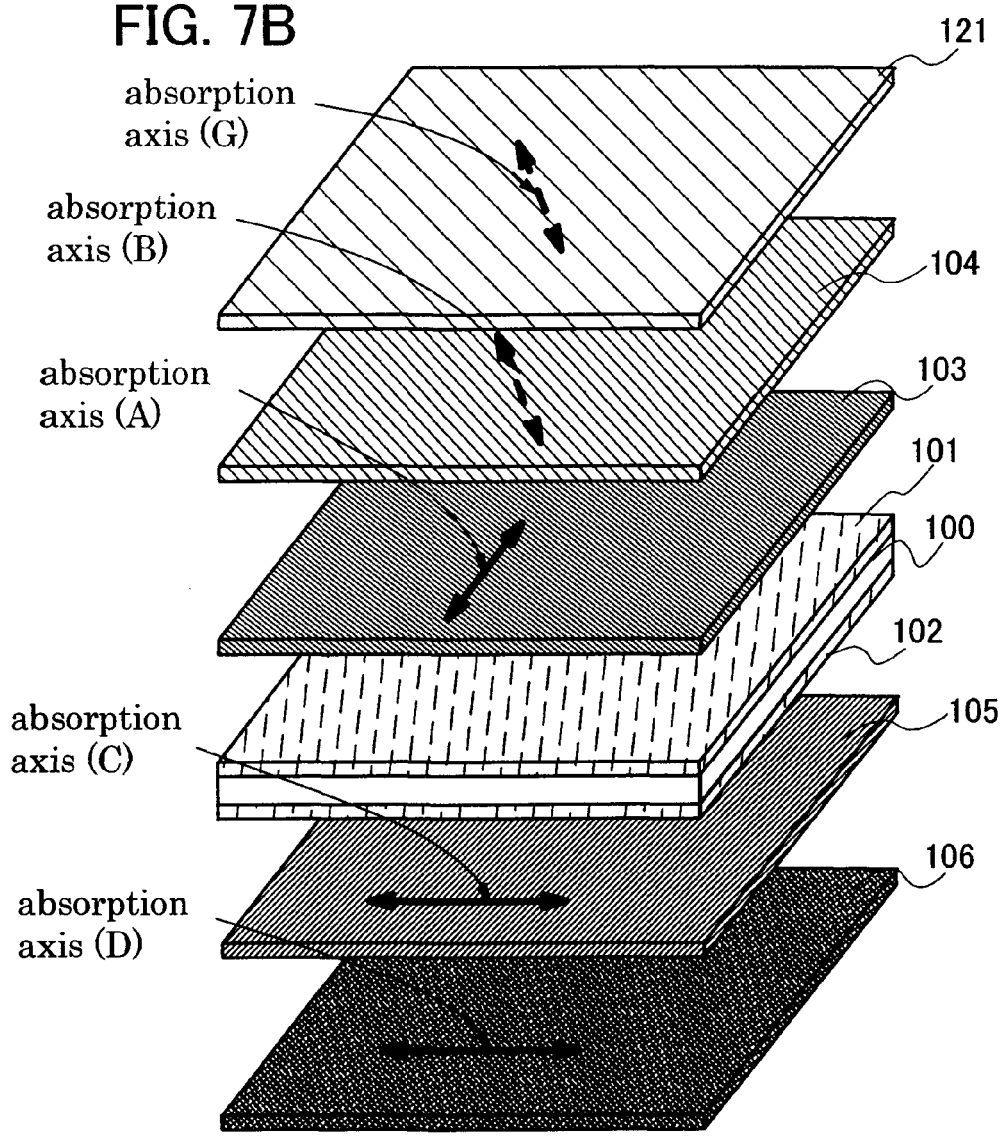

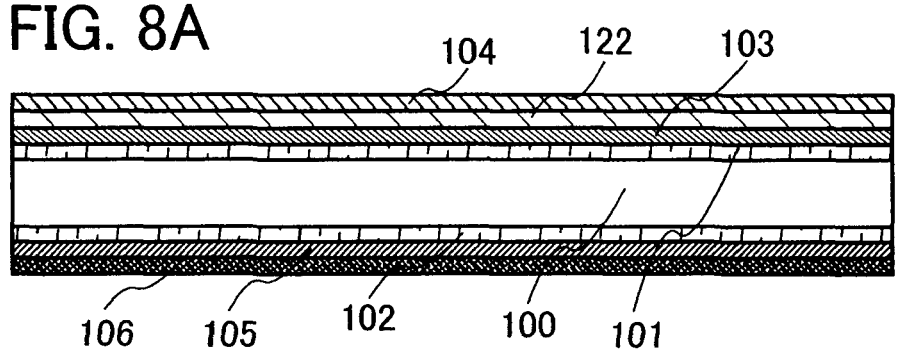
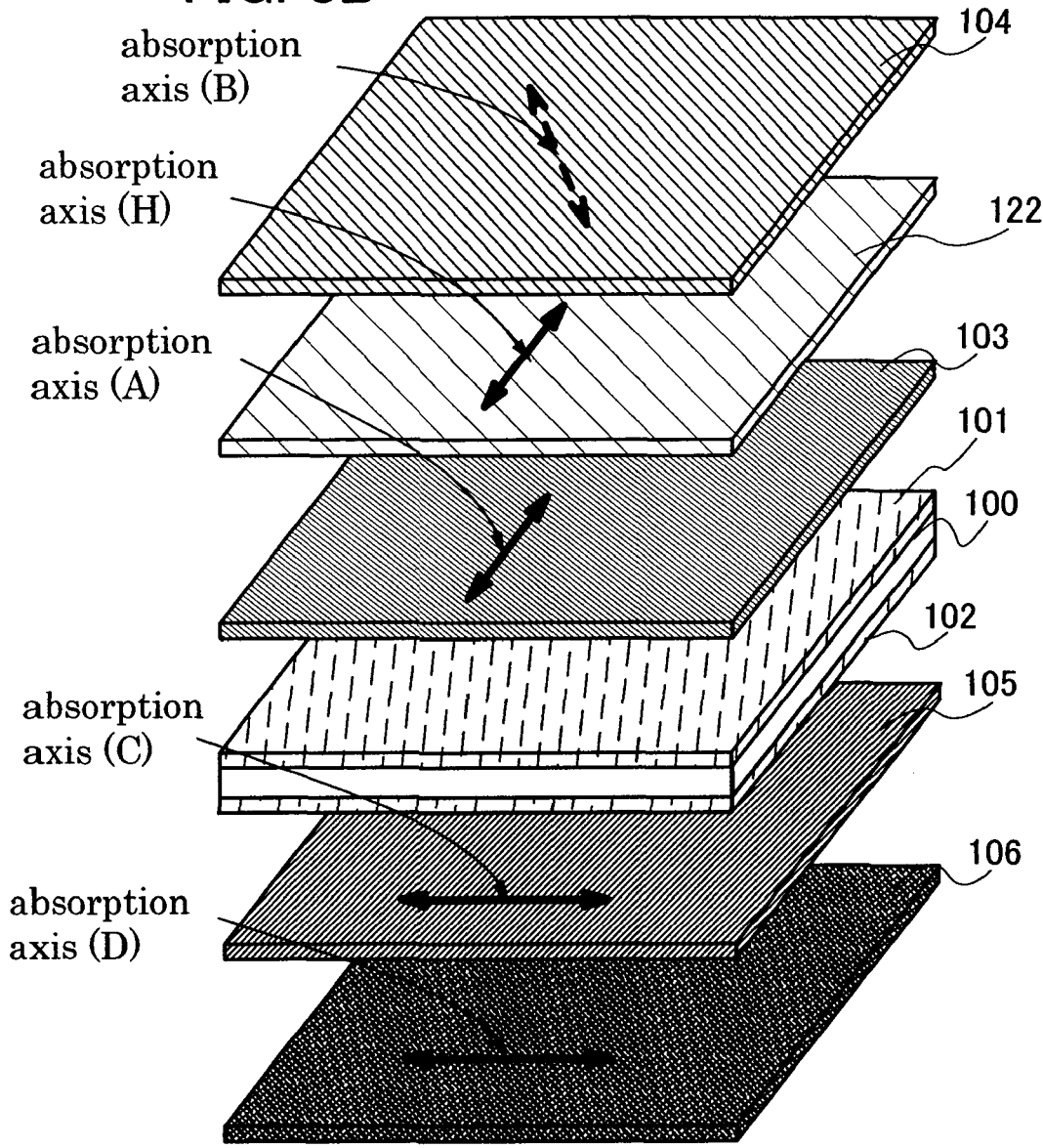

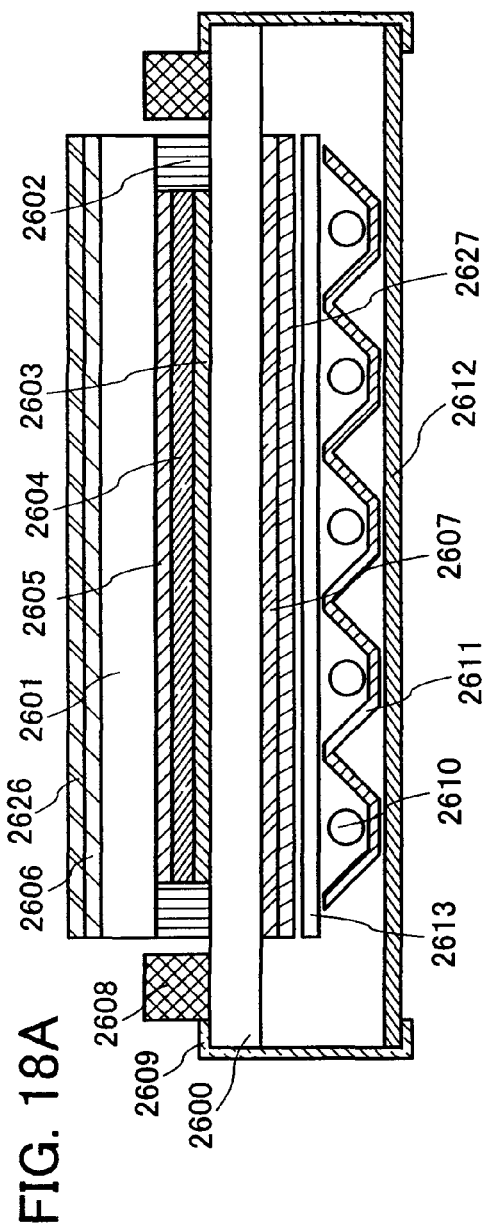
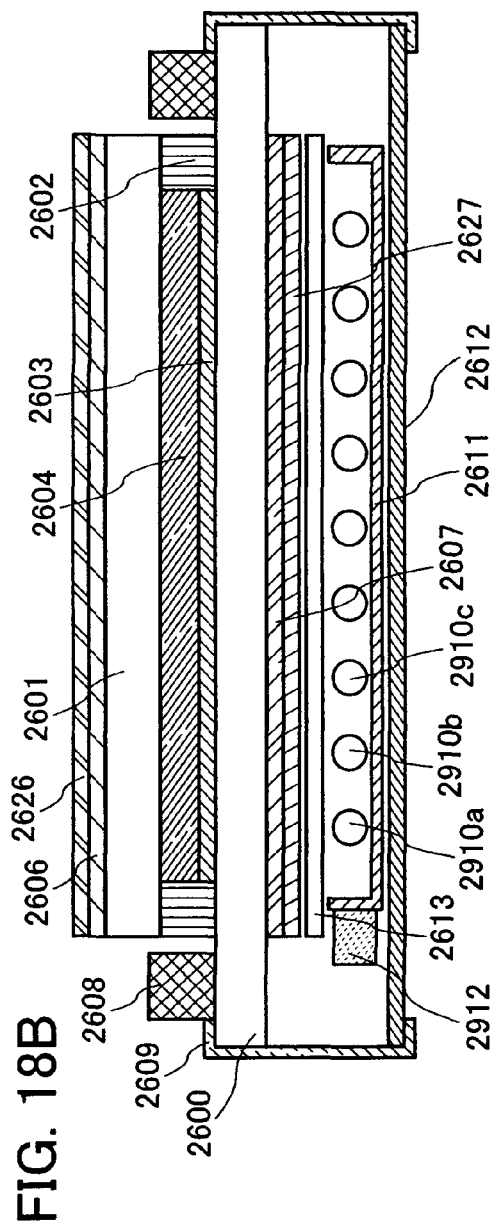
FIG. 18A
FIG. 18B

FIG. 27A1
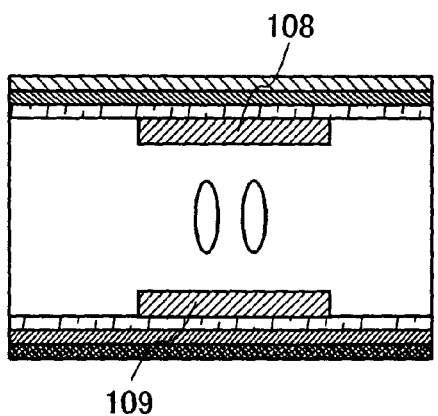
FIG. 27A2
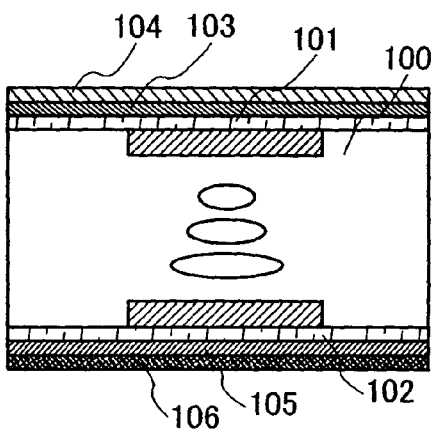
FIG. 27B1
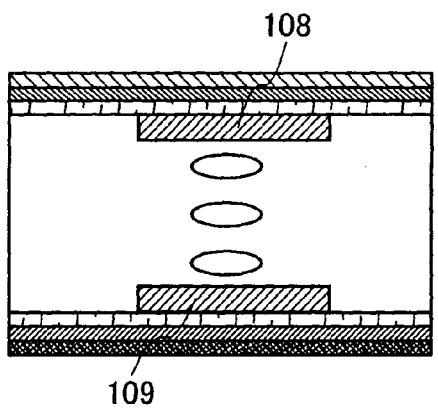
FIG. 27B2
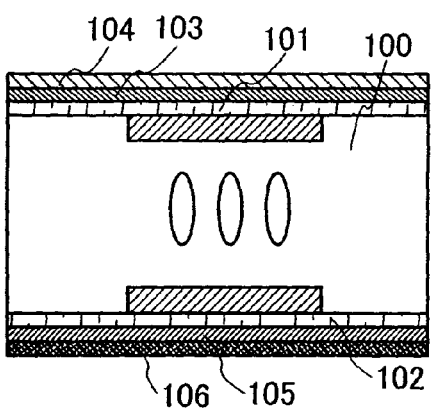
FIG. 27C1
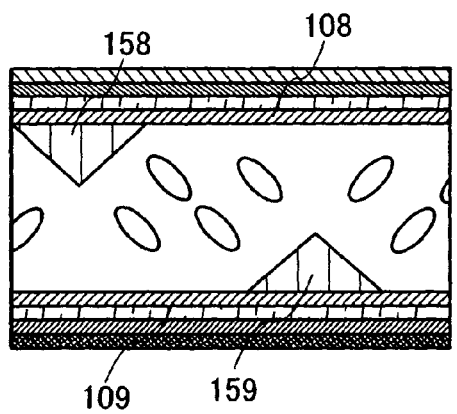
FIG. 27C2
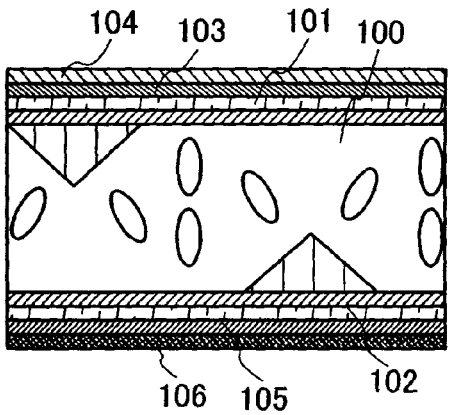

FIG. 28A1
FIG. 28A2
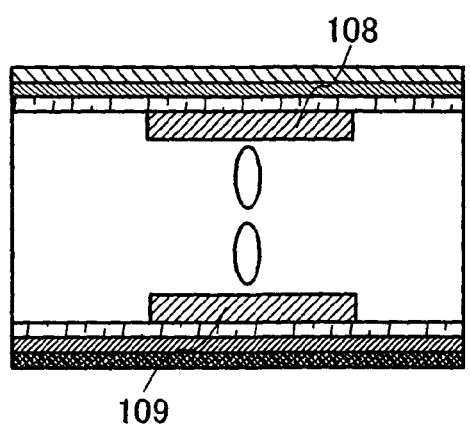
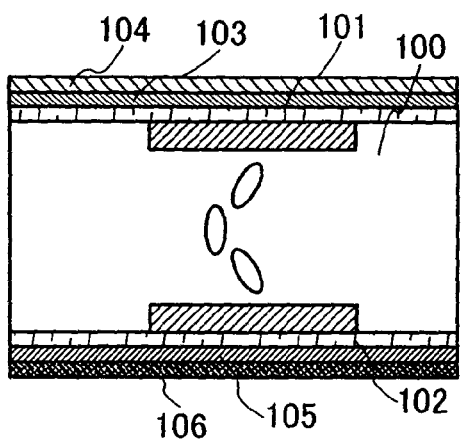
FIG. 28B1
FIG. 28B2
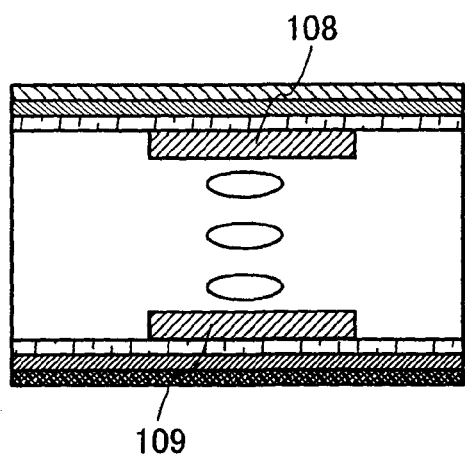
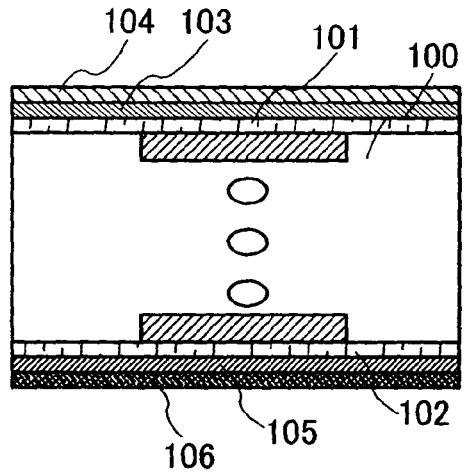

FIG. 29A1
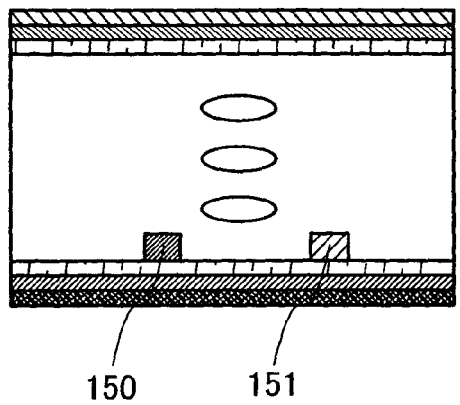
150  151
FIG. 29A2
104 103 101 100
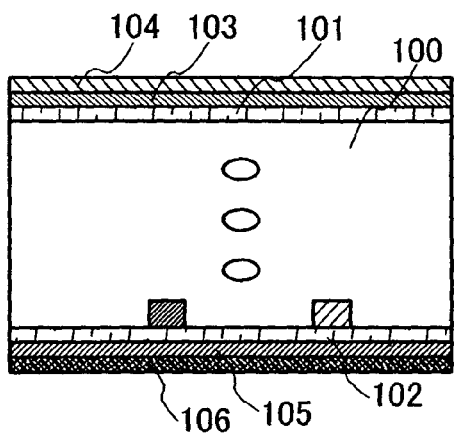
106 105 102
FIG. 29B1
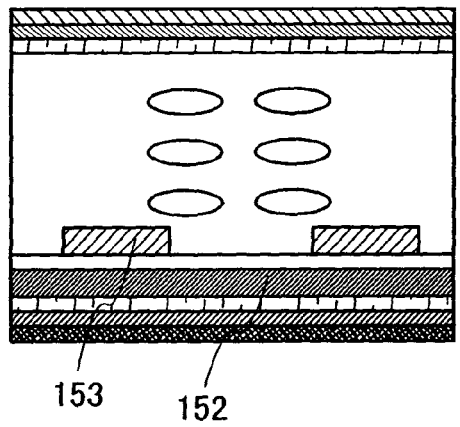
153  152
FIG. 29B2
104 103 101 100
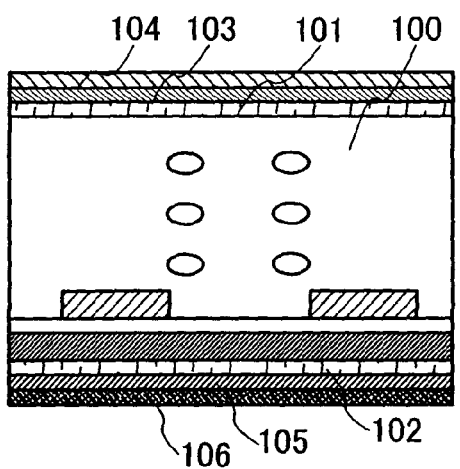
106 105 102

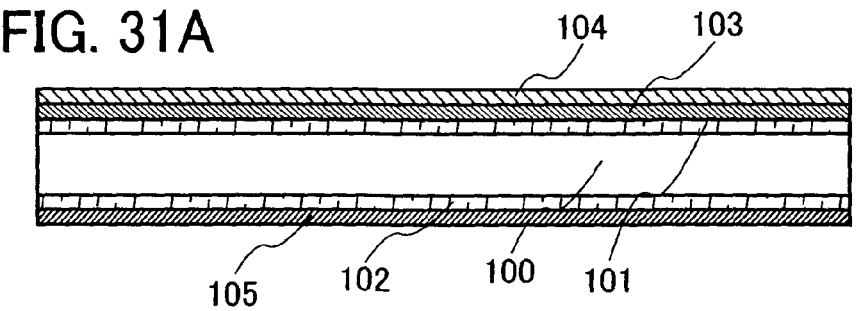
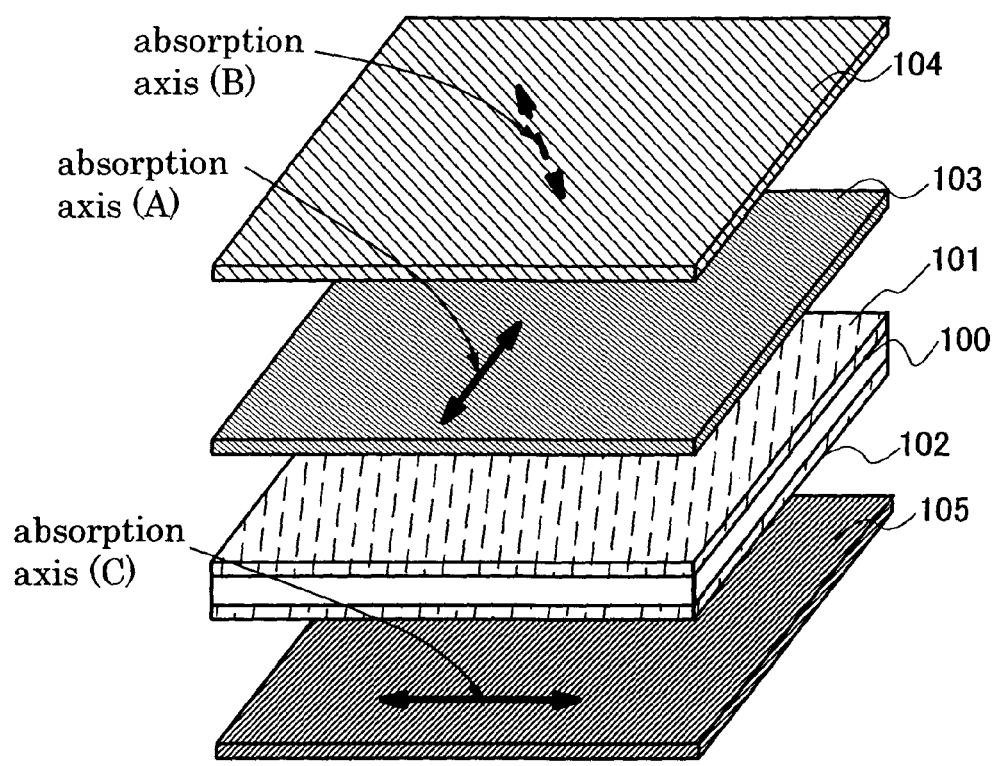

FIG. 32

| viewing side |
|---|
| polarizer 1 (absorption axis turned from 30 to 50 degrees) |
| polarizer 2 (absorption axis 45 degrees) |
| retardation film B1 |
| retardation film A1 |
| glass substrate |
| liquid crystal |
| glass substrate |
| retardation film A2 |
| retardation film B2 |
| polarizer 2 (absorption axis 135 degrees) |
| polarizer 1 (absorption axis 135 degrees) |
| backlight |

FIG. 34A

| viewing side |
|---|
| polarizer 1(absorption axis 40.6 degrees) |
| polarizer 2(absorption axis 45 degrees) |
| retradation film B1 |
| retardation film A1 |
| glass substrate |
| liquid crystal |
| glass substrate |
| retardation film A2 |
| retardation film B2 |
| polarizer 2(absorption axis 135 degrees) |
| polarizer 1(absorption axis 135 degrees) |
| backlight | structure A

FIG. 34B

| viewing side |
|---|
| polarizer 1(absorption axis 40.6 degrees) |
| polarizer 2(absorption axis 45 degrees) |
| retradation film B1 |
| retardation film A1 |
| glass substrate |
| liquid crystal |
| glass substrate |
| retardation film A2 |
| retardation film B2 |
| polarizer 2(absorption axis 135 degrees) |
| polarizer 1(absorption axis 135 degrees) |
| backlight | structure B

FIG. 34C

| viewing side |
|---|
| polarizer 1(absorption axis 40.6 degrees) |
| polarizer 2(absorption axis 45 degrees) |
| retradation film B1 |
| retardation film A1 |
| glass substrate |
| liquid crystal |
| glass substrate |
| retardation film A2 |
| retardation film B2 |
| polarizer 2(absorption axis 135 degrees) |
| polarizer 1(absorption axis 135 degrees) |
| backlight | structure C

DISPLAY DEVICE HAVING STACKED POLARIZERS THAT DIFFER IN DEGREES OF LIGHT ABSORBING BANDS AND THAT ARE BETWEEN A PAIR OF PROTECTIVE LAYERS SUCH THAT NO PROTECTIVE LAYER IS LOCATED BETWEEN THE STACKED POLARIZERS

BACKGROUND OF THE INVENTION

1. Field of the Invention

The present invention relates to a structure of a display device having a polarizer.

2. Description of the Related Art

A so-called flat panel display, which is a display device that is very thin and lightweight as compared to the conventional cathode-ray tube display device, has been developed. A liquid crystal display device having a liquid crystal element as a display element, a light emitting device having a self-light emitting element, an FED (field emission display) using an electron beam, and the like compete in the market of flat panel displays. Therefore, lower power consumption and a higher contrast ratio are demanded to increase the added value so as to differentiate from other products.

In general, in a liquid crystal display device, each substrate is provided with one polarizing plate to keep a contrast ratio. When display of darker black is performed, the contrast ratio can be increased accordingly. Thus, higher display quality can be provided when an image is seen in a dark room such as a home theater room.

For example, in order to reduce display nonuniformity caused due to shortage of polarization degree and polarization distribution of polarizing plates and to improve a contrast ratio, a structure is suggested in which a first polarizing plate is provided outside a substrate on a viewing side of a liquid crystal cell, a second polarizing plate is provided outside a substrate on a side opposite to the viewing side, and a third polarizing plate is provided for increasing the degree of polarization when light from an auxiliary light source provided on the substrate side opposite to the viewing side is polarized through the second polarizing plate and transmitted through the liquid crystal cell (see Reference 1: PCT International Publication No. 00/34821).

SUMMARY OF THE INVENTION

However, a yet higher contrast ratio has been demanded to be enhanced and researches have been made for enhancement in contrast ratio of liquid crystal display devices. Further, there is a problem in that a polarizing plate having a higher degree of polarization is expensive.

A method for improving a contrast ratio by using three polarizing plates as described in Reference 1 can be realized by using an inexpensive polarizing plate; however, it is difficult to perform display with a higher contrast ratio by the method. Further, the dependence of absorption properties of a polarizer on a wavelength is not constant, that is, the polarizer has properties of hardly absorbing light of the certain wavelength region. Accordingly, even when a plurality of polarizers of the same type is used in attempting to improve contrast ratio, a certain wavelength region of light which is hardly absorbed remains. This causes slight light leakage, and the light leakage prevents a contrast ratio from being enhanced.

In view of the aforementioned problems, an object of the invention is to provide a display device having a high contrast ratio by a simple and easy method. Another object of the invention is to manufacture a high-performance display device at low cost.

It is a feature of the present invention that at least one of light-transmitting substrates which are provided to face each other is provided with a layer including stacked polarizers, and the stacked polarizers have different wavelength distributions of extinction coefficients and are arranged so that their absorption axes are deviated from a parallel Nicols state. Further, a wave plate or a retardation plate may be provided between the stacked polarizers.

A polarizer has an absorption axis, and when polarizers are stacked, a state where the absorption axes of the polarizers are parallel to each other is referred to as a parallel Nicols state, while a state where the absorption axes of the polarizers are perpendicular to each other is referred to as a crossed Nicols state. Note that a polarizer characteristically has a transmission axis perpendicular to the absorption axis. Therefore, a state where the transmission axes are parallel to each other can also be referred to as a parallel Nicols state, and a state where transmission axes are perpendicular to each other can also be referred to as a crossed Nicols state.

Further, a polarizer has a specific light extinction coefficient. This is because the dependence of the absorption properties of a polarizer on a wavelength is not constant, and the absorption properties with respect to a certain wavelength region are lower than that with respective to another wavelength region, that is, the polarizer has properties of hardly absorbing light of the certain wavelength region. In the present invention, the absorption axes of stacked polarizers have different wavelength distributions of extinction coefficients.

The wavelength region of light which is hardly absorbed can be eliminated or reduced by combining and stacking polarizers having different wavelength distributions of extinction coefficients with respect to the absorption axes. Thus, even slight light leakage can be prevented and contrast ratio can be further improved.

A mode of a display device the present invention includes a first light-transmitting substrate and a second light-transmitting substrate which are disposed to face each other; a display element sandwiched between the first light-transmitting substrate and the second light-transmitting substrate; and layers including stacked polarizers on an outer side of the first light-transmitting substrate and the second light-transmitting substrate. The stacked polarizers have different wavelength distributions of extinction coefficients with respect to absorption axes, and the stacked polarizers are arranged so that their absorption axes are deviated from a parallel Nicols state.

A mode of a display device the present invention includes a first light-transmitting substrate and a second light-transmitting substrate which are disposed to face each other; a display element sandwiched between the first light-transmitting substrate and the second light-transmitting substrate; and layers including stacked polarizers on an outer side of the first light-transmitting substrate and the second light-transmitting substrate; and a retardation plate provided between the layers including the stacked polarizers and the first light-transmitting substrate and the second light-transmitting substrate respectively. The stacked polarizers have different wavelength distributions of extinction coefficients with respect to absorption axes, and the stacked polarizers are arranged so that their absorption axes are deviated from a parallel Nicols state.

A mode of a display device the present invention includes a first light-transmitting substrate and a second light-transmitting substrate which are disposed to face each other; a display element sandwiched between the first light-transmitting substrate and the second light-transmitting substrate; and a first layer including first stacked polarizers on an outer side of the first light-transmitting substrate; and a second layer including second stacked polarizers on an outer side of the second light-transmitting substrate. The first stacked polarizers have different wavelength distributions of extinction coefficients with respect to absorption axes, the second stacked polarizers have different wavelength distributions of extinction coefficients with respect to absorption axes, the first stacked polarizers are arranged so that their absorption axes are deviated from a parallel Nicols state, and the second stacked polarizers are arranged so that their absorption axes are deviated from a parallel Nicols state.

A mode of a display device the present invention includes a first light-transmitting substrate and a second light-transmitting substrate which are disposed to face each other; a display element sandwiched between the first light-transmitting substrate and the second light-transmitting substrate; and a first layer including first stacked polarizers on an outer side of the first light-transmitting substrate; a second layer including second stacked polarizers on an outer side of the second light-transmitting substrate; a first retardation plate between the first layer including the first stacked polarizers and the first light-transmitting substrate; and a second retardation plate between the second layer including the second stacked polarizers and the second light-transmitting substrate. The first stacked polarizers have different wavelength distributions of extinction coefficients with respect to absorption axes, the second stacked polarizers have different wavelength distributions of extinction coefficients with respect to absorption axes, the first stacked polarizers are arranged so that their absorption axes are deviated from a parallel Nicols state, and the second stacked polarizers are arranged so that their absorption axes are deviated from a parallel Nicols state.

A mode of a display device the present invention includes a first light-transmitting substrate and a second light-transmitting substrate which are disposed to face each other; a display element sandwiched between the first light-transmitting substrate and the second light-transmitting substrate; and a first layer including first stacked polarizers on an outer side of the first light-transmitting substrate; and a second layer including second stacked polarizers on an outer side of the second light-transmitting substrate. The first stacked polarizers have different wavelength distributions of extinction coefficients with respect to absorption axes, the second stacked polarizers have different wavelength distributions of extinction coefficients from each other with respect to absorption axes, the first stacked polarizers are arranged so that their absorption axes are deviated from a parallel Nicols state, the second stacked polarizers are arranged so that their absorption axes are deviated from a parallel Nicols state, the first layer including the first stacked polarizers has a first polarizer and a second polarizer which are sequentially stacked from the first light-transmitting substrate side, and the first stacked polarizers and the second stacked polarizers are arranged so that their absorption axes are in a crossed Nicols state.

A mode of a display device the present invention includes a first light-transmitting substrate and a second light-transmitting substrate which are disposed to face each other; a display element sandwiched between the first light-transmitting substrate and the second light-transmitting substrate; and a first layer including first stacked polarizers on an outer side of the first light-transmitting substrate; a second layer including second stacked polarizers on an outer side of the second light-transmitting substrate; a first retardation plate between the first light-transmitting substrate and the first layer including the first stacked polarizers; and a second retardation plate between the second light-transmitting substrate and the second layer including the second stacked polarizers. The first stacked polarizers have different wavelength distributions of extinction coefficients from each other with respect to absorption axes, the second stacked polarizers have different wavelength distributions of extinction coefficients from each other with respect to absorption axes, the first stacked polarizers are arranged so that their absorption axes are deviated from a parallel Nicols state, the second stacked polarizers are arranged so that their absorption axes are deviated from a parallel Nicols state, the first layer including the first stacked polarizers has a first polarizer and a second polarizer which are sequentially stacked from the first light-transmitting substrate side, and the first stacked polarizers and the second stacked polarizers are arranged so that their absorption axes are in a crossed Nicols state.

With respect to a display device of the invention, in the case where light from a light source called a backlight is transmitted through a layer including stacked polarizers on a side opposite to a viewing side to a display element and extracted from a layer including stacked polarizers on a viewing side, it is preferable that the absorption axes of the polarizers on the side (backlight side) opposite to the viewing side are in a parallel Nicols state, thereby transmittance of the light from the backlight is increased.

Further, a layer including stacked polarizers of the display device of the invention may have a structure in which a stack of a plurality of polarizers is provided between a pair of protective layers or a structure in which each polarizer is sandwiched between a pair of protective layers. Further, a structure may be used in which an anti-reflective film, an antiglare film, or the like is provided on the viewing side of the layer including stacked polarizers.

With a simple structure in which a plurality of polarizers having different wavelength distributions of extinction coefficients are stacked and provided so that their absorption axes are deviated from each other, light leakage can be reduced, and contrast ratio of a display device can be increased. Further, such a high performance display device can be manufactured at low cost.

BRIEF DESCRIPTION OF THE DRAWINGS

FIGS. 1A and 1B are a cross-sectional view and a perspective view respectively of a display device of the present invention;

FIGS. 4A and 4B are a cross-sectional view and a perspective view respectively of a display device of the present invention;

FIGS. 6A and 6B each illustrate a display device of the present invention;

FIGS. 7A and 7B are a cross-sectional view and a perspective view respectively of a display device of the present invention;

FIGS. 8A and 8B are a cross-sectional view and a perspective view respectively of a display device of the present invention;

FIGS. 18A and 18B are cross-sectional views each showing a display device of the present invention;

FIGS. 27A1 to 27C2 are cross-sectional views illustrating a liquid crystal mode of the present invention;

FIGS. 28A1 to 28B2 are cross-sectional views illustrating a liquid crystal mode of the present invention;

FIGS. 29A1 to 29B2 are cross-sectional views illustrating a liquid crystal mode of the present invention;

FIGS. 31A and 31B are a cross-sectional view and a perspective view respectively of a display device of the present invention;

FIG. 32 is a diagram showing experimental conditions of Embodiment 1;

FIGS. 34A to 34C are diagrams showing experimental conditions of Embodiment 1;

DETAILED DESCRIPTION OF THE INVENTION

Embodiment Modes

Figure 2A:
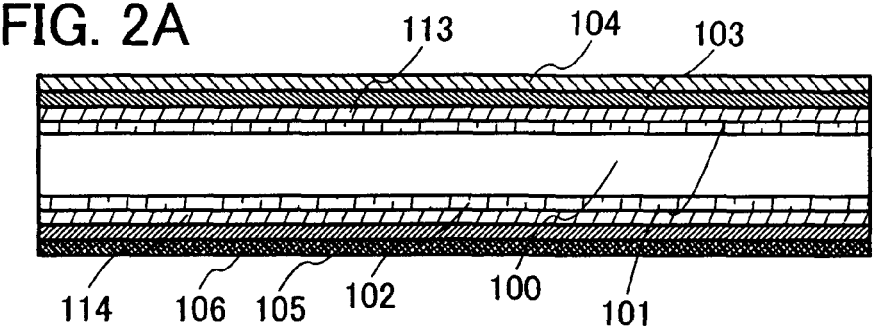
FIGS. 2A and 2B are a cross-sectional view and a perspective view respectively of a display device of the present invention.

Hereinafter, embodiment modes and an embodiment of the present invention will be explained with reference to the drawings. Note that it is easily understood by those skilled in the art that forms and details of the invention can be variously changed without departing from the spirit and scope of the invention. Therefore, the present invention should not be construed as being limited to the content of the embodiment modes. Note that common portions and portions having similar functions are denoted by the same reference numerals in all diagrams for describing embodiment modes, and description thereof will not be repeated.

Embodiment Mode 1

In this embodiment mode, a concept of a display device in which a pair of stacked layers each including a polarizer using the present invention is provided will be explained.

FIG. 1A is a cross-sectional view of a display device having a pair of stacked layers each including a polarizer, in which the wave length distributions of the extinction coefficients with respect to the absorption axes are different, and a structure in which at least one of the layers having the polarizers is disposed so as to be deviated from a parallel Nicols state. FIG. 1B is a perspective view of the display device. In this embodiment mode, an example of a liquid crystal display device having a liquid crystal element as a display element will be described.

As shown in FIG. 1A, a layer 100 having a liquid crystal element is sandwiched between a first substrate 101 and a second substrate 102 which are arranged so as to face each other.

In this embodiment mode, stacked layers each including a polarizer are provided on an outer side of a substrate, where the substrate is not in contact with a layer having a liquid crystal element. Specifically, as shown in FIG. 1A, a first layer 103 including a polarizer and a second layer 104 including a polarizer are provided on a first substrate 101 side. Meanwhile, a third layer 105 including a polarizer and a fourth layer 106 including a polarizer are provided on a second substrate 102 side. In this embodiment mode, in a pair of layers each including a polarizer, in which the wavelength distributions of the extinction coefficients with respect to the absorption axes are different, at least one of the stacked layers each including a polarizers is deviated from a parallel Nicols state. Specifically, as shown in FIG. 1B, the first layer 103 including a polarizer and the second layer 104 including a polarizer are stacked so that the absorption axis (A) of the first layer 103 and the absorption axis (B) of the second layer 104 where the wavelength distributions of the extinction coefficients are different are deviated from a parallel state. Further, the third layer 105 including a polarizer and the fourth layer 106 including a polarizer are stacked so that the absorption axis (C) of the third layer 105 and the absorption axis (D) of the fourth layer 106 where the wavelength distributions of the extinction coefficients are different are in parallel, that is, in a parallel Nicols state.

A polarizer has inconstant dependence of the absorption properties on a wavelength, and the absorption properties with respect to a certain wavelength region are lower than that with respect to another wavelength region, that is, the polarizer has properties of hardly absorbing light of the certain wavelength region. Accordingly, even when a plurality of polarizers of the same type is used in attempting to improve contrast ratio, a certain wavelength region of light which is hardly absorbed remains. In accordance with the present invention, the wavelength region of light which is hardly absorbed can be eliminated or reduced by combining and stacking polarizers where the wavelength distributions of the extinction coefficients with respect to the absorption axis are different. Therefore, even slight light leakage can be prevented, and contrast ratio can be further improved.

Each of the substrates is a light-transmitting insulating substrate (hereinafter also referred to as a light-transmitting substrate). The substrate is especially transparent to light in the visible wavelength range. As the substrates, for example, a glass substrate made of barium borosilicate glass, aluminoborosilicate glass, or the like; a quartz substrate; or the like can be used. Alternatively, a substrate formed of plastic typified by polyethylene terephthalate (PET), polyethylene naphthalate (PEN), and polyether sulfone (PES), or a flexible synthetic resin such as acrylic can be used as the substrates. Further, a film (formed of polypropylene, polyester, vinyl, polyvinyl fluoride, polyvinyl chloride, or the like), a base film (formed of polyester or polyamide, an inorganic deposition film, or the like) may be used as the substrates.

Further, although not shown in FIGS. 1A and 1B, an irradiation means such as a backlight is disposed below the fourth layer 106 including the polarizer.

In this embodiment mode, the first layer 103 including the polarizer and the third layer 105 including the polarizer are arranged so as to be in a crossed Nicols state. The first layer 103 including the polarizer and the third layer 105 including the polarizer may be deviated from the crossed Nicols state within the range where predetermined black display is obtained.

Figure 5:
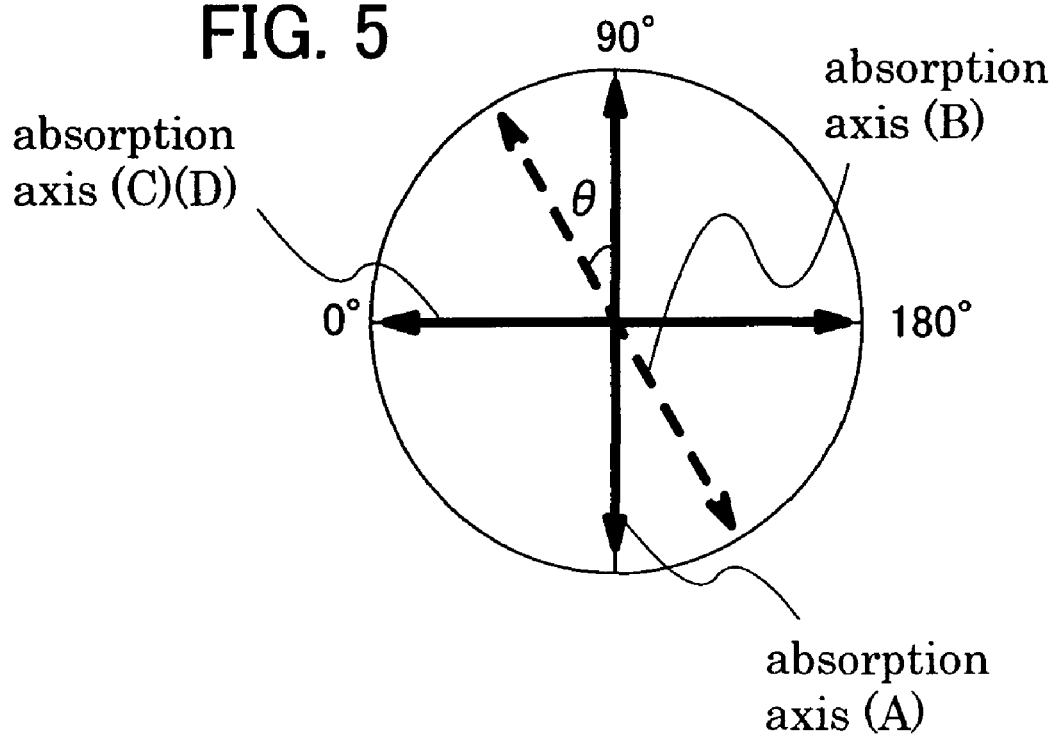
FIG. 5 illustrates a display device of the present invention.

FIG. 5 is a top view of angles between the absorption axis (A) of the first layer 103 including the polarizer, the absorption axis (B) of the second layer 104 including the polarizer, the absorption axis (C) of the third layer 105 including the polarizer, and the absorption axis (D) of the fourth layer 106 including the polarizer. The first layer 103 including the polarizer and the second layer 104 including the polarizer are stacked in such a way that the absorption axis (A) and the absorption axis (B) are deviated by an angle θ. In this embodiment mode, the third layer 105 including the polarizer and the fourth layer 106 including the polarizer are arranged in such a way that the absorption axis (C) and the absorption axis (D) are in a parallel Nicols state.

Note that a polarizer characteristically has a transmission axis perpendicular to the absorption axis. Therefore, a state where the transmission axes are parallel to each other can also be referred to as a parallel Nicols state, and a state where transmission axes are perpendicular to each other can also be referred to as a crossed Nicols state.

Note that the number of the stacked layers each including a polarizer a having different wavelength distribution of extinction coefficient from each other in FIGS. 1A and 1B is two; however, the present invention is not limited thereto and a multilayer structure having more than two layers may be used. An example of further stacking a fifth layer 121 including a polarizer over the first layer 103 including a polarizer and the second layer 104 including the polarizer which have different wavelength distributions of extinction coefficients is shown in FIGS. 7A and 7B. In FIGS. 7A and 7B, the fifth layer 121 including the polarizer has an absorption axis (G), and the absorption axis (G) is parallel to the absorption axis (B) of the second layer 104 including the polarizer, and deviated from the absorption axis (A) of the first layer 103 including the polarizer. In other words, as shown in FIG. 6A, the fifth layer 121 including the polarizer and the second layer 104 including the polarizer are stacked so that their absorption axes are in a parallel Nicols state.

Further, the wavelength distribution of the extinction coefficient with respect to the absorption axis of the fifth layer 121 including the polarizer may be equal to or different from that with respect to the first layer 103 including the polarizer or the second layer 104 including the polarizer which is to be stacked together therewith. In this embodiment mode, the wavelength distribution of the extinction coefficient with respect to the absorption axis of the fifth layer 121 including the polarizer is different from that with respect to those of the first layer 103 including the polarizer and the second layer 104 including the polarizer. Thus, when the wavelength distributions of the extinction coefficients with respect to the absorption axes of the polarizers in the stacked layers are different, the wavelength range of light which can be absorbed can be extended; thus, even slight light leakage can be prevented. In the present invention, a stack in which absorption axes of the polarizers are deviated from a parallel Nicols state may be used in a plurality of stacked layers each including a polarizer. Similarly, at least two polarizers having different wavelength distributions of extinction coefficients may be used in a plurality of stacked layers each including a polarizer.

Further, a fifth layer including a polarizer may be provided between the first layer 103 including the polarizer and the second layer 104 including the polarizer in such a manner the fifth layer and the first layer 103 are in a parallel Nicols state. FIGS. 8A and 8B show an example in which a fifth layer 122 including a polarizer is stacked between the first layer 103 including the polarizer and the second layer 104 including the polarizer. In FIG. 8, the fifth layer 122 including the polarizer has an absorption axis (H), and the absorption axis (H) is parallel to the absorption axis (A) of the first layer 103 including the polarizer, and deviated from the absorption axis (B) of the second layer 104 including the polarizer. Accordingly, as shown in FIG. 6B, the fifth layer 122 including the polarizer, the first layer 103 including the polarizer, and the second layer 104 including the polarizer are stacked so that the absorption axes of the fifth layer 122 and the first layer 103 are in a parallel Nicols state, and the absorption axes of the fifth layer 122 and the second layer 104 are deviated by a deviated angle θ.

Further, the stack including the third layer 105 including the polarizer and the fourth layer 106 including the polarizer which are stacked in a parallel Nicols state on a light source side may be replaced by one layer (See FIG. 31). In that case, a stack including the first layer 103 including the polarizer and the second layer 104 including the polarizer having a different wavelength distribution of extinction coefficient from each other is disposed on the viewing side, and the third layer 105 including the polarizer is disposed on the light source side with a layer including a liquid crystal element therebetween. The structure as shown in FIG. 31 may preferably be used when the amount of light from the light source is desired not to decrease.

As in this embodiment mode, a pair of stacked layers including polarizers can be applied to a display device where light can be extracted from both sides of a substrate.

Thus, in a pair of stacked layers each including polarizers, polarizers in at least one of the layers each including polarizers having different wavelength distributions of extinction coefficients, preferably, the layer on a viewing side, are provided so that the absorption axes of the polarizers are deviated from a parallel Nicols state, thereby reducing light leakage in the directions of the absorption axes. Thus, contrast ratio of the display device can be increased.

Embodiment Mode 2

This embodiment mode will describe a concept of a display device provided with a retardation plate in addition to a pair of stacked layers each including a polarizing plate having a different wavelength distribution of extinction coefficient from each other with respect to the absorption axes unlike the above embodiment mode.

Figure 2B:
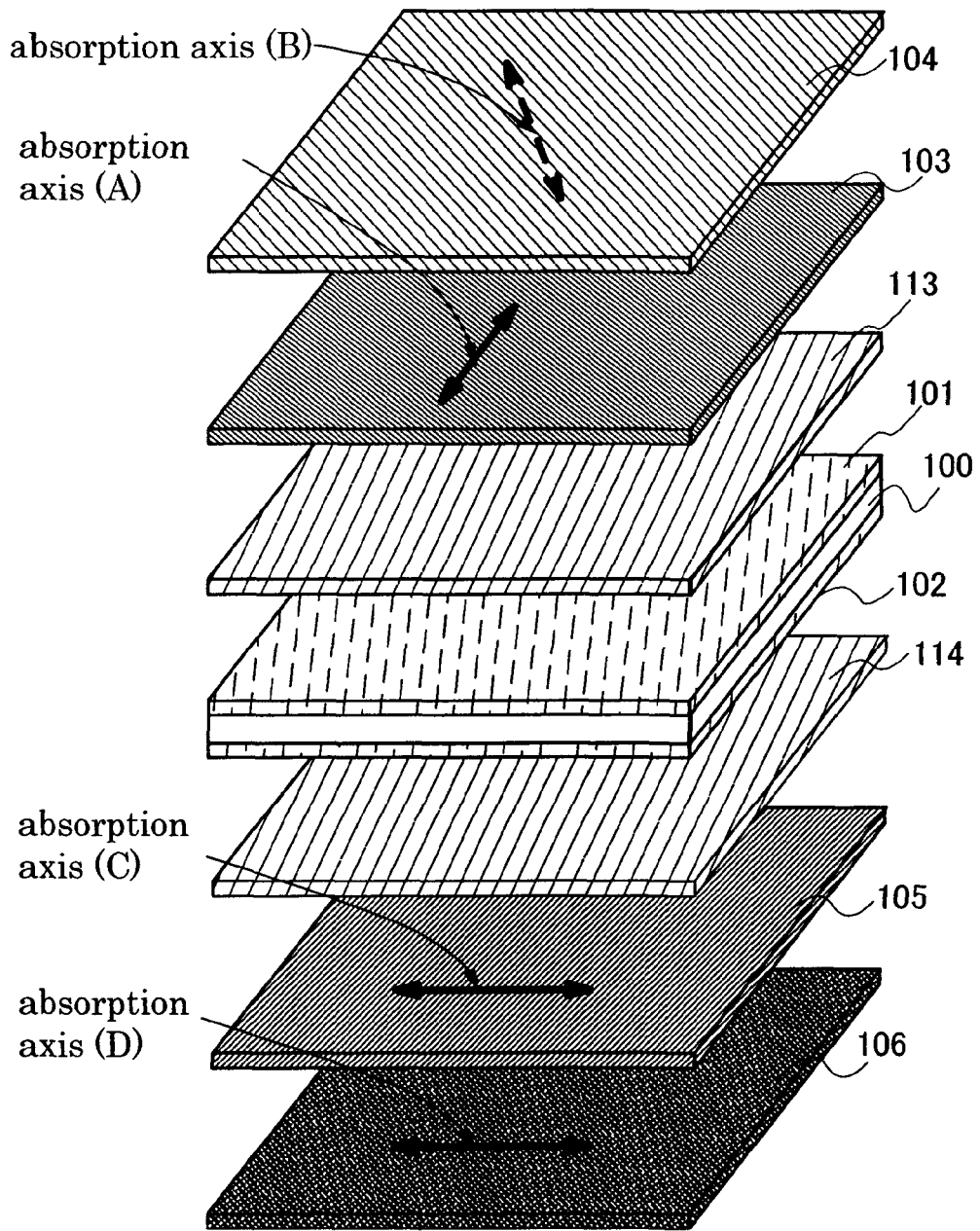

FIG. 2A is a cross-sectional view of a display device in which one of the pair of stacked layers each including a polarizer having a different wavelength distribution of extinction coefficient from each other with respect to the absorption axis is stacked to be deviated from a parallel Nicols state, and retardation plates are provided between the pair of stacked layers each including a polarizer and substrates respectively, while FIG. 2B is a perspective view of the display device. In this embodiment mode, a liquid crystal display device having a liquid crystal element as a display element will be explained as an example.

As shown in FIG. 2A, a layer 100 including a liquid crystal element is sandwiched between a first substrate 101 and a second substrate 102 which are disposed to face each other.

As shown in FIG. 2A, a first layer 103 including a polarizer and a second layer 104 including a polarizer are provided on a first substrate 101 side. A third layer 105 including a polarizer and a fourth layer 106 including a polarizer are provided on a second substrate 102 side.

As shown in FIG. 2B, the first layer 103 including the polarizer and the second layer 104 including the polarizer are arranged so that the absorption axes of the polarizing plate having different wavelength distributions of extinction coefficients are deviated from a parallel Nicols state. Further, a retardation plate 113 is provided between the stacked layers each including the polarizing plate having a different wavelength distribution of extinction coefficient from each other with respect to the absorption axes and the first substrate 101.

Further, as shown in FIG. 2B, the third layer 105 including the polarizer and the fourth layer 106 including the polarizer are provided on the second substrate 102 side. The third layer 105 including the polarizer and the fourth layer 106 including the polarizer are arranged to be in a parallel Nicols state. In addition, a retardation plate 114 is provided between the stacked layers each including the polarizer and the second substrate 102.

In addition, although not shown in FIGS. 2A and 2B, an irradiation means such as a backlight is disposed below the fourth layer 106 including the polarizer.

The retardation plate may be, for example, a film in which liquid crystals are hybrid-aligned, a film in which liquid crystals are twist-aligned, a uniaxial retardation plate, or a biaxial retardation plate. Using such retardation plates, the viewing angle of the display device can be extended. The film in which liquid crystals are hybrid-aligned is a compound film in which a triacetyl cellulose (TAC) film is used as a base and discotic liquid crystals having negative uniaxiality are hybrid-aligned to obtain optical anisotropy.

The uniaxial retardation plate is formed by stretching a resin in one direction. Meanwhile, a biaxial retardation plate is formed by stretching a resin into an axis in a crosswise direction, and then gently stretching the resin into an axis in a lengthwise direction. The resin used here may be cyclo-olefin polymer (COP), polycarbonate (PC), polymethyl methacrylate (PMMA), polystyrene (PS), polyether sulfone (PES), polyphenylene sulfide (PPS), polyethylene terephthalate (PET), polyethylene naphthalate (PEN), polypropylene (PP), polyphenylene oxide (PPO), polyarylate (PAR), polyimide (PI), polytetrafluoroethylene (PTFE), or the like.

The film in which liquid crystals are hybrid-aligned is a film formed by using a triacetyl cellulose (TAC) film as a base and hybrid-aligning discotic liquid crystals or nematic liquid crystal molecules. The retardation plate can be attached to a light-transmitting substrate after being attached to a layer including a polarizer.

Circular polarization, elliptical polarization, or the like can be performed by combining a retardation plate and stacked polarizers. Further, a plurality of retardation plates may be used instead of one polarizer. Note that a retardation plate characteristically has a fast axis perpendicular to a slow axis. Therefore, the arrangement can be determined based on fast axes instead of slow axes.

Note that in this embodiment mode, the first layer 103 including the polarizer and the third layer 105 including the polarizer are arranged to be in a crossed Nicols state. The first layer 103 including the polarizer and the third layer 105 including the polarizer may be deviated as long as display of a predetermined black level can be obtained.

Figure 11A:
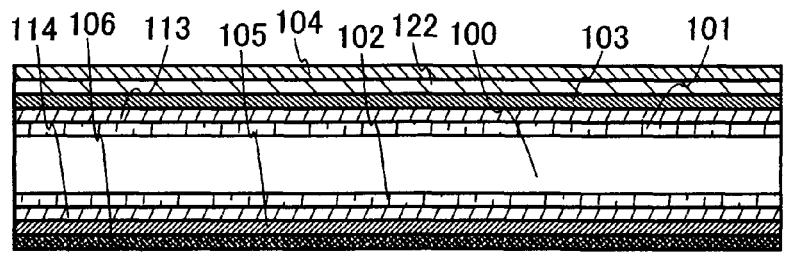
FIGS. 11A and 11B are a cross-sectional view and a perspective view respectively of a display device of the present invention.
Figure 11B:
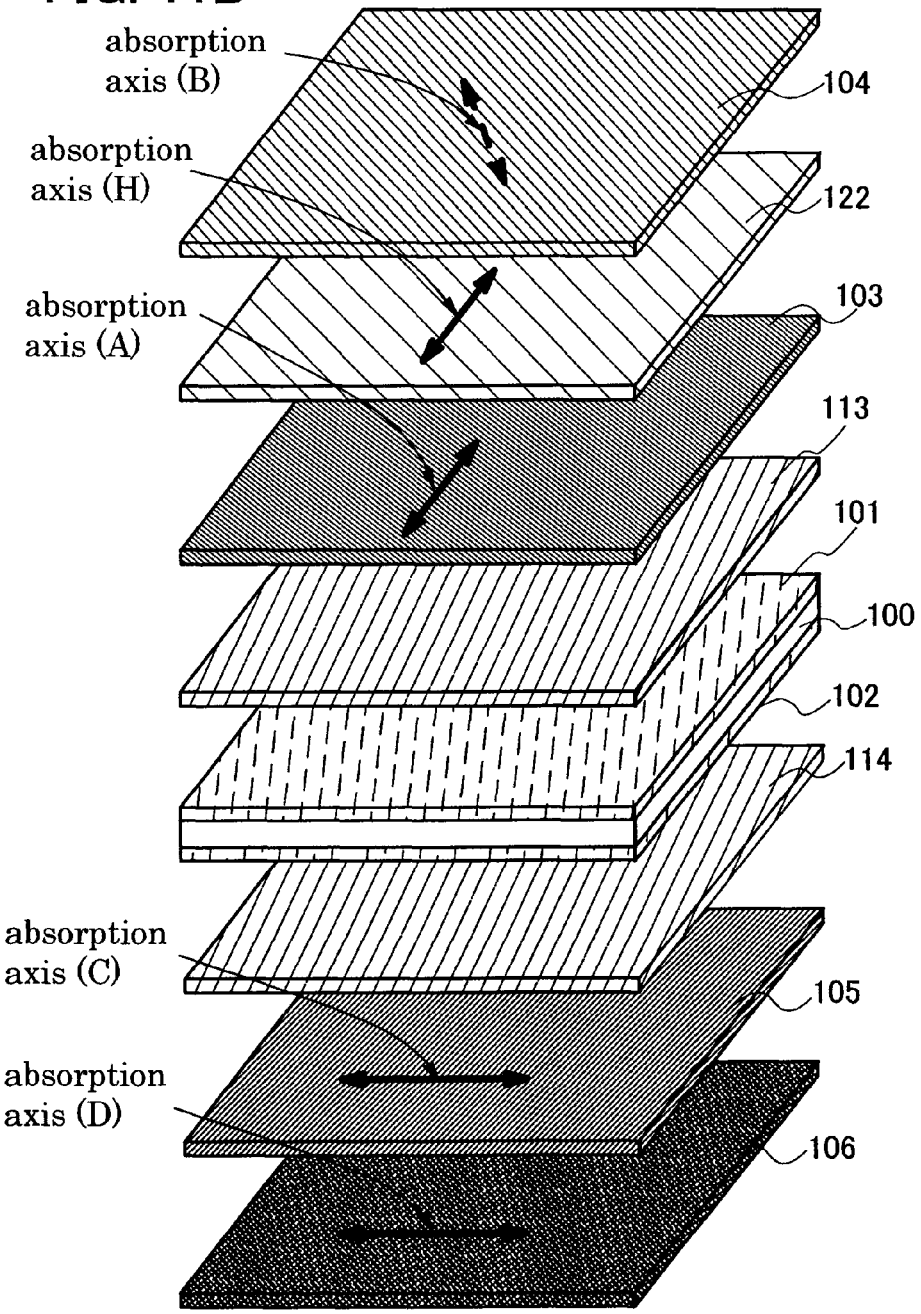

Note that the number of the stacked layers each including a polarizer having a different wavelength distribution of extinction coefficient from each other in FIGS. 2A and 2B is two; however, the present invention is not limited thereto and a multilayer structure having more than two layers may be used. A fifth layer including a polarizer may be provided between the first layer 103 including the polarizer and the second layer 104 including the polarizer in such a manner the fifth layer and the first layer 103 are in a parallel Nicols state. An example of further stacking a fifth layer 122 including a polarizer over the first layer 103 including a polarizer and the second layer 104 including the polarizer is shown in FIGS. 11A and 11B. In FIGS. 11A and 11B, the fifth layer 122 including the polarizer has an absorption axis (H), and the absorption axis (H) is parallel to the absorption axis (A) of the first layer 103 including the polarizer, and deviated from the absorption axis (B) of the second layer 104 including the polarizer. Accordingly, the fifth layer 122 including the polarizer, the first layer 103 including the polarizer, and the second layer 104 including the polarizer are stacked so that the absorption axes of the fifth layer 122 and the first layer 103 are in a parallel Nicols state, and the absorption axes of the fifth layer 122 and the second layer 104 are deviated by a deviated angle θ.

Further, the wavelength distribution of the extinction coefficient with respect to the absorption axis of the fifth layer 122 including the polarizer may be equal to or different from that with respect to the first layer 103 including the polarizer or the second layer 104 including the polarizer which is to be stacked together therewith. In this embodiment mode, the wavelength distribution of the extinction coefficient with respect to the absorption axis of the fifth layer 122 including the polarizer is different from that with respect to those of the first layer 103 including the polarizer and the second layer 104 including the polarizer. Thus, when the wavelength distributions of the extinction coefficients with respect to the absorption axes of the polarizers in the stacked layers are different, the wavelength range of light which can be absorbed can be extended; thus, even slight light leakage can be prevented.

As in this embodiment mode, a pair of stacked layers each including polarizers can be applied to a display device where light can be extracted from both sides of a substrate.

Thus, in a structure having a pair of stacked layers each including polarizers and a retardation plate, polarizers in at least one of the layers each including polarizers having different wavelength distributions of extinction coefficients, preferably, the layer on a viewing side, are provided so that their absorption axes are deviated from a parallel Nicols state, thereby reducing light leakage in the directions of the absorption axes. Thus, contrast ratio of the display device can be increased.

Embodiment Mode 3

This embodiment mode will describe a concept of a display device provided with stacked layers each including a polarizing plate having a different wavelength distribution of extinction coefficient from each other with respect to the absorption axes unlike the above embodiment mode. The like parts or parts having like functions are denoted by the same reference numerals, and the description of them will not be repeated.

Figure 3A:
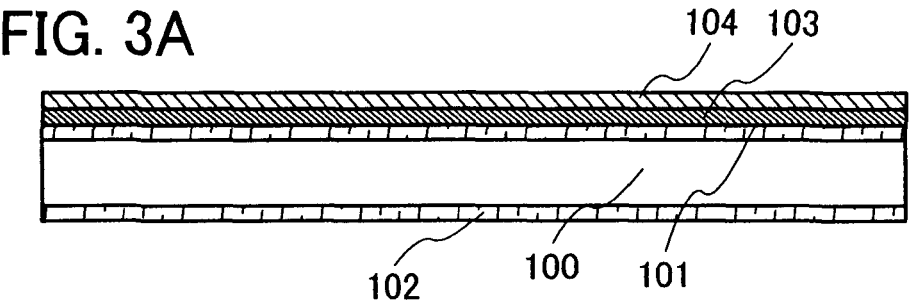
FIGS. 3A to 3C are a cross-sectional view, a perspective view, and a schematic diagram of a display device of the present invention.
Figure 3B:
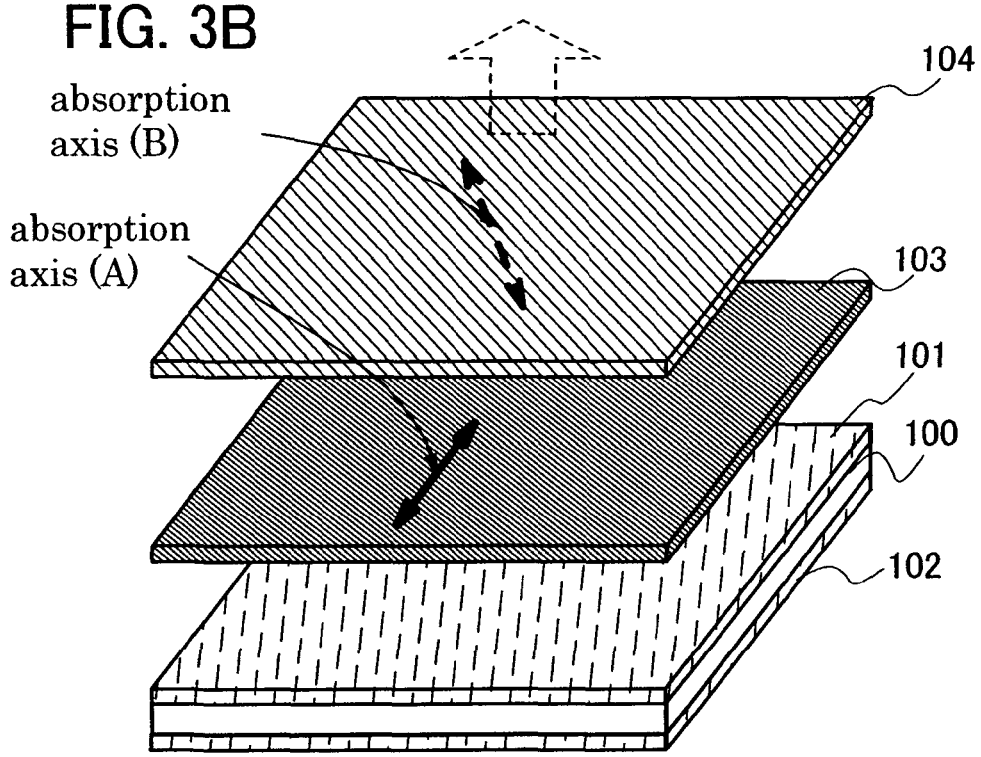

FIG. 3A is a cross-sectional view of a display device having stacked layers including polarizers, which are arranged to be deviated from a parallel Nicols state, and FIG. 3B shows a perspective view of the display device. In this embodiment mode, an example of a liquid crystal display device including a liquid crystal element as a display element will be described.

As shown in FIG. 3A, a layer 100 including a liquid crystal element is sandwiched between a first substrate 101 and a second substrate 102 which are disposed to face each other.

Stacked layers each including a polarizer are provided on an outer side of a substrate, where the substrate is not in contact with a layer having a liquid crystal element. A first layer 103 including a polarizer and a second layer 104 including a polarizer are provided on a first substrate 101 side. Here, the first layer 103 including the polarizer and the second layer 104 including the polarizer are arranged so that their absorption axes are deviated to be in a parallel Nicols state. In this embodiment mode, the wavelength distributions of the extinction coefficients of the polarizers in the first layer 103 and the second layer 104 with respect to the absorption axes are different from each other.

In this embodiment mode, a reflector plate may be provided in addition. The reflector plate can be provided by forming a pixel electrode from a highly reflective material on an outer side of the second substrate 102.

As shown in FIG. 3B, the first layer 103 including the polarizer having an absorption axis (A) and the second layer 104 including a polarizer having an absorption axis (B) are stacked so that their absorption axes are deviated from each other. Thus, when layers including polarizers are stacked so that their absorption axes are deviated, contrast ratio can be increased.

Further, even when a plurality of polarizers of the same type is used in attempting to improve contrast ratio, a certain wavelength region of light which is hardly absorbed remains. In accordance with the present invention, the wavelength region of light which is hardly absorbed can be eliminated or reduced by combining and stacking polarizers where the wavelength distributions of the extinction coefficients with respect to the absorption axis are different. Therefore, even slight light leakage can be prevented, and contrast ratio can be further improved.

Figure 3C:
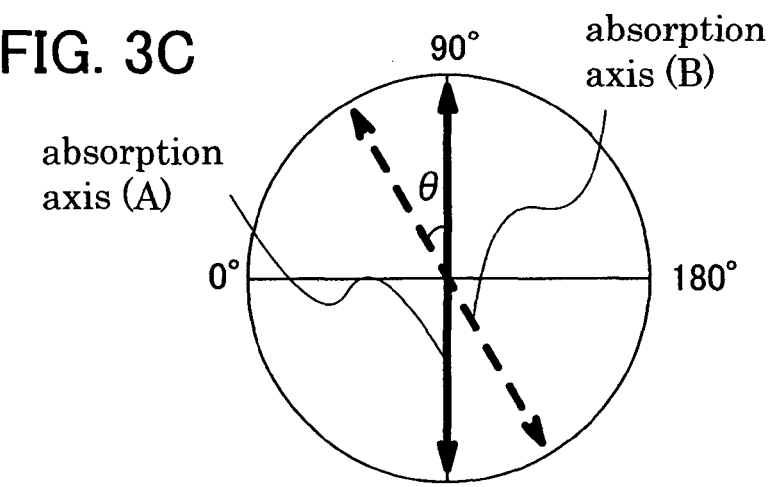

FIG. 3C illustrates an angle formed between the absorption axis (A) of the polarizer included in the first layer 103 and the absorption axis (B) of the polarizer included in the second layer 104, which is viewed from above. The first layer 103 including the polarizer and the second layer 104 including the polarizer are stacked in such a way that the absorption axis (A) and the absorption axis (B) are deviated by an angle of θ.

Figure 9A:
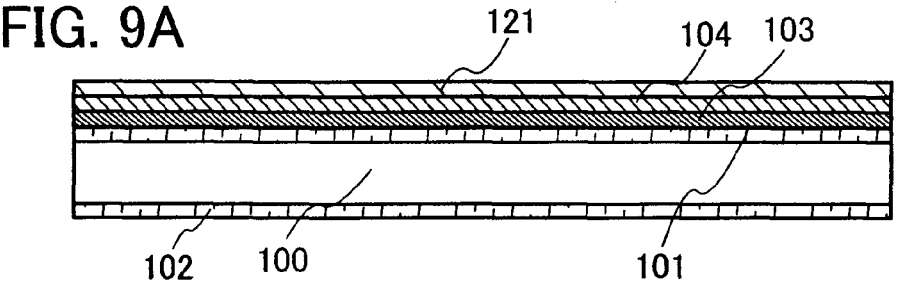
FIGS. 9A to 9C are a cross-sectional view, a perspective view, and a schematic diagram of a display device of the present invention.
Figure 9B:
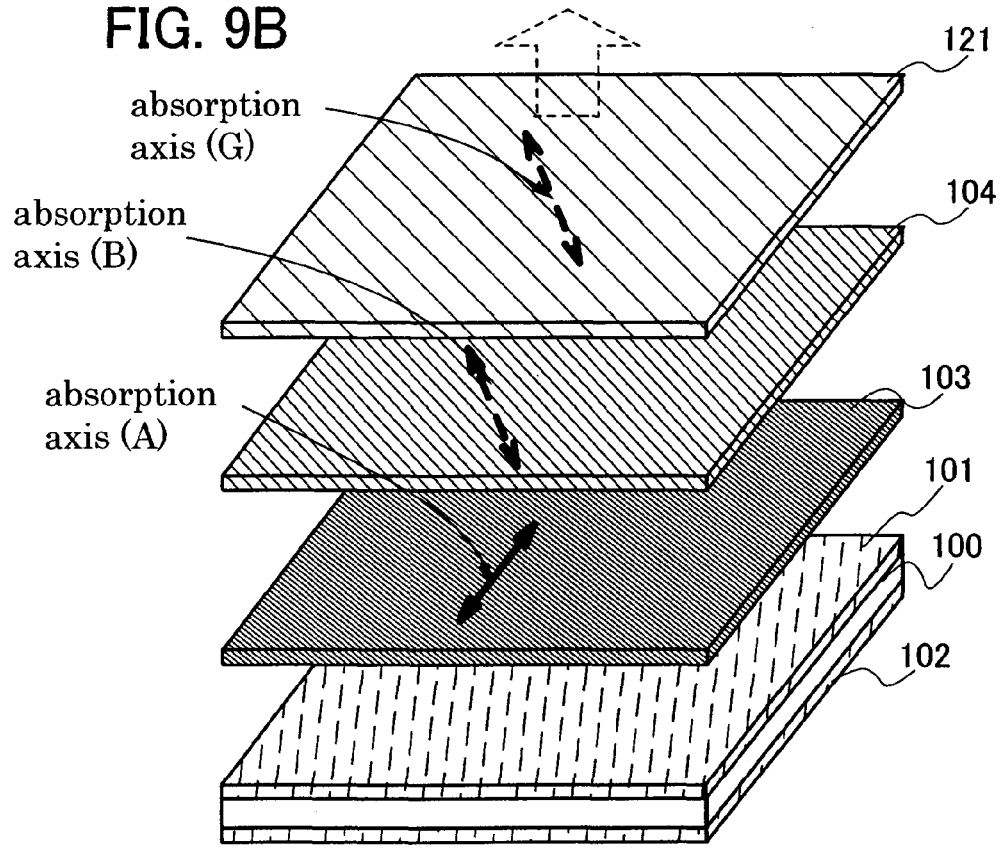
Figure 9C:
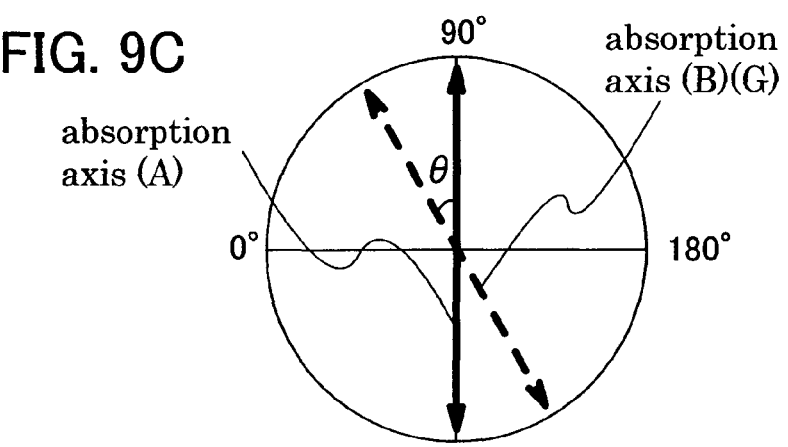

Note that the number of the stacked layers each including a polarizer having a different wavelength distribution of extinction coefficient from each other in FIGS. 3A to 3C is two; however, the present invention is not limited thereto and a multilayer structure having more than two layers may be used. An example of further stacking a fifth layer 121 including a polarizer over the first layer 103 including a polarizer and the second layer 104 including the polarizer is shown in FIGS. 11A to 11C. In FIGS. 11A and 11B, the fifth layer 121 including the polarizer has an absorption axis (G), and the absorption axis (G) is parallel to the absorption axis (B) of the second layer 104 including the polarizer, and deviated from the absorption axis (A) of the first layer 103 including the polarizer. In other words, as shown in FIG. 9C, the fifth layer 121 including the polarizer and the second layer 104 including the polarizer are stacked so that their absorption axes are in a parallel Nicols state.

Figure 10A:
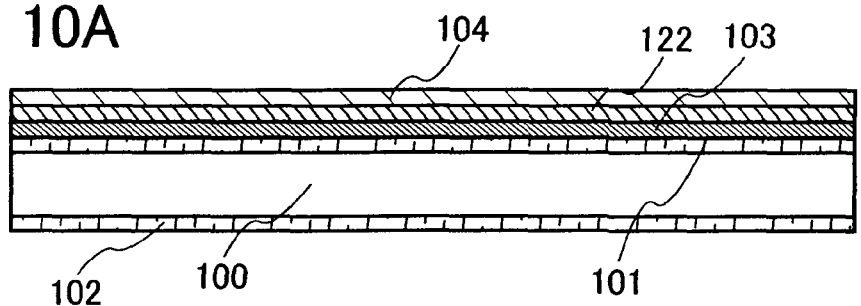
FIGS. 10A to 10C are a cross-sectional view, a perspective view, and a schematic diagram of a display device of the present invention.
Figure 10B:
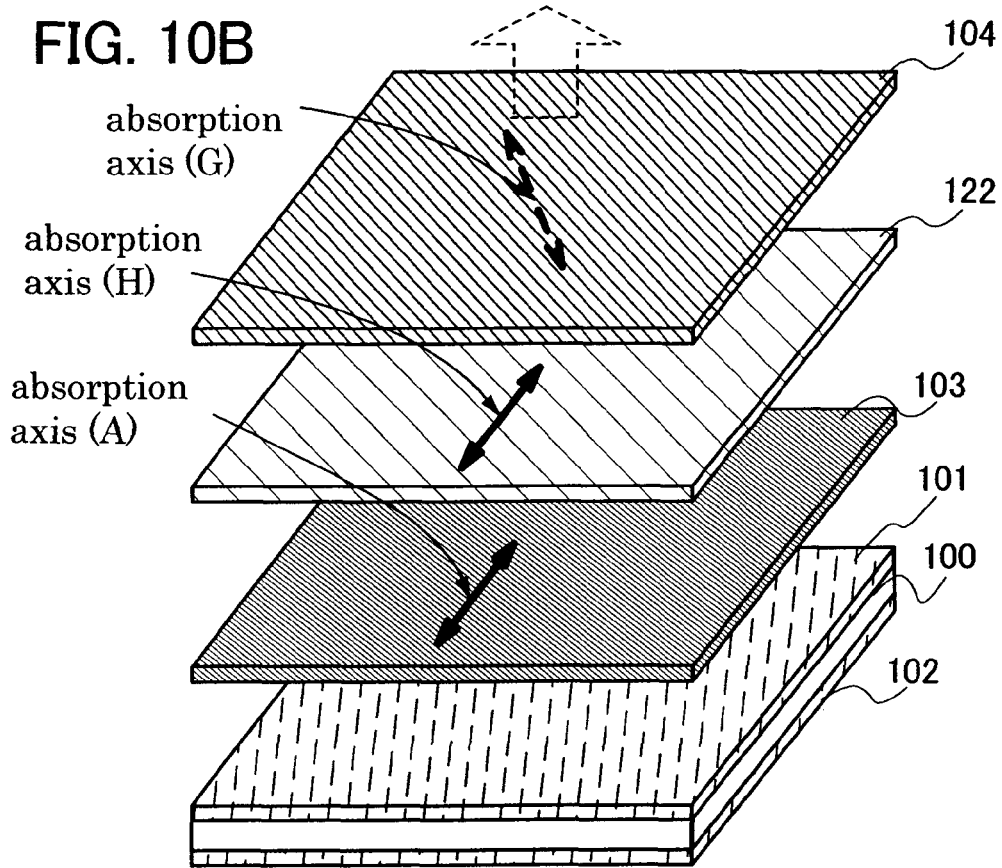
Figure 10C:
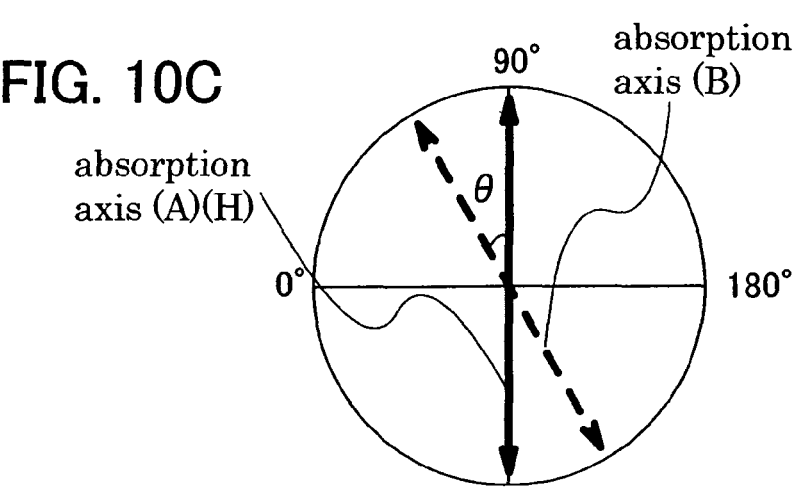

Further, a fifth layer including a polarizer may be provided between the first layer 103 including the polarizer and the second layer 104 including the polarizer in such a manner the fifth layer and the first layer 103 are in a parallel Nicols state. FIGS. 10A to 10C show an example in which a fifth layer 122 including a polarizer is stacked between the first layer 103 including the polarizer and the second layer 104 including the polarizer. In FIGS. 10A and 10B, the fifth layer 122 including the polarizer has an absorption axis (H), and the absorption axis (H) is parallel to the absorption axis (A) of the first layer 103 including the polarizer, and deviated from the absorption axis (B) of the second layer 104 including the polarizer. Accordingly, as shown in FIG. 10C, the fifth layer 122 including the polarizer, the first layer 103 including the polarizer, and the second layer 104 including the polarizer are stacked so that the absorption axes of the fifth layer 122 and the first layer 103 are in a parallel Nicols state, and the absorption axes of the fifth layer 122 and the second layer 104 are deviated by a deviated angle θ.

Further, the wavelength distribution of the extinction coefficient with respect to the absorption axis of the fifth layer 122 including the polarizer may be equal to or different from that with respect to the first layer 103 including the polarizer or the second layer 104 including the polarizer which is to be stacked together therewith. In this embodiment mode, the wavelength distribution of the extinction coefficient with respect to the absorption axis of the fifth layer 122 including the polarizer is different from that with respect to those of the first layer 103 including the polarizer and the second layer 104 including the polarizer. Thus, when the wavelength distributions of the extinction coefficients with respect to the absorption axes of the polarizers in the stacked layers are different, the wavelength range of light which can be absorbed can be extended; thus, even slight light leakage can be prevented.

As in this embodiment mode, the structure in which layers including polarizers are stacked over one side of a substrate can be applied to a display device where light can be extracted from one sides of a substrate.

Thus, the layers each including a polarizer having a different wavelength distribution of extinction coefficient from each other are provided so that their absorption axes are deviated from a parallel Nicols state, thereby reducing light leakage in the directions of the absorption axes. Thus, contrast ratio of the display device can be increased.

Embodiment Mode 4

This embodiment mode will describe a concept of a display device provided with a retardation plate in addition to layers each including a polarizing plate having a different wavelength distribution of extinction coefficient from each other with respect to the absorption axes, which are stacked on a viewing side unlike the above embodiment mode. The like parts or parts having like functions are denoted by the same reference numerals, and the description of them will not be repeated.

FIG. 4A is a cross-sectional view of a display device in which a retardation plate is provided between a substrate and layers including a polarizers which are stacked to be deviated from a parallel Nicols state, and FIG. 4B is a perspective view of the display device. In this embodiment mode, an example of a liquid crystal display device including a liquid crystal element as a display element will be described.

As shown in FIG. 3A, a layer 100 including a liquid crystal element is sandwiched between a first substrate 101 and a second substrate 102 which are disposed to face each other.

As shown in FIG. 4B, the first layer 103 including the polarizer and the second layer 104 including the polarizer are provided on the first substrate 101 side. Here, the first layer 103 including the polarizer and the second layer 104 including the polarizer are arranged to be deviated from a parallel Nicols state. In addition, a retardation plate 113 is provided between the first substrate 101 and the stacked layers each including the polarizer. In this embodiment mode, the wavelength distributions of the extinction coefficients of the polarizers in the first layer 103 and the second layer 104 with respect to the absorption axes are different from each other.

In this embodiment mode, a reflector plate may be provided in addition. The reflector plate can be provided by forming a pixel electrode from a highly reflective material on an outer side of the second substrate 102.

As shown in FIG. 4B, the first layer 103 including the polarizer having an absorption axis (A) and the second layer 104 including a polarizer having an absorption axis (B) are stacked so that their absorption axes are deviated from each other. Further, the absorption axis (A) of the polarizer included in the first layer 103 may preferably be arranged to be deviated from the slow axis of the retardation plate 113 by 45°. Thus, when layers including polarizers are stacked so that their absorption axes are deviated and a retardation plate is provided, contrast ratio can be increased.

Figure 12A:
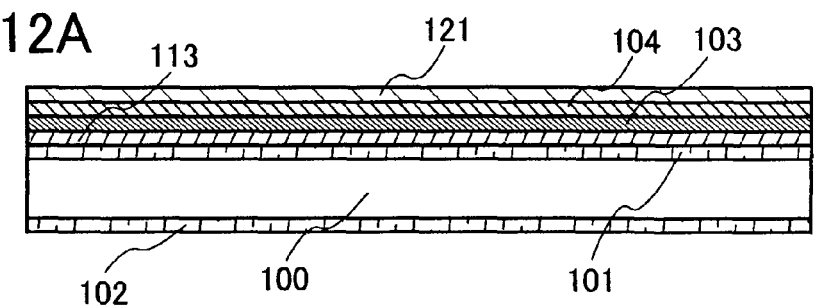
FIGS. 12A and 12B are a cross-sectional view and a perspective view respectively of a display device of the present invention.
Figure 12B:
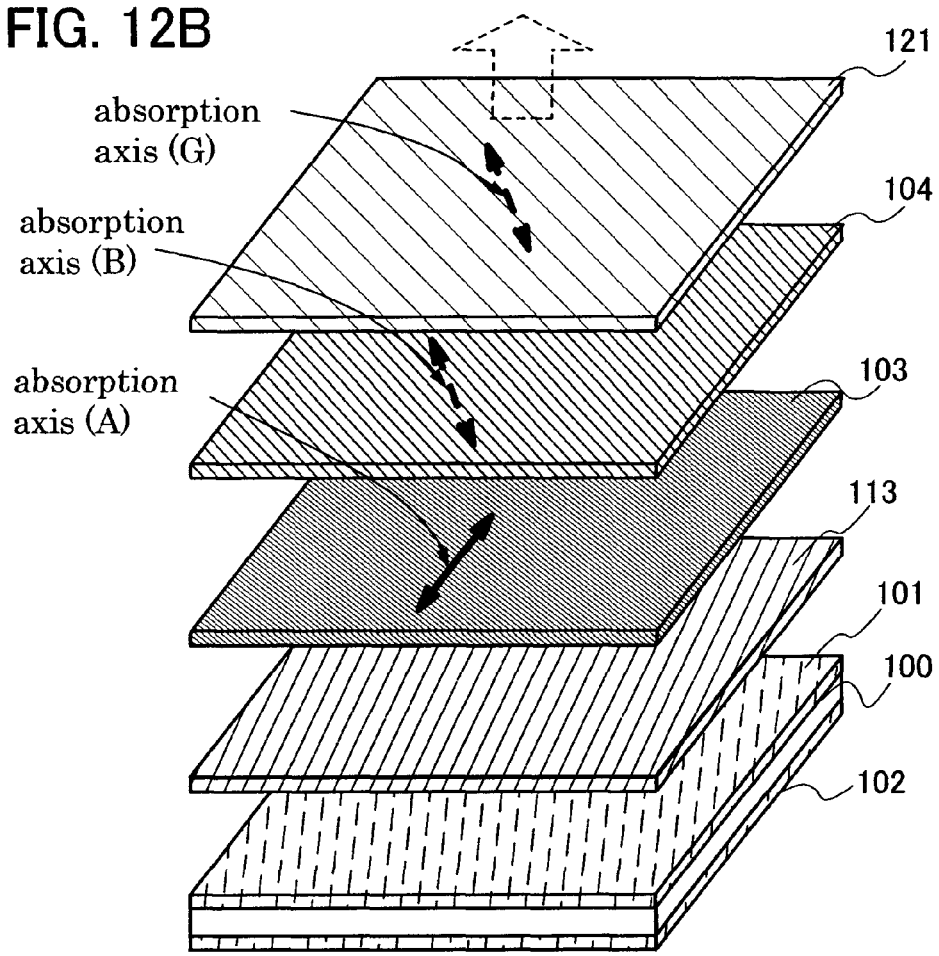

Note that the number of the stacked layers each including a polarizer having a different wavelength distribution of extinction coefficient from each other in FIGS. 4A and 4B is two; however, the present invention is not limited thereto and a multilayer structure having more than two layers may be used. An example of further stacking a fifth layer 122 including a polarizer over the first layer 103 including a polarizer and the second layer 104 including the polarizer is shown in FIGS. 12A to 12C. In FIGS. 12A and 12B, the fifth layer 122 including the polarizer has an absorption axis (G), and the absorption axis (G) is parallel to the absorption axis (B) of the second layer 104 including the polarizer, and deviated from the absorption axis (A) of the first layer 103 including the polarizer. In other words, the fifth layer 122 including the polarizer and the second layer 104 including the polarizer are stacked so that their absorption axes are in a parallel Nicols state.

Further, the wavelength distribution of the extinction coefficient with respect to the absorption axis of the fifth layer 122 including the polarizer may be equal to or different from that with respect to the first layer 103 including the polarizer or the second layer 104 including the polarizer which is to be stacked together therewith. In this embodiment mode, the wavelength distribution of the extinction coefficient with respect to the absorption axis of the fifth layer 122 including the polarizer is different from that with respect to those of the first layer 103 including the polarizer and the second layer 104 including the polarizer. Thus, when the wavelength distributions of the extinction coefficients with respect to the absorption axes of the polarizers in the stacked layers are different, the wavelength range of light which can be absorbed can be extended; thus, even slight light leakage can be prevented.

As in this embodiment mode, the structure in which layers including polarizers are stacked over one side of a substrate can be applied to a display device where light can be extracted from one sides of a substrate.

Thus, the layers each including a polarizer having a different wavelength distribution of extinction coefficient from each other are provided so that their absorption axes are deviated from a parallel Nicols state and a retardation plate is provided in addition, thereby reducing light leakage in the directions of the absorption axes. Thus, contrast ratio of the display device can be increased.

Embodiment Mode 5

In this embodiment mode, structures of polarizers having different wavelength distributions of extinction coefficients with respect to the absorption axes are different from each other which can be used for the present invention will be described with reference to FIGS. 13A to 13C.

In the present invention, a layer including a polarizer includes at least a polarizer having a specific absorption axis. A single layer polarizer, or a polarizer inserted between protective layers may be used. FIGS. 13A to 13C illustrate examples of layered structures of layers including polarizers in accordance with the present invention. In FIG. 13A, a layer including a polarizer having a protective layer 50a, a first polarizer 51, and a protective layer 50b is stacked together with a layer including a polarizer having a protective layer 50c, a second polarizer 52, and a protective layer 50d and the stack constitutes a layer including stacked polarizers. Thus, in the present invention, "stacked polarizers" includes a stack including polarizers in which a protective layer is interposed therebetween, where the polarizers are not stacked in contact with each other. Accordingly "a layer including stacked polarizers" may mean the whole stack including the layer including the polarizer having the protective layer 50a, the first polarizer 51, and the protective layer 50b and a layer including the polarizer having the protective layer 50c, the second polarizer 52, and the protective layer 50d. Further, in this specification, the layer including a polarizer having the protective layer 50a, the first polarizer 51, and the protective layer 50b is also referred to as a polarizing plate. Therefore, what is shown in FIG. 13A can also be referred to as a stack including polarizing plates. In FIG. 13A, the first polarizer 51 and the second polarizer 52 are stacked so that their absorption axes are deviated from each other. Further, wavelength distributions of extinction coefficients with respect to the absorption axes of the first polarizer 51 and the second polarizer 52 are different from each other.

Figure 13A:
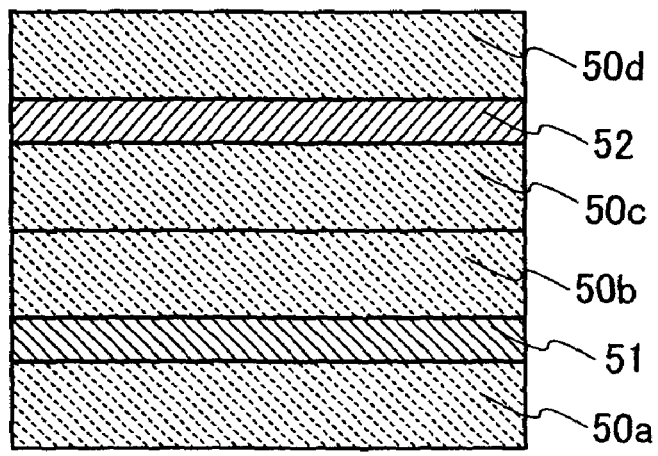
FIGS. 13A to 13C are cross-sectional views each illustrating a structure of a layer including a polarizer of the present invention.
Figure 13B:
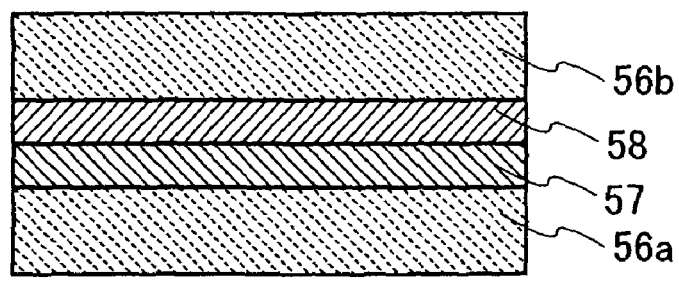

FIG. 13B shows a layer including stacked polarizers, which is a stack having a protective layer 56a, a first polarizer 57, a second polarizer 58, and a protective layer 56b. The structure shown in FIG. 13B can be expressed as "a stack of the protective layer 56a and the protective layer 56b is provided so that the stacked polarizers including the first polarizer 57 and the second polarizer 58 are provided therebetween", or as "a layer including a polarizer having the protective layer 56a and the polarizer 57 is stacked together with a layer including a polarizer having the polarizer 58 and the protective layer 56b". FIG. 13B shows an example in which polarizers are directly stacked without protective layers therebetween unlike in FIG. 13A. This structure has an advantage in that the layer including stacked polarizers which is a polarizing means can be made thinner, and the number of stacked protective layers may be small; thus, the process can be simplified at low cost. In FIG. 13B, the first polarizer 57 and the second polarizer 58 are stacked so that their absorption axes are deviated from each other. Further, the wavelength distributions of the extinction coefficients with respect to the absorption axes of the first polarizer 57 and the second polarizer 58 are different from each other.

Figure 13C:
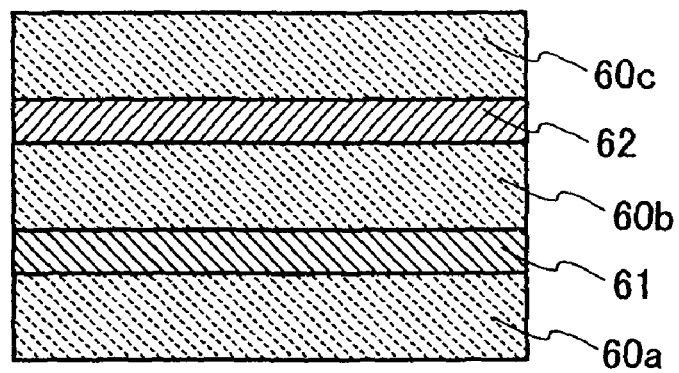

FIG. 13C shows a structure in which polarizers are stacked together with one protective layer therebetween, which is in between the structures shown in FIG. 13A and FIG. 13B. FIG. 13C shows a layer including stacked polarizers, which is a stack including a protective layer 60a, a first polarizer 61, a protective layer 60b, a second polarizer 62, and a protective layer 60c. Such a structure in which protective layers and polarizers are stacked alternately may be used. A polarizer in the present invention is in a film form, and can be referred to as a polarizing film or a polarizing layer. In FIG. 13C, the first polarizer 61 and the second polarizer 62 are stacked so that their absorption axes are deviated from each other. In addition, wavelength distributions of extinction coefficients with respect to the absorption axes of the first polarizer 61 and the second polarizer 62 are different from each other.

FIGS. 13A to 13C show examples of stacking two layers of polarizers; however, three layers of polarizers may be stacked, or a greater number of layers of polarizers may be provided. The manner of providing protective layers is also not limited to the structures shown in FIG. 13A to 13C. Further, a structure may be used in which the layer including the stacked polarizers in FIG. 13A is stacked together with the layer including the stacked polarizers in FIG. 13B. In the case of polarizers which easily deteriorate due to moisture or temperature change depending on the material of the polarizer, the polarizers can be protected by covering the polarizers as shown in FIG. 13A; thus, reliability can be improved. As shown in FIG. 1, in the case of providing polarizers so as to interpose a layer including a display element therebetween, the layered structure of the polarizers on a viewing side ma be the same as or different from the layered structure of the polarizers on the opposite side opposite with the display element in-between. Thus, the layered structure of the stacked polarizers may be set as appropriate depending on the properties of the polarizers and functions required for the display device. For example, in Embodiment Mode 1, each of the layers including the polarizers 103 and 104, and the layer including the polarizers 105 and 106 constitutes a layer including stacked polarizers; however, the layers may have any of the structures shown in FIGS. 13A to 13C, or one of the layers may have the structure in FIG. 13A and the other has the structure shown in FIG. 13B.

Further, the layers including stacked polarizers may have a structure in which bonding layers (adhesive layers) are provided between protective layers, between polarizers, and between the protective layer and the polarizer to bond them. In this case, the adhesion layers are required to have light-transmitting properties as the protective layers have. A retardation plate may be stacked together with a polarizer. The retardation plate also may have a structure in which a retardation film is provided between a pair of protective layers and may be stacked together with a polarizer with one or a plurality of protective layers in-between, or may be directly stacked together with the polarizer so that a protective layer, a retardation film, a polarizer, and a protective layer are sequentially stacked together. For example, in FIG. 13B, when the protective layer 56a is on a light-transmitting substrate side, a retardation film may be provided between the protective layer 56a and the polarizer 57, and another retardation film is provided between the light-transmitting substrate and the polarizer. Further, a more durable protective film or the like may be provided for example as a surface protective layer on the protective layer 50d. Further, an anti-reflective film which prevents reflection of external light on a screen surface or an antiglare film which prevents glare or dazzle on a screen may be provided. Further, when a layer including a polarizer (polarizing plate) is bonded to a substrate, an adhesion layer of an acrylic adhesive or the like may be used.

The polarizer transmits only light vibrating in a certain direction and absorbs other light. A uniaxially stretched resin film to which dichromatic pigment is adsorbed and oriented can be used. As the resin, PVA (polyvinyl alcohol) can be used. PVA has high transparency and intensity, and can be easily attached to TAC (triacetyl cellulose) that is used as a protective layer (also referred to as a protective film because of its shape). As the pigment, iodine-based pigment and dye-based pigment can be used. For example, in a case of iodine-based pigment, iodine having high dichroism is adsorbed as a high ion to a PVA resin film and stretched in a boric acid aqueous solution, whereby the iodine is arranged as a chain polymer, and a polarizer shows a high polarizing characteristic. On the other hand, dye-based pigment in which dye having high dichroism is used instead of iodine has superiority in heat resistance and durability.

The protective layer reinforces intensity of the polarizer and prevents deterioration due to the temperature and moisture. As the protective layer, a film such as a TAC (triacetyl cellulose) film, a COP (cyclic olefin polymer-based) film, a PC (polycarbonate) film can be used. TAC has transparency, low birefringence, and superiority in an adhesive property to PVA that is used for the polarizer. COP is a resin film having superiority in heat resistance, moisture resistance, and durability. Further, iodine-based pigment and dye-system pigment can be mixed to be used.

As for the layer including a polarizer, for example, an adhesive surface, TAC (triacetyl cellulose) that is a protective layer, a mixed layer of iodine and PVA (polyvinyl alcohol) that is a polarizer, and TAC that is a protective layer are sequentially stacked from a substrate side. The polarization degree can be controlled by the mixed layer of iodine and PVA (polyvinyl alcohol). Alternatively, an inorganic material may be used for a polarizer. The layer including a polarizer may be referred to as a polarizing plate because of its shape.

This embodiment mode can be used in combination with any one of the above embodiment modes.

Thus, polarizers having different wavelength distributions of extinction coefficients from each other are stacked so that their absorption axes are deviated from a parallel Nicols state, thereby reducing light leakage in the directions of the absorption axes. Thus, contrast ratio of the display device can be increased.

Embodiment Mode 6

In this embodiment mode, a structure of a liquid crystal display device having a pair of stacked layers each including a polarizer having different wavelength distribution of extinction coefficient with respect to the absorption axes with each other will be explained, in which polarizers of at least one of the pars of the stacked layers each including a polarizer are arranged so that the transmission axes are deviated from each other.

Figure 16A:
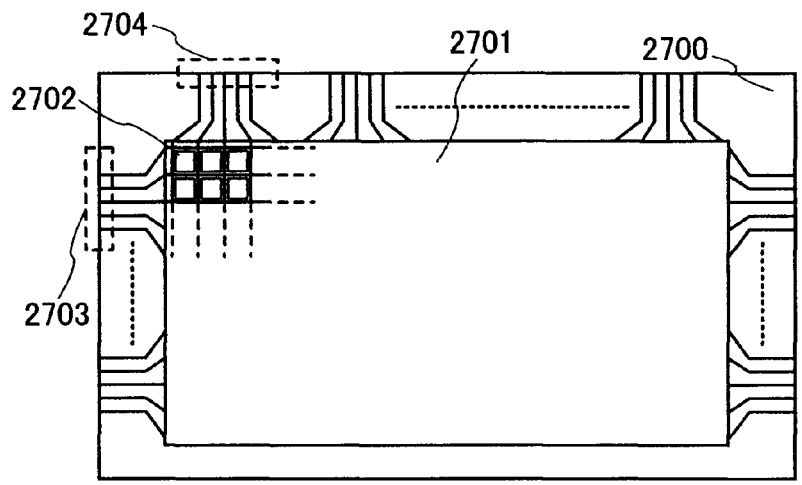
FIGS. 16A to 16C are top views each showing a display device of the present invention.

FIG. 16A is a top view showing a structure of a display panel in accordance with the present invention, where a pixel portion 2701 in which pixels 2702 are arranged in matrix, a scanning line input terminal 2703, and a signal line input terminal 2704 are formed over a substrate 2700 having an insulating surface. The number of pixels may be provided according to various standards: the number of pixels of XGA for RGB full-color display may be 1024×768×3 (RGB), that of UXGA for RGB full-color display may be 1600×1200×3 (RGB), and that corresponding to a full-speck high vision for RGB full-color display may be 1920×1080×3 (RGB).

The pixels 2702 are arranged in matrix by intersecting scanning lines extended from the scanning line input terminal 2703 with signal lines extended from the signal line input terminal 2704. Each pixel 2702 is provided with a switching element and a pixel electrode layer connected to the switching element. A typical example of the switching element is a TFT. A gate electrode layer side of the TFT is connected to the scanning line, and a source or drain side thereof is connected to the signal line, thereby each pixel can be controlled independently by a signal inputted from the external.

Figure 17A:
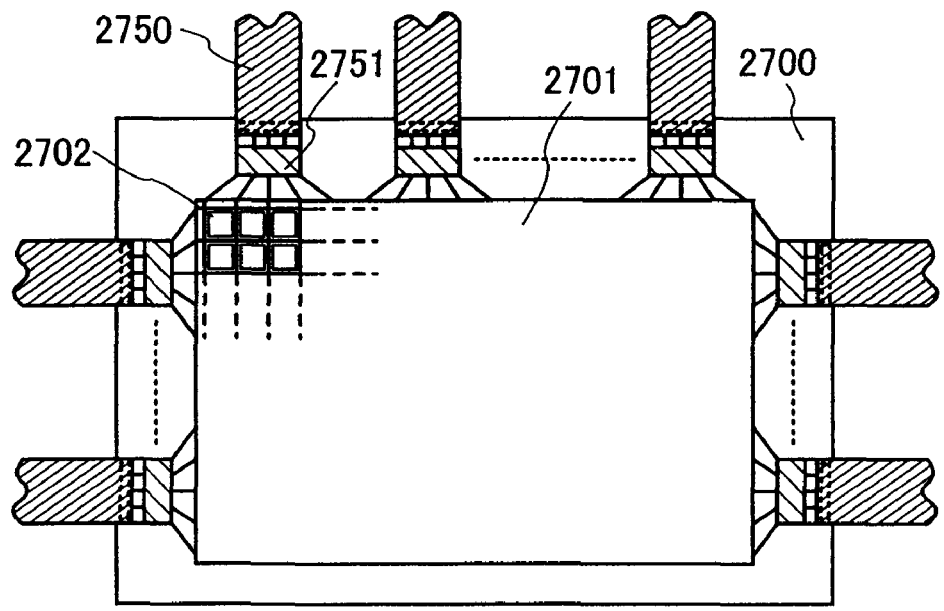
FIGS. 17A and 17B are top views each showing a display device of the present invention.
Figure 17B:
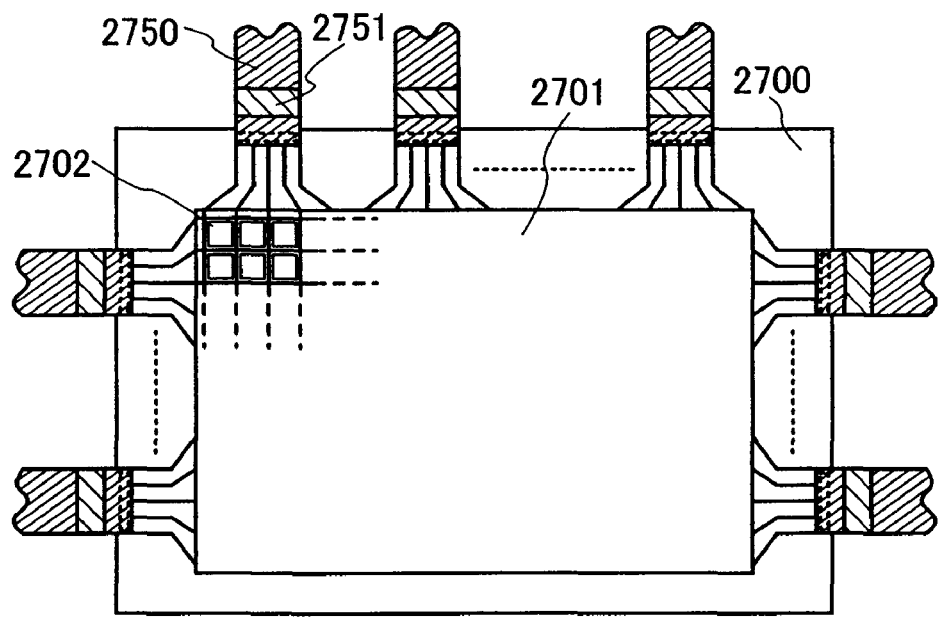

FIG. 16A shows a structure of the display panel in which signals inputted to a scanning line and a signal line are controlled by an external driver circuit. Alternatively, driver ICs 2751 may be mounted on the substrate 2700 by COG (Chip on Glass) as shown in FIG. 17A. Further, the driver ICs may also be mounted by TAB (Tape Automated Bonding) as shown in FIG. 17B. The driver ICs may be one formed over a single crystalline semiconductor substrate or may be a circuit that is formed using a TFT over a glass substrate. In FIGS. 17A and 17B, each driver IC 2751 is connected to an FPC (Flexible printed circuit) 2750.

Figure 16B:
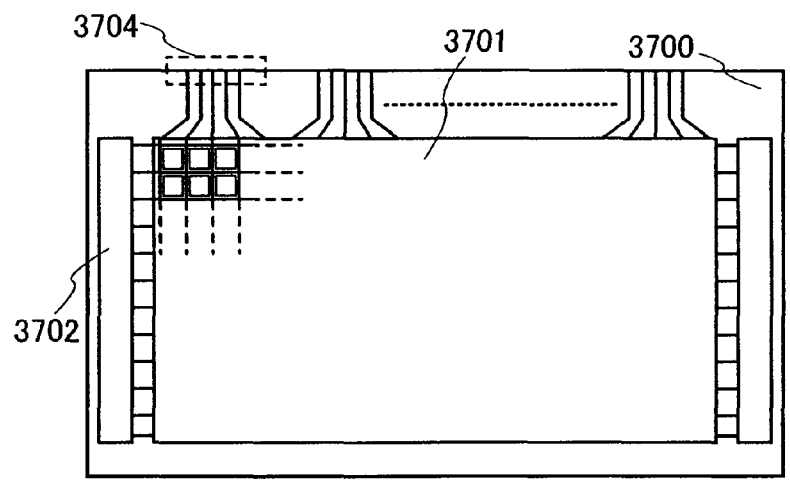
Figure 16C:
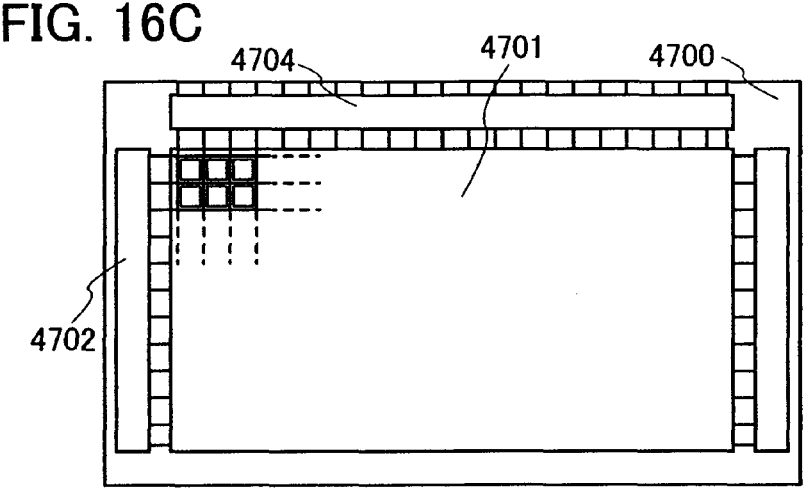

Further, in the case where a TFT provided in a pixel is formed using a semiconductor having crystallinity, a scanning line driver circuit 3702 can also be formed over a substrate 3700 as shown in FIG. 16B. In FIG. 16B, a pixel portion 3701 connected to a signal line input terminal 3704 is controlled by an external driver circuit similarly to that in FIG. 16A. In a case where a TFT provided in a pixel is formed using a polycrystalline (microcrystalline) semiconductor, a single crystalline semiconductor, or the like with high mobility, a pixel portion 4701, a scanning line driver circuit 4702, and a signal line driver circuit 4704 can be formed over a substrate 4700 in an integrated manner in FIG. 16C.

Figure 14A:
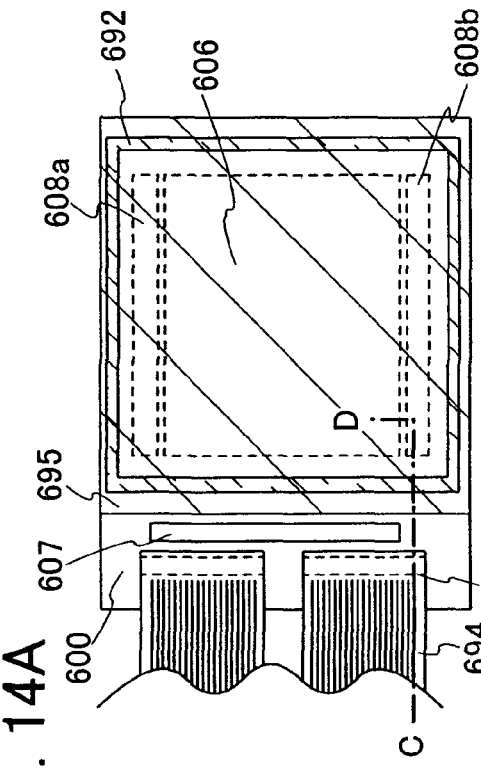
FIGS. 14A and 14B are a top view and a cross-sectional view of a display device of the present invention.
Figure 14B:
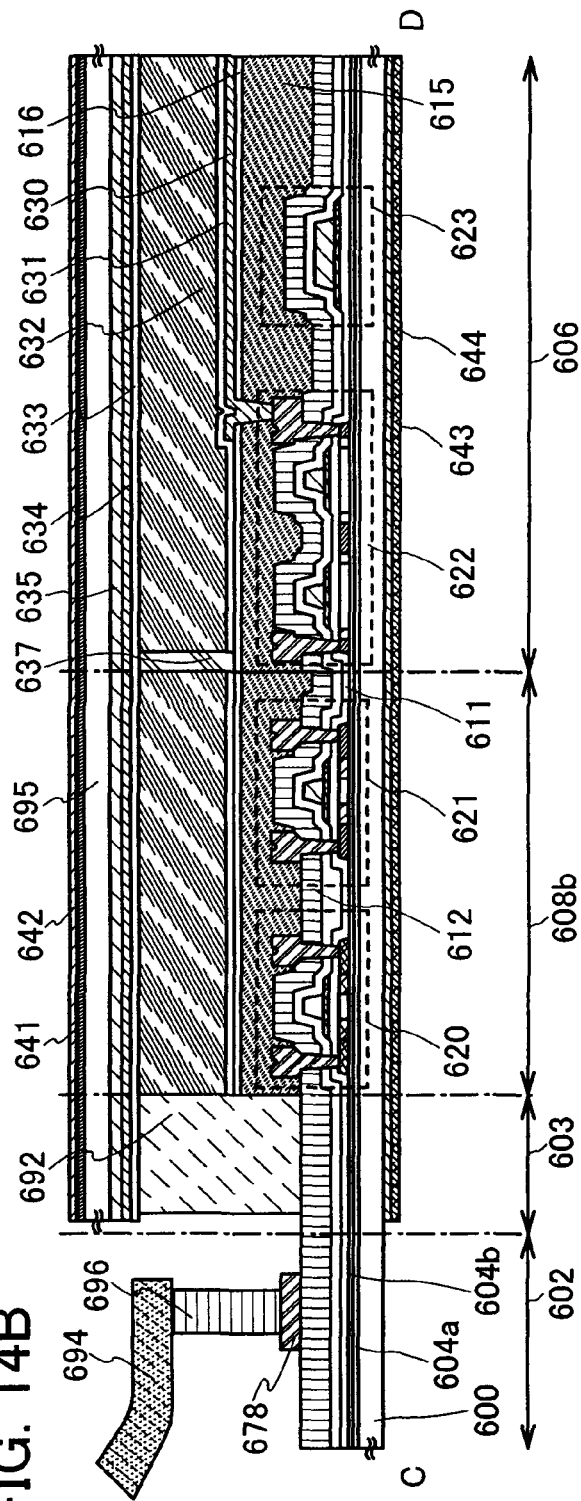

FIG. 14A is a top view of a liquid crystal display device that has a stacked layer including a polarizer, and FIG. 14B is a cross-sectional view taken along a line C-D of FIG. 14A.

As shown in FIG. 14A, a pixel portion 606, a driver circuit area 608a which is a scan line driver circuit, and a driver circuit area 608b which is a scan line driver circuit are sealed with a sealant 692 between a substrate 600 and an opposite substrate 695. A driver circuit area 607 which is a signal line driver circuit formed by an IC driver is provided over the substrate 600. The pixel portion 606 is provided with a transistor 622 and a capacitor element 623, and the driver circuit area 608b is provided with a driver circuit including a transistor 620 and a transistor 621. An insulating substrate similar to that of the above embodiment mode can be applied to the substrate 600. It is a concern that a substrate made from a synthetic resin generally has a lower allowable heat resistance temperature compared to other substrates; however, it can be employed by being deviated after a manufacturing process using a substrate with higher heat resistance.

In the pixel portion 606, the transistor 622 that is to be a switching element through base insulating films 604a and 604b is provided. In this embodiment mode, a multi-gate thin film transistor (TFT) is used for the transistor 622, which includes a semiconductor layer having an impurity region serving as a source region and a drain region, a gate insulating layer, a gate electrode layer having a stacked-layer structure made of two layers, a source electrode layer, and a drain electrode layer. The source electrode layer or the drain electrode layer is electrically connected so as to be in contact with the impurity region of the semiconductor layer and a pixel electrode layer 630. The thin film transistor can be manufactured by various methods. For example, a crystalline semiconductor film is applied as an active layer. A gate electrode is provided over the crystalline semiconductor film through a gate insulating film. An impurity element can be added to the active layer using the gate electrode. Addition of the impurity element using the gate electrode makes it unnecessary to form a mask for addition of the impurity element. The gate electrode can have either a single-layer structure or a stacked-layer structure. The impurity region can be made a high concentration impurity region or a low concentration impurity region by controlling the concentration thereof. A structure of such a thin film transistor having such a low concentration impurity region is referred to as an LDD (Lightly doped drain) structure. In addition, the low concentration impurity region can be formed to be overlapped with the gate electrode. A structure of such a thin film transistor is referred to as a GOLD (Gate Overlapped LDD) structure. Polarity of the thin film transistor is to be an n-type by using phosphorus (P) or the like in the impurity region. When polarity of the thin film transistor is to be a p-type, boron (B) or the like may be added. After that, an insulating film 611 and an insulating film 612 covering the gate electrode and the like are formed. A dangling bond of the crystalline semiconductor film can be terminated by a hydrogen element mixed into the insulating film 611 (and the insulating film 612).

In order to improve planarity, an insulating film 615 and an insulating film 616 may be formed as an interlayer insulating film. For the insulating films 615 and 616, an organic material, an inorganic material, or a stacked structure thereof can be used. The insulating films 615 and 616 can be formed from a material selected from silicon oxide, silicon nitride, silicon oxynitride, silicon nitride oxide, aluminum nitride, aluminum oxynitride, aluminum nitride oxide or aluminum oxide containing a larger amount of nitrogen content than oxygen content, diamond like carbon (DLC), polysilazane, carbon containing nitrogen (CN), PSG (phosphosilicate glass), BPSG (borophosphosilicate glass), alumina, and a substance containing another inorganic insulating material. As the organic material that may be either photosensitive or nonphotosensitive, polyimide, acryl, polyamide, polyimide amide, resist, benzocyclobutene, a siloxane resin, or the like can be used. It is to be noted that the siloxane resin corresponds to a resin including a Si—O—Si bond. Siloxane has a skeleton structure of a bond of silicon (Si) and oxygen (O). As for a substituent, an organic group containing at least hydrogen (such as an alkyl group or aromatic hydrocarbon) is used. As for a substituent, a fluoro group may be used. Further, as for a substituent, an organic group containing at least hydrogen and a fluoro group may be used.

The pixel portion and the driver circuit area can be formed in an integrated manner over the same substrate by using the crystalline semiconductor film. In this case, the transistor in the pixel portion and the transistor in the driver circuit area 608b are concurrently formed. The transistor used in the driver circuit area 608b forms a CMOS circuit. Although a thin film transistor including a CMOS circuit has a GOLD structure, an LDD structure such as the transistor 622 may be employed.

A structure of the thin film transistor in the pixel portion is not limited to this embodiment mode, and the thin film transistor in the pixel portion may have a single-gate structure in which one channel formation region is formed, a double-gate structure in which two channel formation regions are formed, or a triple-gate structure in which three channel formation regions are formed. A thin film transistor in the peripheral driver circuit area may have a single-gate structure, a double-gate structure, or a triple-gate structure.

Further, a thin film transistor is not limited to the manufacturing method shown in this embodiment mode. The thin film transistor may have a top-gate structure (such as a forward stagger type), a bottom-gate structure (such as an inverted staggered type), a dual-gate structure in which two gate electrode layers are arranged above and below a channel formation region through a gate insulating film, or some other structures.

Next, an insulating layer 631 referred to as an orientation film is formed by a printing method or a spin coating method so as to cover the pixel electrode layer 630 and the insulating film 616. The insulating layer 631 can be selectively formed when a screen printing method or an off-set printing method is used. After that, rubbing treatment is performed. When a liquid crystal mode, for example, a VA mode, is employed, there are cases when rubbing treatment is not performed. An insulating layer 633 serving as an orientation film is similar to the insulating layer 631. Subsequently, the sealant 692 is formed in the peripheral region where the pixel is formed by a droplet discharging method.

Then, the opposite substrate 695 provided with the insulating layer 633 serving as an orientation film, a conductive layer 634 serving as an opposite electrode, and a colored layer 635 serving as a color filter are attached to the substrate 600 that is a TFT substrate through a spacer 637. A liquid crystal layer 632 is provided in a space between the substrate 600 and the opposite substrate 695. After that, a first layer 641 including a polarizer and a second layer 642 including a polarizer are provided on an outer side of the opposite substrate 695. A third layer 643 including a polarizer and a fourth layer 644 including a polarizer are provided on a side opposite to a surface having an element of the substrate 600. The layer 643 including a polarizer and the layer 644 including a polarizer are provided on a surface of the substrate opposite to the surface provided with an element. Filler may be mixed into the sealant, and the opposite substrate 695 may be provided with a shielding film (black matrix) or the like. For a case of full-color display of the liquid crystal display device, the color filter or the like may be formed from a material emitting a red color (R), a green color (G), and blue color (B). For a case of mono-color display, the color filter or the like may be formed from a material emitting at least one color.

When RGB light emitting diodes (LEDs) or the like are arranged in a backlight and a successive additive color mixture method (a field sequential method) that conducts color display by time division is employed, there is a case when a color filter is not provided. The black matrix may also be provided to reduce the reflection of outside light by the wires of the transistor and the CMOS circuit. Therefore, the black matrix is provided so as to be overlapped with the transistor and the CMOS circuit. It is to be noted the black matrix may also be provided so as to be overlapped with the capacitor element. This is because the black matrix can prevent reflection due to a metal film forming the capacitor element.

As a method for forming the liquid crystal layer, a dispenser method (dripping method) or a dipping method (pumping method) in which liquid crystal is injected using a capillary phenomenon after attaching the substrate 600 having an element and the opposite substrate 695 may be used. A dripping method may be applied when a large-sized substrate to which it is difficult to apply an injecting method is used.

A spacer may be provided in such a way that particles each having a size of several μ meters are sprayed. In this embodiment mode, a method is employed in which a resin film is formed over the entire surface of the substrate and the resin film is subjected to an etching process. The material of such a spacer is applied by a spinner and then light-exposed and developed so that a predetermined pattern is formed. Moreover, the spacer is heated at 150° C. to 200° C. in a clean oven or the like to be hardened. The thus manufactured spacer can have various shapes depending on the conditions of light exposure and development processes. It is preferable that the spacer have a columnar shape with a flat top so that mechanical intensity for the liquid crystal display device can be secured when the opposite substrate is attached. The shape can be conic, pyramidal, or the like without any particular limitation.

A connection portion is formed in order to connect an external wiring board with the inside of the display device formed in accordance with the above-described steps. An insulating layer in the connection portion is removed by ashing treatment using an oxygen gas under atmospheric pressure or near atmospheric pressure. This treatment uses an oxygen gas and one or more of hydrogen, $CF_4$, $NF_3$, $H_2O$, and $CHF_3$. In this step, the ashing treatment is performed after sealing with the use of the opposite substrate in order to prevent damage or breaking due to static electricity. If the effect by static electricity is little, the ashing treatment may be carried out at any timing.

Subsequently, a terminal electrode layer 678 electrically connected to the pixel portion is provided with an FPC 694, which is a wiring board for connection, through an anisotropic conductive layer 696. The FPC 694 is to transmit external signals or potential. Through the above steps, a liquid crystal display device having a display function can be manufactured.

A wiring included in the transistor, the gate electrode layer, the pixel electrode layer 630, and the conductive layer 634 that is an opposite electrode can be formed from a material selected from indium tin oxide (ITO), indium zinc oxide (IZO) in which zinc oxide (ZnO) is mixed with indium oxide, conductive materials in which silicon oxide ($SiO_2$) is mixed with indium oxide, organoindium, organotin, indium oxide containing tungsten oxide, indium zinc oxide containing tungsten oxide, indium oxide containing titanium oxide, or indium tin oxide containing titanium oxide; a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), or copper (Cu); an alloy of such metals; or metal nitride thereof.

The substrate 600 is provided with a stacked layer of the third layer 643 including a polarizer and the fourth layer 644 including a polarizer. The opposite substrate 695 is provided with a stacked layer of the first layer 641 including a polarizer and the second layer 642 including a polarizer. The third layer 643 including a polarizer and the fourth layer 644 including a polarizer, which are provided on the backlight side, are arranged to be in a parallel Nicols state. The first layer 641 including a polarizer and the second layer 642 including a polarizer, which are provided on the viewing side, are arranged so as to deviate from a parallel Nicols state. The absorption axes of the polarizers of one of a pair of the stacked polarizers, preferably the stacked polarizer on the viewing side, are deviated, which is a feature of the present invention. Accordingly, the contrast ratio can be enhanced. In this embodiment mode, wavelength distributions of extinction coefficients with respect to the absorption axes of the first layer 641 including a polarizer and the second layer 642 including a polarizer are different from each other. Similarly, wavelength distributions of extinction coefficients with respect to the absorption axes of the third layer 643 including a polarizer and the fourth layer 644 including a polarizer are different from with each other.

The stacked layer of the third layer 643 including a polarizer and the fourth layer 644 including a polarizer and the stacked layer of the first layer 641 including a polarizer and the second layer 642 including a polarizer are bonded to the substrate 600 and the opposite substrate 695, respectively. A retardation film may be stacked to be interposed between the stacked layer including a polarizer and the substrate.

The stacked polarizers having different wavelength distributions of extinction coefficients are provided so that the absorption axes thereof are arranged to be deviated from each other so as to deviate in such a display device, thereby the contrast ratio can be enhanced. In the present invention, a plurality of polarizers can be made a polarizer having a staked-layer structure, which is different from a structure in which a thickness of a polarizer is simply made thick. The stacked polarizer deviates, thereby the contrast ratio can be enhanced as compared with that of the structure in which a thickness is simply made thick.

This embodiment mode can be freely combined with the above embodiment modes.

Embodiment Mode 7

In this embodiment mode, a liquid crystal display device using a thin film transistor that includes an amorphous semiconductor film in addition to stacked layers each including a polarizer having a different wavelength distribution of extinction coefficient from each other, which is different from that of the above embodiment modes, will be explained.

Figure 15:
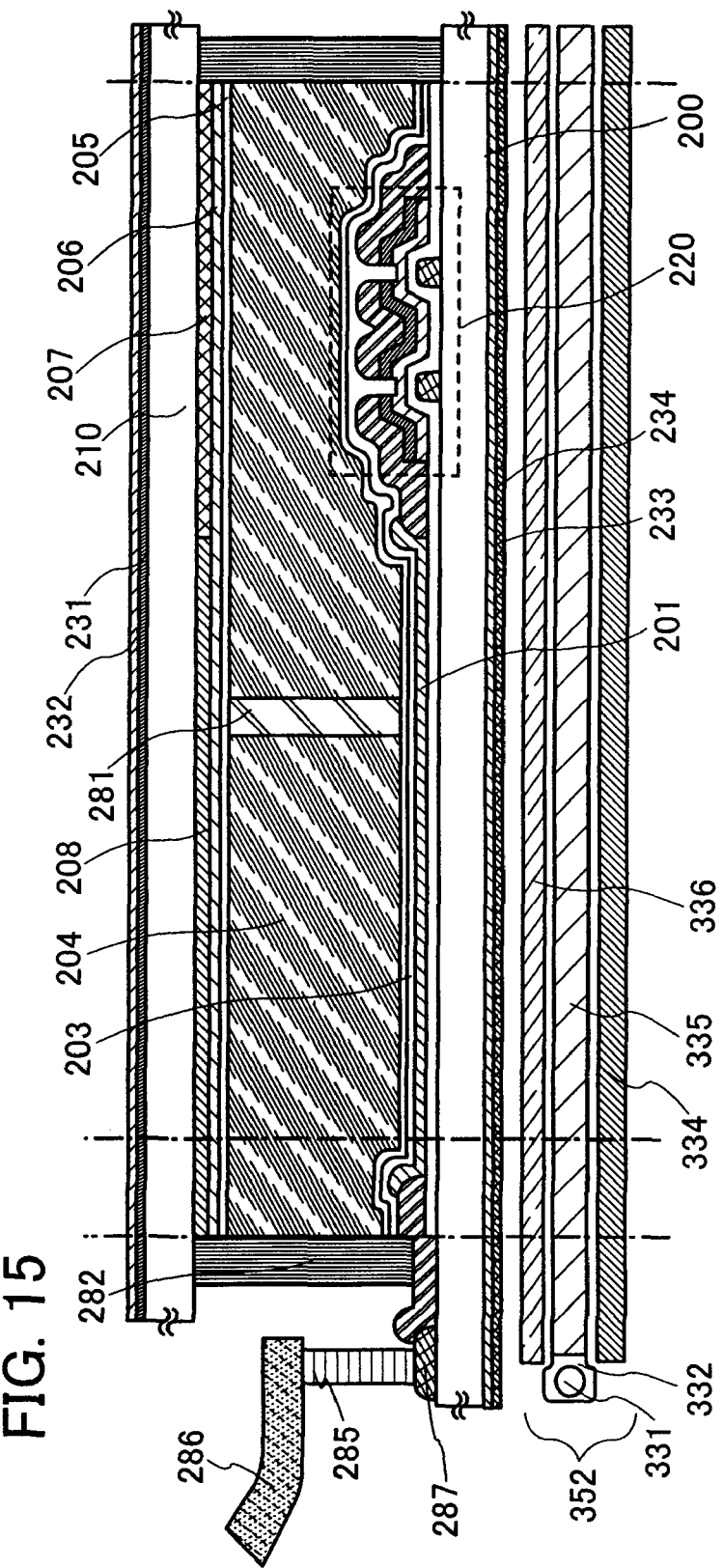
FIG. 15 is a cross-sectional view of a display device of the present invention.

A display device shown in FIG. 15 includes a transistor 220 that is an inversely staggered thin film transistor in a pixel portion, a pixel electrode layer 201, an insulating layer 203, a liquid crystal layer 204, a spacer 281, an insulating layer 205, an opposite electrode layer 206, a color filter 208, a black matrix 207, an opposite substrate 210, a first layer 231 including a polarizer, a second layer 232 including a polarizer, a third layer 233 including a polarizer, and a fourth layer 234 including a polarizer over a substrate 200. In addition, the display device also includes a sealant 282, a terminal electrode layer 287, an anisotropic conductive layer 285, and an FPC 286 in a sealing region.

A gate electrode layer, a source electrode layer, and a drain electrode layer of the transistor 220 that is the inversely staggered thin film transistor manufactured in this embodiment mode are formed by a droplet discharging method. The droplet discharging method is a method for discharging a composition containing a liquid conductive material and solidifying the composition by drying and baking, thereby a conductive layer and an electrode layer are formed. By discharging a composition containing an insulating material and solidifying it by drying and baking, an insulating layer can also be formed. By the droplet discharging method, a constituent of a display device such as a conductive layer or an insulating layer can be selectively formed, which can simplify the manufacturing steps and reduce the loss of materials; thus, a display device can be manufactured at low cost with high productivity.

In this embodiment mode, an amorphous semiconductor is used as a semiconductor layer, and a semiconductor layer having one conductivity may be formed as needed. In this embodiment mode, a semiconductor layer and an n-type amorphous semiconductor layer as a semiconductor layer having one conductivity are stacked. Further, an NMOS structure of an n-channel thin film transistor in an n-type semiconductor layer, a PMOS structure of a p-channel thin film transistor in which a p-type semiconductor layer is formed, or a CMOS structure of an n-channel thin film transistor and a p-channel thin film transistor can be manufactured. In this embodiment mode, the transistor 220 is an n-channel inversely staggered thin film transistor. Furthermore, a channel protective-type inversely staggered thin film transistor provided with a protective layer over a channel region of the semiconductor layer can be used.

In addition, in order to impart conductivity, an n-channel thin film transistor and a p-channel thin film transistor can also be formed by adding an element imparting conductivity by doping and forming an impurity region in the semiconductor layer. Instead of forming the n-type semiconductor layer, conductivity may be imparted to the semiconductor layer by performing plasma treatment with a $PH_3$ gas.

A semiconductor can be formed using an organic semiconductor material by a printing method, a spray method, a spin coating method, a droplet discharging method, a dispenser method, or the like. In this case, since the above etching step is not necessary, the number of steps can be reduced. As an organic semiconductor, a low molecular organic material, a high molecular organic material, an organic coloring matter, a conductive high molecular organic material, or the like can be employed. A π-conjugated high molecular material with the skeleton including conjugated double bonds is desirably used as an organic semiconductor material in the present invention. Typically, a soluble high molecular material such as polythiophene, polyfluorene, poly(3-alkyl thiophene), a polythiophene derivative, or pentacene can be used.

Next, a structure of a backlight unit 352 is explained. The backlight unit 352 includes a cold cathode tube, a hot cathode tube, a light emitting diode, an inorganic EL, or an organic EL as a light source 331 that emits light, a lamp reflector 332 to effectively lead light to a light conducting plate 335, the light conducting plate 335 by which light is totally reflected and light is led to the entire surface of the display panel, a diffusing plate 336 for reducing variations in brightness, and a reflector plate 334 for reusing light leaked under the light conducting plate 335.

A control circuit for controlling the luminance of the light source 331 is connected to the backlight unit 352. The luminance of the light source 331 can be controlled by a signal supplied from the control circuit.

A stacked layer of the third layer 233 including a polarizer and the fourth layer 234 including a polarizer are provided between the substrate 200 and the backlight unit 352. A stacked layer of the first layer 231 including a polarizer and the second layer 232 including a polarizer are stacked on the opposite substrate 210. The third layer 233 including a polarizer and the fourth layer 234 including a polarizer, which are provided on the backlight side, are arranged to be in a parallel Nicols state. The first layer 231 including a polarizer and the second layer 232 including a polarizer, which are provided on the viewing side, are arranged so as to deviate from a parallel Nicols state. In such a structure, one of a pair of the stacked layers each including a polarizer, preferably the stacked polarizers on the viewing side are deviated, which is a feature of the present invention. Accordingly, the contrast ratio can be enhanced. In this embodiment mode, wavelength distributions of extinction coefficients with respect to absorption axes of the first layer 231 including a polarizer and the second layer 232 including a polarizer are different from each other. Similarly, wavelength distributions of extinction coefficients with respect to absorption axes of the third layer 233 including a polarizer and the fourth layer 234 including a polarizer are different from each other.

The stacked layer of the third layer 233 including a polarizer and the fourth layer 234 including a polarizer and the stacked layer of the first layer 231 including a polarizer and the second layer 232 including a polarizer are bonded to the substrate 200 and the opposite substrate 210, respectively. Further, a retardation film may be stacked to be interposed between the stacked layer including a polarizer and the substrate.

The stacked polarizers having different wavelength distributions of extinction coefficients are provided and arranged so that the absorption axes thereof are deviated in such a liquid crystal display device, thereby the contrast ratio can be enhanced. In the present invention, a plurality of polarizers can be made a layer including polarizer having a staked-layer structure, which is different from a structure in which a thickness of a polarizer is simply made thick. The stacked polarizer deviates, thereby the contrast ratio can be enhanced as compared with that of the structure in which a thickness is simply made thick.

This embodiment mode can be freely combined with the above embodiment modes.

Embodiment Mode 8

In this embodiment mode, operation of each circuit or the like included in a display device will be explained.

Figure 24A:
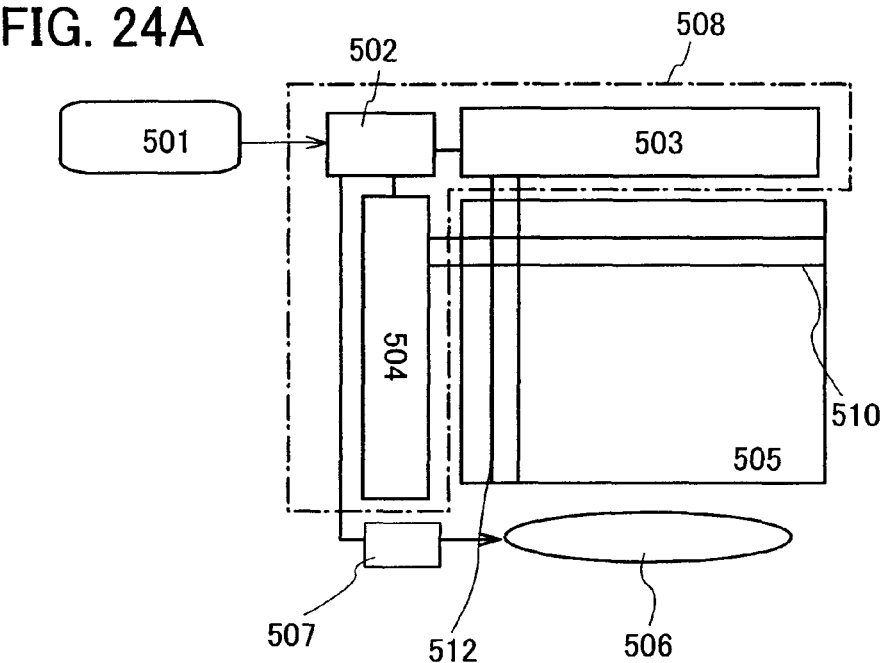
FIGS. 24A to 24C are block diagrams illustrating a display device of the present invention.

FIG. 24A shows a system block view of a pixel portion 505 and a driver circuit portion 508 of a display device.

In the pixel portion 505, a plurality of pixels is included, and a switching element is provided in each intersection region of a signal line 512 and a scanning line 510 that becomes a pixel. By the switching elements, application of a voltage to control tilt of liquid crystal molecules can be controlled. Such a structure where switching elements are provided in each intersecting region is referred to as an active type. The pixel portion of the present invention is not limited to such an active type, and may have a passive type structure instead. The passive type can be formed by a simple process because each pixel does not have a switching element.

The driver circuit portion 508 includes a control circuit 502, a signal line driver circuit 503, and a scanning line driver circuit 504. The control circuit 502 has a function to control a gray scale in accordance with display contents of the pixel portion 505. Therefore, the control circuit 502 inputs a signal generated to the signal line driver circuit 503 and the scanning line driver circuit 504. When a switching element is selected through a scanning line 510 in accordance with the scanning line driver circuit 504, a voltage is applied to a pixel electrode in a selected intersecting region. The value of this voltage is determined based on a signal inputted from the signal line driver circuit 503 through the signal line.

Further, in the control circuit 502, a signal controlling electric power supplied to a lighting unit 506 is generated, and the signal is inputted to a power supply 507 of the lighting unit 506. The backlight unit shown in the above embodiment mode can be used for the lighting unit. It is to be noted that the lighting unit includes a front light besides a backlight. A front light is a platy light unit formed of an illuminant and a light conducting body, which is attached to a front side of a pixel portion and illuminates the whole place. By such a lighting unit, the pixel portion can be evenly illuminated with low power consumption.

Figure 24B:
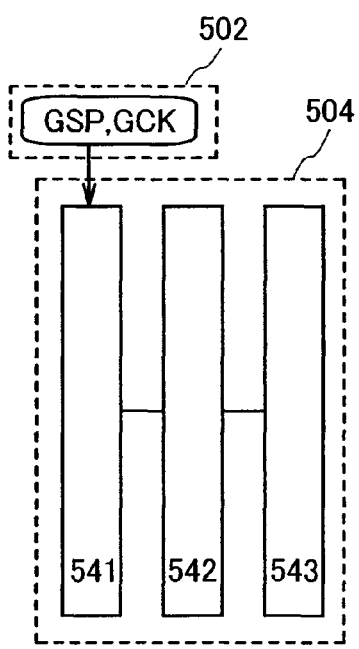

As shown in FIG. 24B, the scanning line driver circuit 504 includes circuits serving as a shift register 541, a level shifter 542, and a buffer 543. Signals such as a gate start pulse (GSP) and a gate clock signal (GCK) are inputted to the shift register 541. It is to be noted that the scanning line driver circuit of the present invention is not limited to the structure shown in FIG. 24B.

Figure 24C:
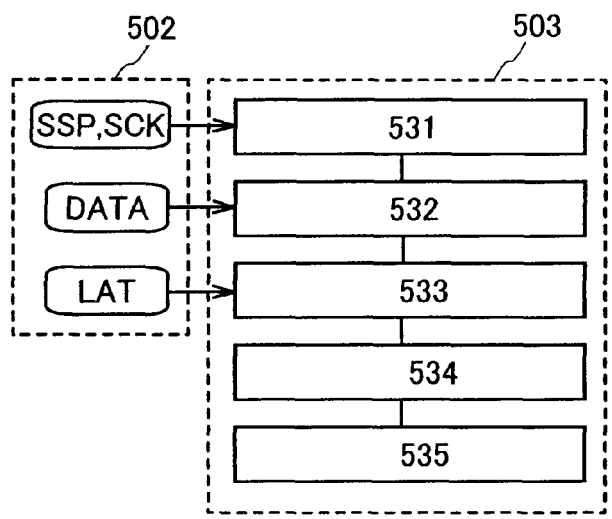

Further, as shown in FIG. 24C, the signal line driver circuit 503 includes circuits serving as a shift register 531, a first latch 532, a second latch 533, a level shifter 534, and a buffer 535. The circuit serving as the buffer 535 is a circuit having a function for amplifying a weak signal and includes an operational amplifier and the like. Signals such as start pulses (SSP) are inputted to the level shifter 534, and data (DATA) such as video signals is inputted to the first latch 532. Latch (LAT) signals can be temporarily held in the second latch 533, and are inputted to the pixel portion 505 concurrently. This operation is referred to as a line sequential drive. Therefore, a pixel that performs not a line sequential drive but a dot sequential drive does not require the second latch. Thus, the signal line driver circuit of the present invention is not limited to the structure shown in FIG. 24C.

The signal line driver circuit 503, the scanning line driver circuit 504, and the pixel portion 505 as described above can be formed of semiconductor elements provided over one substrate. The semiconductor element can be formed using a thin film transistor provided over a glass substrate. In this case, a crystalline semiconductor film may be applied to the semiconductor element (refer to Embodiment Mode 5). A crystalline semiconductor film can constitute a circuit included in a driver circuit portion because it has a high electrical characteristic, in particular, mobility. Further, the signal line driver circuit 503 and the scanning line driver circuit 504 may be mounted on a substrate by using an IC (Integrated Circuit) chip. In this case, an amorphous semiconductor film can be applied to a semiconductor element in a pixel portion (refer to Embodiment Mode 7).

In such a display device, stacked polarizers having different wavelength distributions of extinction coefficients are provided and arranged so that their absorption axes are deviated from each other, thereby the contrast ratio can be enhanced. In other words, the contrast ratio of light from a lighting unit controlled by a control circuit can be enhanced.

Embodiment Mode 9

In this embodiment mode, a structure of a backlight will be explained. A backlight is provided in a display device as a backlight unit having a light source. The light source is surrounded by a reflector plate so that the backlight unit effectively scatters light.

Figure 19A:
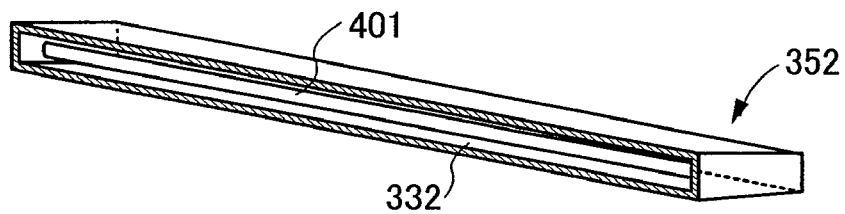
FIGS. 19A to 19D are cross-sectional views showing an irradiation means of a display device of the present invention.

As shown in FIG. 19A, a cold cathode tube 401 can be used as a light source in a backlight unit 352. In order to reflect light efficiently from the cold cathode tube 401, a lamp reflector 332 can be provided. The cold cathode tube 401 is mostly used for a large-sized display device due to the intensity of the luminance from the cold cathode tube. Therefore, the backlight unit having a cold cathode tube can be used for display of a personal computer.

Figure 19B:
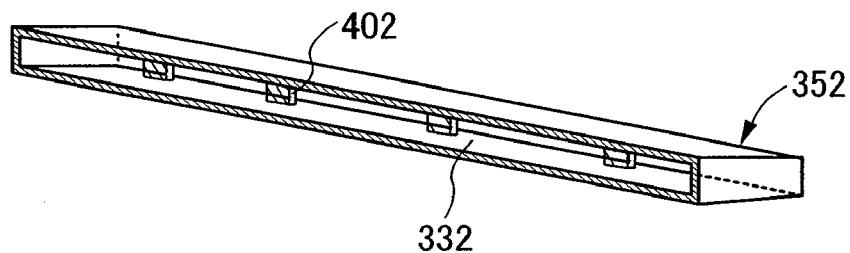

As shown in FIG. 19B, a light emitting diode (LED) 402 can be used as a light source in a backlight unit 352. For example, light emitting diodes (W) 402 emitting a white color are each arranged at predetermined intervals. In order to reflect light efficiently from the light emitting diode (W) 402, a lamp reflector 332 can be provided.

Figure 19C:
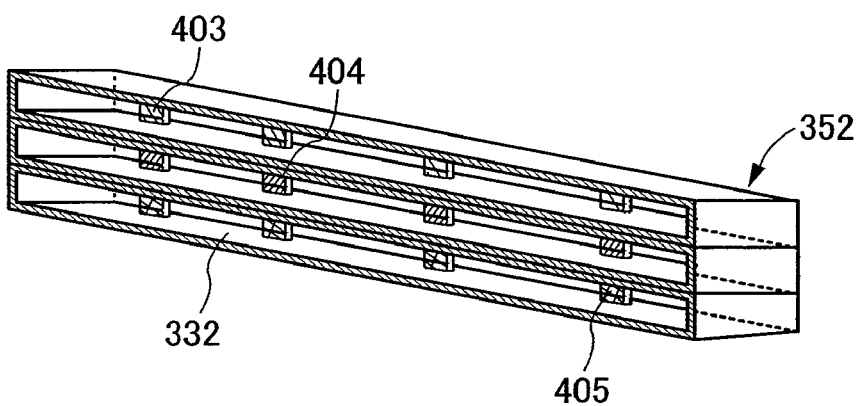

As shown in FIG. 19C, light emitting diodes (LED) 403, 404, and 405 each emitting a color of RGB can be used as a light source in a backlight unit 352. When the light emitting diodes (LED) 403, 404, and 405 emitting each color of RGB are used, a color reproduction property can be enhanced as compared with a case when only the light emitting diode (W) 402 emitting a white color is used. In order to reflect light efficiently from the light emission diode (W) 402, a lamp reflector 332 can be provided.

Figure 19D:
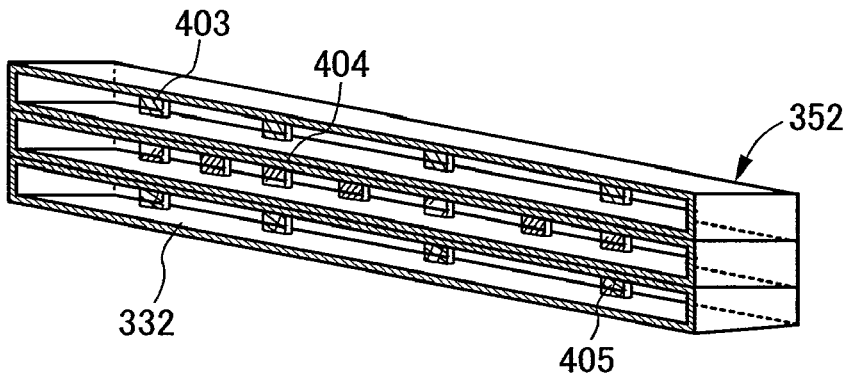

As shown in FIG. 19D, when light emitting diodes (LED) 403, 404, and 405 each emitting a color of RGB is used as a light source, it is not necessary that the number and arrangement thereof is the same for all. For example, a plurality of light emitting diodes emitting a color that has low light emitting intensity (such as green) may be arranged.

The light emitting diode 402 emitting a white color and the light emitting diodes (LED) 403, 404, and 405 each emitting color of RGB may be combined.

When a field sequential method is applied in a case of using the light emitting diodes of RGB, color display can be performed by sequentially lighting the light emitting diodes of RGB in accordance with the time.

The light emitting diode is suitable for a large-sized display device because the luminance is high when the light emitting diode is used. In addition, a color reproduction property of the light emitting diode is superior to that of a cold cathode tube because the color purity of each color of RGB is favorable, and an area required for arrangement can be reduced. Therefore, a narrower frame can be achieved when the light emitting diode is applied to a small-sized display device.

Further, a light source needs not provided as a backlight unit shown in FIGS. 19A to 19D. For example, when a backlight having a light emitting diode is mounted on a large-sized display device, the light emitting diode can be arranged on the back side of the substrate. In this case, each of the light emitting diodes can be sequentially arranged at predetermined intervals. A color reproduction property can be enhanced in accordance with the arrangement of the light emitting diodes.

Stacked layers each including a polarizer are arranged so that the absorption axes of the polarizers are deviated from each other and provided in a display device using such a backlight, thereby an image having a high contrast ratio can be provided. A backlight having a light emitting diode is particularly suitable for a large-sized display device, and an image having high quality can be provided even in a dark place by enhancing the contrast ratio of the large-sized display device.

Embodiment Mode 10

Driving methods of a liquid crystal for a liquid crystal display device include a vertical electric field method where a voltage is applied perpendicularly to a substrate and a horizontal electric field method where a voltage is applied parallel to a substrate. The structure in which stacked layers each including polarizers are arranged so that their absorption axes are deviated can be applied to either the vertical electric field method or the horizontal electric field method. In this embodiment mode, various kinds of liquid crystal modes will be explained, to which stacked layers each including polarizers that are arranged so that their absorption axes are deviated from each other can be applied.

First, FIGS. 27(A1) and 27(A2) each show a schematic diagram of a liquid crystal display device of a TN mode.

Similar to the above embodiment modes, a layer 100 including a display element is interposed between a first substrate 101 and a second substrate 102, which are arranged to be opposite to each other. A first layer 103 including a polarizer and a second layer 102 including a polarizer are arranged so as to deviate from a parallel Nicols state on the first substrate 101 side. A third layer 105 including a polarizer and a fourth layer 106 including a polarizer are arranged to be in a parallel Nicols state on the second substrate 102 side. The first layer 103 including a polarizer and the third layer 105 including a polarizer are arranged to be in a crossed Nicols state.

Although not shown, a backlight or the like is arranged on an outer side of the fourth layer 106 including a polarizer. A first electrode 108 and a second electrode 109 are respectively provided over the first substrate 101 and the second substrate 102. The first electrode 108 on a side opposite to the backlight, in other words, on the viewing side, is formed so as to have at least a light transmitting property.

When a liquid crystal display device having such a structure is in a normally white mode, when a voltage is applied to the first electrode 108 and the second electrode 109 (referred to as a vertical electric field method), black display is performed as shown in FIG. 27(A1). At that time, liquid crystal molecules are aligned vertically. Thus, light from the backlight cannot pass through the substrate, which leads to black display.

As shown in FIG. 27(A2), when a voltage is not applied between the first electrode 108 and the second electrode 109, white display is performed. At that time, liquid crystal molecules are aligned horizontally while twisted on a plane. As a result, light from the backlight can pass through the substrate provided with a stacked layer including a polarizer that is arranged on the viewing side so as to deviate from a parallel Nicols state, which is a pair of the stacked layers including a polarizer, thereby a predetermined image is displayed.

By providing a color filter at that time, full-color display can be performed. The color filter can be provided on either the first substrate 101 side or the second substrate 102 side.

A known material may be used for a liquid crystal material of the TN mode.

FIG. 27(B1) shows a schematic diagram of a liquid crystal display device of a VA mode. A VA mode is a mode where liquid crystal molecules are aligned perpendicularly to a substrate when there is no electric field.

Similarly to FIGS. 27(A1) and 27(A2), a first electrode 108 and a second electrode 109 are respectively provided over a first substrate 101 and a second substrate 102. In addition, the first electrode 108 on a side opposite to the backlight, in other words, on the viewing side, is formed so as to have at least a light transmitting property. A first layer 103 including a polarizer and a second layer 104 including a polarizer are arranged so as to deviate from a parallel Nicols state. Further, on the second substrate 102 side, a third layer 105 including a polarizer and a fourth layer 106 including a polarizer are arranged to be in a parallel Nicols state. The first layer 103 including a polarizer and the third layer 105 including a polarizer are arranged to be in a crossed Nicols state.

When a voltage is applied to the first electrode 108 and the second electrode 109 (vertical electric field method) in a liquid crystal display device having such a structure, white display is performed, which means an on state, as shown in FIG. 27(B1). At that time, liquid crystal molecules are aligned horizontally. Thus, light from the backlight can pass through the substrate provided with the stacked layers each including a polarizer that are deviated from a parallel Nicols state, thereby a predetermined image is displayed. By providing a color filter at that time, full-color display can be performed. The color filter can be provided on either the first substrate 101 side or the second substrate 102 side.

As shown in FIG. 27(B2), when no voltage is applied between the first electrode 108 and the second electrode 109, black display is performed, which means an off state. At that time, liquid crystal molecules are aligned vertically. Thus, light from the backlight cannot pass through the substrate, which leads to black display.

Thus, in an off state, liquid crystal molecules are perpendicular to the substrate, thereby black display is performed. Meanwhile, in an on state, liquid crystal molecules are parallel to the substrate, thereby white display is performed. In an off state, liquid crystal molecules rise; therefore, polarized light from the backlight passes through a cell without being affected by the liquid crystal molecules and can be completely blocked by the layer including a polarizer on the opposite substrate side. Accordingly, at least one of the layers including a stacked polarizer of a pair of the layers including a stacked polarizer is arranged so as to deviate from a parallel Nicols state, thereby further enhancement of the contrast ratio can be assumed.

FIGS. 27(C1) and 27(C2) show an example in which a stacked layer including a polarizer of the present invention is applied to an MVA mode where alignment of liquid crystal is divided. The MVA mode is a method in which one pixel is divided into a plurality and the viewing angle dependency for each portion is compensated for that of other portions. As shown in FIG. 27(C1), projections 158 and 159, the cross-section of each of which is a triangle shape, are respectively provided on a first electrode 108 and a second electrode 109. When a voltage is applied to the first electrode 108 and the second electrode 109 (vertical electric field method), white display is performed, which means an on state, as shown in FIG. 27(C1). At that time, liquid crystal molecules are aligned so as to tilt toward the projections 158 and 159. Thus, light from the backlight can pass through the substrate provided with the stacked layers each including a polarizer that are deviated from a parallel Nicols state, thereby predetermined image display can be performed. By providing a color filter at that time, full-color display can be performed. The color filter can be provided on either the first substrate 101 side or the second substrate 102 side.

As shown in FIG. 27(C2), when a voltage is not applied between the first electrode 108 and the second electrode 109, black display is performed, which means an off state. At that time, liquid crystal molecules are aligned vertically. Thus, light from the backlight cannot pass through the substrate, which leads to black display.

Figure 30A:
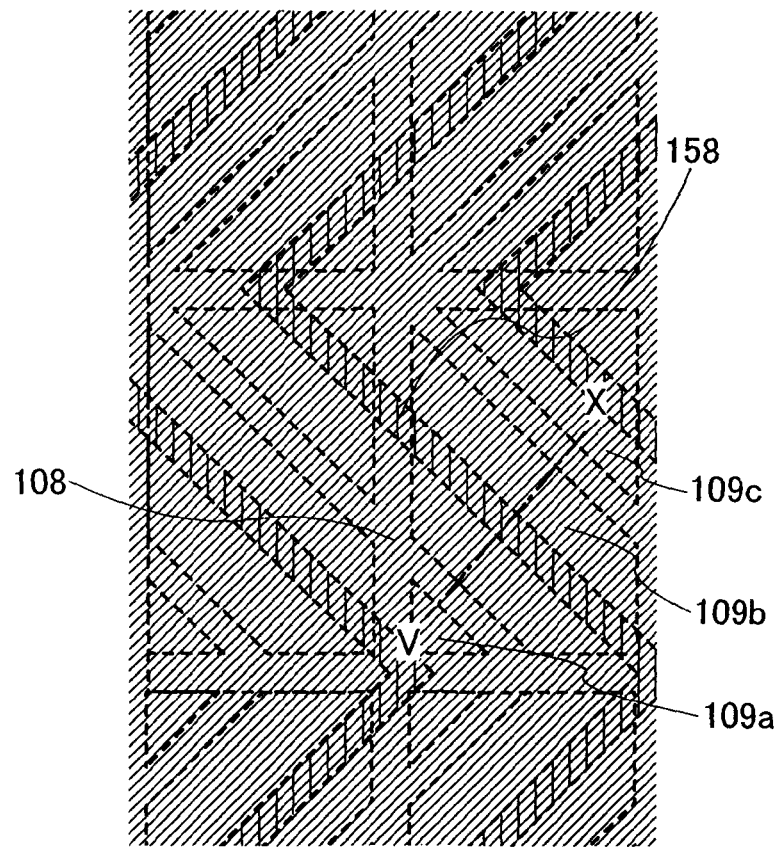
FIGS. 30A and 30B are a cross-sectional view and a perspective view respectively of a display device of the present invention.
Figure 30B:
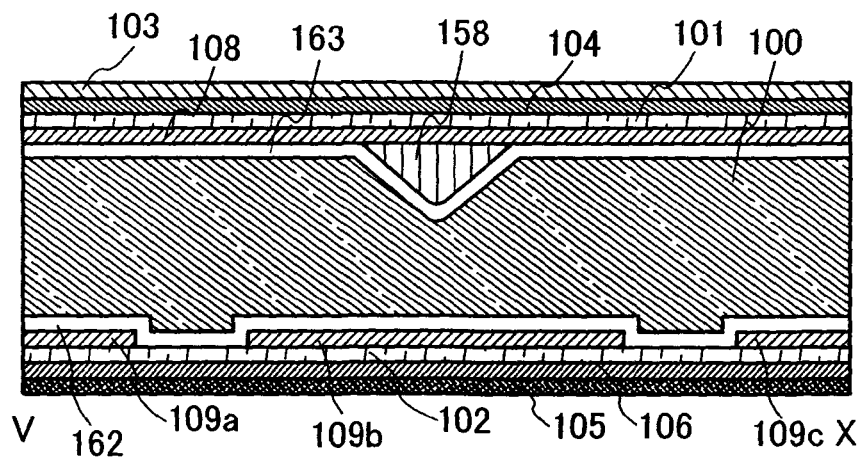

FIGS. 30A and 30B show a top view and a cross-sectional view of another example of an MVA mode. In FIG. 30A, a second electrode is formed into a bent pattern of a dog-legged shape to be second electrodes 109a, 109b, and 109c. An insulating layer 162 that is an orientation film is formed over the second electrodes 109a, 109b, and 109c. As shown in FIG. 30B, a projection 158 is formed over a first electrode 108 to have a shape corresponding to that of the second electrodes 109a, 109b, and 109c. Openings of the second electrodes 109a, 109b, and 109c serve as projections, which can move the liquid crystal molecules.

FIGS. 28(A1) and 28(A2) each show a schematic diagram of a liquid crystal display device of an OCB mode. In the OCB mode, alignment of liquid crystal molecules forms a compensation state optically in a liquid crystal layer, which is referred to as a bent orientation.

Similarly to FIGS. 27(A1) to 27(C2), a first electrode 108 and a second electrode 109 are respectively provided on a first substrate 101 and a second substrate 102. Although not shown, a backlight or the like is arranged on an outer side of a fourth layer 106 including a polarizer. In addition, the first electrode 108 on a side opposite to the backlight, in order words, on the viewing side, is formed so as to have at least a light transmitting property. A first layer 103 including a polarizer and a second layer 104 including a polarizer are arranged so as to deviate from a parallel Nicols state. A third layer 105 including a polarizer and the fourth layer 106 including a polarizer are arranged on the second substrate 102 side so as to be in a parallel Nicols state. The first layer 103 including a polarizer and the third layer 105 including a polarizer are arranged so as to be in a crossed Nicols state.

When a constant on-voltage is applied to the first electrode 108 and the second electrode 109 (vertical electric field method) in a liquid crystal display device having such a structure, black display is performed as shown in FIG. 28(A1). At that time, liquid crystal molecules are aligned vertically. Thus, light from the backlight cannot pass through the substrate, which leads to black display.

When a constant off-voltage is applied between the first electrode 108 and the second electrode 109, white display is performed as shown in FIG. 28(A2). At that time, liquid crystal molecules are aligned in a bent orientation. Thus, light from the backlight can pass through the substrate provided with the stacked layer including a polarizer, thereby a predetermined image is displayed. By providing a color filter at that time, full-color display can be performed. The color filter can be provided on either the first substrate 101 side or the second substrate 102 side.

In such an OCB mode, a stacked layer including a polarizer, which is a pair of the stacked layers including a polarizer, on the viewing side is arranged so as to deviate from a parallel Nicols state, thereby birefringence caused in a liquid crystal layer can be compensated. As a result, the contrast ratio and a wide viewing angle can be enhanced.

FIGS. 28(B1) and (B2) each show a schematic diagram of an FLC mode and an AFLC mode.

Similarly to FIGS. 27(A1) to 27(C2), a first electrode 108 and a second electrode 109 are respectively provided on a first substrate 101 and a second substrate 102. The first electrode 108 on a side opposite to a backlight, in other words, on a viewing side is formed to have at least a light transmitting property. A first layer 103 including a polarizer and a second layer 104 including a polarizer are arranged so as to deviate from a parallel Nicols state. A third layer 105 including a polarizer and a fourth layer 106 including a polarizer are arranged on the second substrate 102 side so as to be in a parallel Nicols state. The first layer 103 including a polarizer and the third layer 105 including a polarizer are arranged so as to be in a crossed Nicols state.

When a voltage is applied to the first electrode 108 and the second electrode 109 (referred to as vertical electric field method) in a liquid crystal display device having such a structure, white display is performed as shown in FIG.

28(B1). At that time, liquid crystal molecules are aligned horizontally while rotated on a plane surface. Thus, light from the backlight can pass through the substrate provided with the stacked layer including a polarizer, which is a pair of the stacked layers including a polarizer, on the viewing side so as to deviate from a parallel Nicols state, thereby a predetermined image is displayed.

When no voltage is applied between the first electrode 108 and the second electrode 109, black display is performed as shown in FIG. 28(B2). At that time, liquid crystal molecules are aligned horizontally. Thus, light from the backlight cannot pass through the substrate, which leads to black display.

When a color filter is provided at that time, full-color display can be performed. The color filter can be provided on either the first substrate 101 side or the second substrate 102 side.

A known material may be used for a liquid crystal material of the FLC mode and the AFLC mode.

FIGS. 29(A1) and 29(A2) each shows a schematic diagram of a liquid crystal display device of an IPS mode. In the IPS mode, liquid crystal molecules are constantly rotated in parallel to a substrate, and a horizontal electric field method where electrodes are provided on one substrate side is employed.

In the IPS mode, a liquid crystal is controlled by a pair of electrodes provided on one substrate. Therefore, a pair of electrodes 150 and 151 is provided over a second substrate 102. The pair of electrodes 150 and 151 may each have a light transmitting property. A first layer 103 including a polarizer and a second layer 104 including a polarizer are arranged so as to deviate from a parallel Nicols state. In addition, a third layer 105 including a polarizer and a fourth layer 106 including a polarizer are arranged on the second substrate 102 side so as to be in a parallel Nicols state. The first layer 103 including a polarizer and the third layer 105 including a polarizer are arranged so as to be in a crossed Nicols state. Although not shown, a backlight or the like is arranged on an outer side of the fourth layer 106 including a polarizer.

When a voltage is applied to the pair of electrodes 150 and 151 in a liquid crystal display device having such a structure, white display is performed, which means an on state, as shown in FIG. 29(A1). Thus, light from the backlight can pass through the substrate provided with the stacked layer including a polarizer, which is one of a pair of the stacked layers including a polarizer, on the viewing side, which deviates from a parallel Nicols state, thereby a predetermined image is displayed.

By providing a color filter at that time, full-color display can be performed. The color filter can be provided on either the first substrate 101 side or on the second substrate 102 side.

When no voltage is applied between the pair of electrodes 150 and 151, black display is performed, which means an off state, as shown in FIG. 29(A2). At that time, liquid crystal molecules are aligned horizontally while rotated on a plane surface. Thus, light from the backlight cannot pass through the substrate, which leads to black display.

Figure 25A:
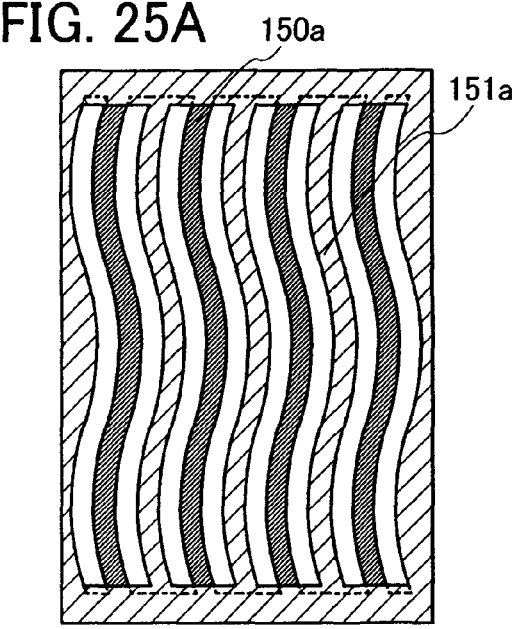
FIGS. 25A to 25D are top views each illustrating a display device of the present invention.
Figure 25B:
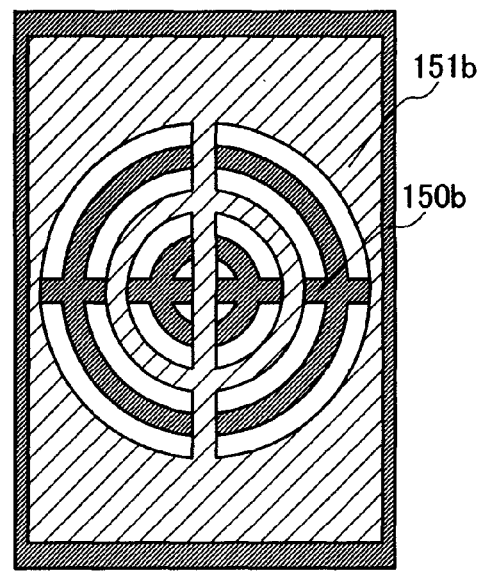
Figure 25C:
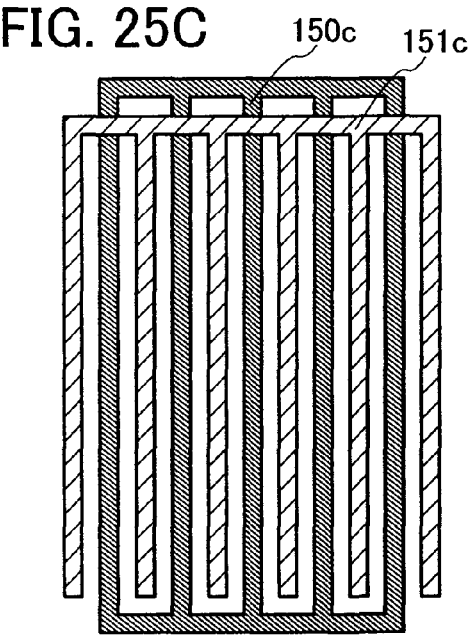
Figure 25D:
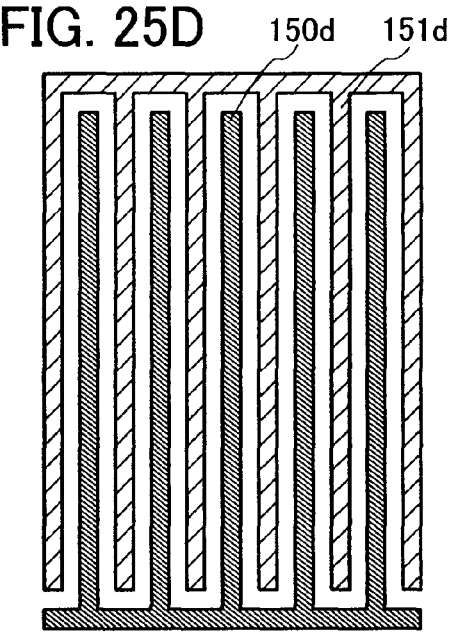

FIGS. 25A to 25D each show an example of the pair of electrodes 150 and 151 that can be used in the IPS mode. As shown in top views of FIGS. 25A to 25D, the pair of electrodes 150 and 151 are alternatively formed. In FIG. 25A, electrodes 150a and 151a have an undulating wave shape. In FIG. 25B, electrodes 150b and 151b have a concentric circular opening. In FIG. 25C, electrodes 150c and 151c have a comb-like shape and are partially overlapped with each other. In FIG. 25D, electrodes 150d and 151d have a comb-like shape in which the electrodes are meshed with each other.

An FFS mode can be used instead of the IPS mode. The FFS mode has a structure in which a pair of electrodes are not formed in the same layer, and an electrode 153 is formed over an electrode 152 with an insulating film interposed therebetween as shown in FIGS. 29(B1) and 29(B2), while the pair of electrodes are formed on the same surface in the IPS mode.

When a voltage is applied to the pair of electrodes 152 and 153 in a liquid crystal display device having such a structure, white display is performed, which means an on state, as shown in FIG. 29(B1). Thus, light from a backlight can pass through the substrate provided with the stacked layer including a polarizer on the viewing side that deviates from a parallel Nicols state, which is one of a pair of layers including a stacked polarizer, thereby a predetermined image is displayed.

By providing a color filter at that time, full-color display can be performed. The color filter can be provided on either the first substrate 101 side or on the second substrate 102 side.

When no voltage is applied between the pair of electrodes 152 and 153, black display is performed, which means an off state, as shown in FIG. 29(B2). At that time, liquid crystal molecules are aligned horizontally while rotated on a plane surface. Thus, light from the backlight cannot pass through the substrate, which leads to black display.

Figure 26A:
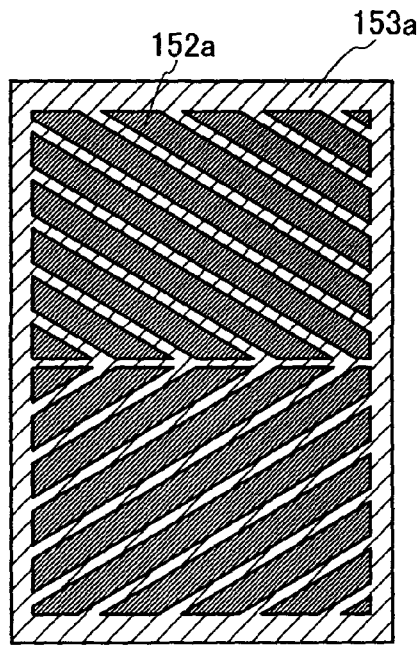
FIG. 26A to 26D are top views each illustrating a display device of the present invention.
Figure 26B:
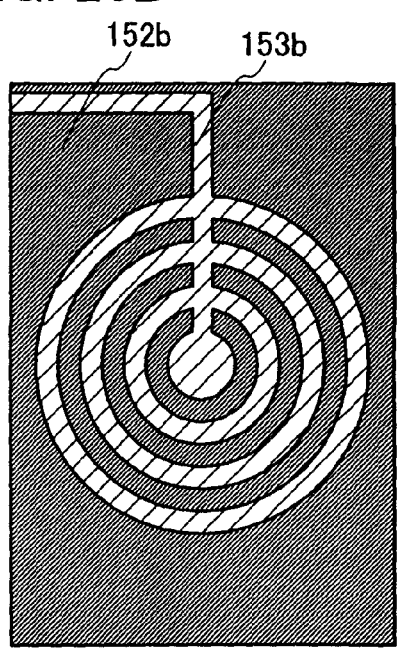
Figure 26C:
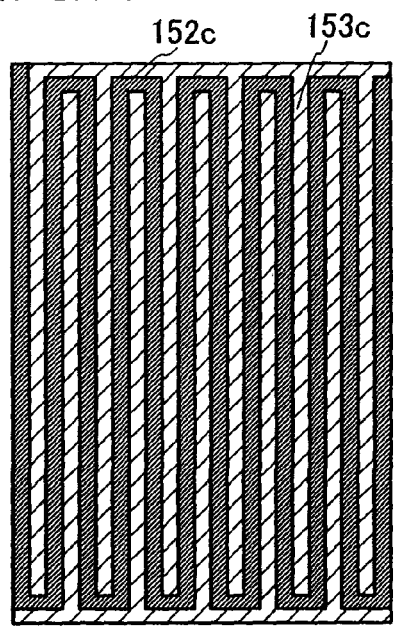
Figure 26D:
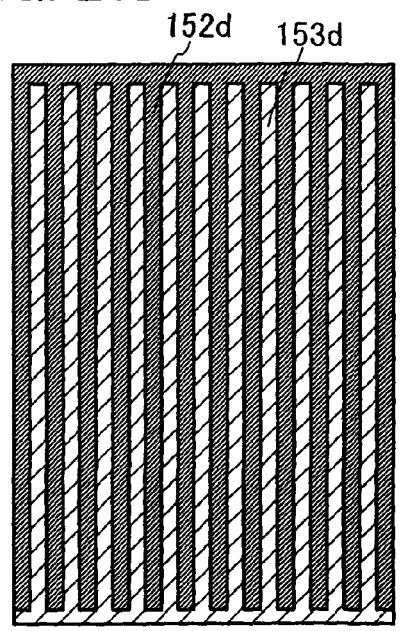

FIGS. 26A to 26D each show an example of the pair of electrodes 152 and 153 that can be used in the FFS mode. As shown in top views of FIGS. 26A to 26D, the electrodes 153 that are formed into various patterns are formed over the electrodes 152. In FIG. 26A, an electrode 153a over an electrode 152a has a bent dog-legged shape. In FIG. 26B, an electrode 153b over an electrode 152b has a concentric circular shape. In FIG. 26C, an electrode 153c over an electrode 152c has a comb-like shape in which the electrodes are messed with other. In FIG. 26D, an electrode 153d over an electrode 152d has a comb-like shape.

A known material may be used for a liquid crystal material of the IPS mode and the FFS mode.

A structure in which a stacked layer including a polarizer on the viewing side, which is one of a pair of stacked layers including a polarizer of the present invention, is arranged so as to deviate from a parallel Nicols state is applied to a liquid crystal display device of a vertical electric field method, thereby display with an even higher contrast ratio can be performed. Such a vertical electric field method is suitable for a display device for a computer that is used in a room or for a large-sized television.

Further, when the present invention is applied to a liquid crystal display device of a horizontal electric field method, display with a high contrast ratio can be performed in addition to one with a viewing angle. Such a horizontal electric field method is suitable for a portable display device.

Furthermore, the present invention can be applied to a liquid crystal display device of a rotation mode, a scattering mode, or a birefringence mode and a display device in which layers including a polarizer are arranged on both sides of the substrate.

This embodiment mode can be freely combined with the above embodiment modes.

Embodiment Mode 11

This embodiment mode will be explained with reference to FIGS. 18A and 18B. FIGS. 18A and 18B show an example of forming a display device (a liquid crystal display module) using a TFT substrate 2600 that is manufactured by applying the present invention.

FIG. 18A shows an example of a liquid crystal display module where the TFT substrate 2600 and an opposite substrate 2601 are bonded with a sealant 2602, and a pixel portion 2603 including a TFT or the like and a liquid crystal layer 2604 are provided therebetween so as to form a display region. A colored layer 2605 is necessary for color display. For a case of an RGB method, colored layers corresponding to each color of red, green, and blue are provided to correspond to each pixel. A first layer 2606 including a polarizer and a second layer 2626 including a polarizer are arranged on an outer side of the opposite substrate 2601. A third layer 2607 including a polarizer, a fourth layer 2627 including a polarizer, and a lens film 2613 are arranged on an outer side of the TFT substrate 2600. A light source includes a cold cathode tube 2610 and a reflector plate 2611. A circuit board 2612 is connected to the TFT substrate 2600 through a flexible wiring board 2609. External circuits such as a control circuit and a power supply circuit are included.

Stacked layers of the third layer 2607 including a polarizer and the fourth layer 2627 including a polarizer which have different wavelength distributions of extinction coefficients from each other are provided between the TFT substrate 2600 and a backlight that is the light source. The stacked layers of the first layer 2606 including a polarizer and the second layer 2626 including a polarizer which have different wavelength distributions of extinction coefficients from each other are provided over the opposite substrate 2601. The third layer 2607 including a polarizer and the fourth layer 2627 including a polarizer, which are provided on the backlight side, are arranged so as to be in a parallel Nicols state. The first layer 2606 including a polarizer and the second layer 2626 including a polarizer, which are provided on the viewing side, are arranged so as to be deviated from a parallel Nicols state. In such a structure, one of a pair of the stacked layers each including polarizers having different wavelength distributions of extinction coefficients from each other, preferably the stacked layers each including a polarizer on the viewing side are deviated. Accordingly, the contrast ratio can be enhanced.

The stacked layer of the third layer 2607 including a polarizer and the fourth layer 2627 including a polarizer is bonded to the TFT substrate 2600. The stacked layer of the first layer 2606 including a polarizer and the second layer 2626 including a polarizer are bonded to the opposite substrate 2601. In addition, a retardation film may be stacked to be interposed between the stacked layer including a polarizer and the substrate.

For the liquid crystal display module, a TN (Twisted Nematic) mode, an IPS (In-Plane-Switching) mode, an FFS (Fringe Field Switching) mode, an MVA (Multi-domain Vertical Alignment) mode, an ASM (Axially Symmetric aligned Micro-cell) mode, an OCB (Optical Compensated Birefringence) mode, an FLC (Ferroelectric Liquid Crystal) mode, or the like can be used.

FIG. 18B shows an example of an FS-LCD (Field Sequential-LCD) in which an OCB mode is applied to the liquid crystal display module of FIG. 18A. The FS-LCD emits red light, green light, and blue light during one frame period and can perform color display by combining images using time division. Since each light is emitted by a light emitting diode, a cold cathode tube, or the like, a color filter is not necessary. Thus, it is not necessary to arrange color filters of three primary colors and restrict the display region of each color, and color display of all three colors can be performed in any regions; therefore, nine times as many pixels can be displayed in the same area. On the other hand, since three colors of light are emitted during one frame period, high-speed response is required for a liquid crystal. By employing an FS method, an FLC mode, and an OCB mode to a display device of the present invention, a display device or a liquid crystal television device with high performance and high image quality can be completed.

A liquid crystal layer in the OCB mode has a so-called π-cell structure. In the π-cell structure, liquid crystal molecules are oriented so that their pretilt angles are plane-symmetric along a center plane between an active matrix substrate and an opposite substrate. An orientation state of a in-cell structure becomes splayed orientation when a voltage is not applied between the substrates and shifts to bent orientation when a voltage is applied therebetween. This bent orientation becomes a white display. When a voltage is applied further, liquid crystal molecules of bent orientation get oriented perpendicular to the both substrates so that light is not transmitted. With the OCB mode, response with about 10 times higher speed than a conventional TN mode can be realized.

Moreover, as a mode corresponding to the FS method, an SS-FLC or an HV-FLC using a ferroelectric liquid crystal (FLC) capable of high-speed operation, or the like can also be used. The OCB mode uses a nematic liquid crystal having relatively low viscosity, while the HV-FLC or the SS-FLC uses a smectic liquid crystal. A material of an FLC, a nematic liquid crystal, a smectic liquid crystal, or the like can be used as the liquid crystal material.

Moreover, optical response speed of a liquid crystal display module gets higher by narrowing the cell gap of the liquid crystal display module. In addition, the optical response speed can also get higher by decreasing the viscosity of the liquid crystal material. The increase in response speed is particularly advantageous when a pixel in a pixel portion of a liquid crystal display module of a TN mode or a dot pitch is less than or equal to 30 μm.

FIG. 18B shows a transmissive liquid crystal display module, in which a red light source 2910a, a green light source 2910b, and a blue light source 2910c are provided as light sources. The light sources are provided with a control portion 2912 in order to switch the red light source 2910a, the green light source 2910b, and the blue light source 2910c. The control portion 2912 controls light emission of each color, so that light enters the liquid crystal to combine images by time division, thereby performing color display.

Thus, absorption axes of the polarizers included in the layers are deviated from a parallel Nicols state, thereby light leakage in the absorption axis direction can be reduced. Therefore, the contrast ratio of the display device can be enhanced. A display device with high performance and high image quality can be manufactured.

This embodiment mode can be used by being freely combined with the above embodiment modes.

Embodiment Mode 12

Figure 23:
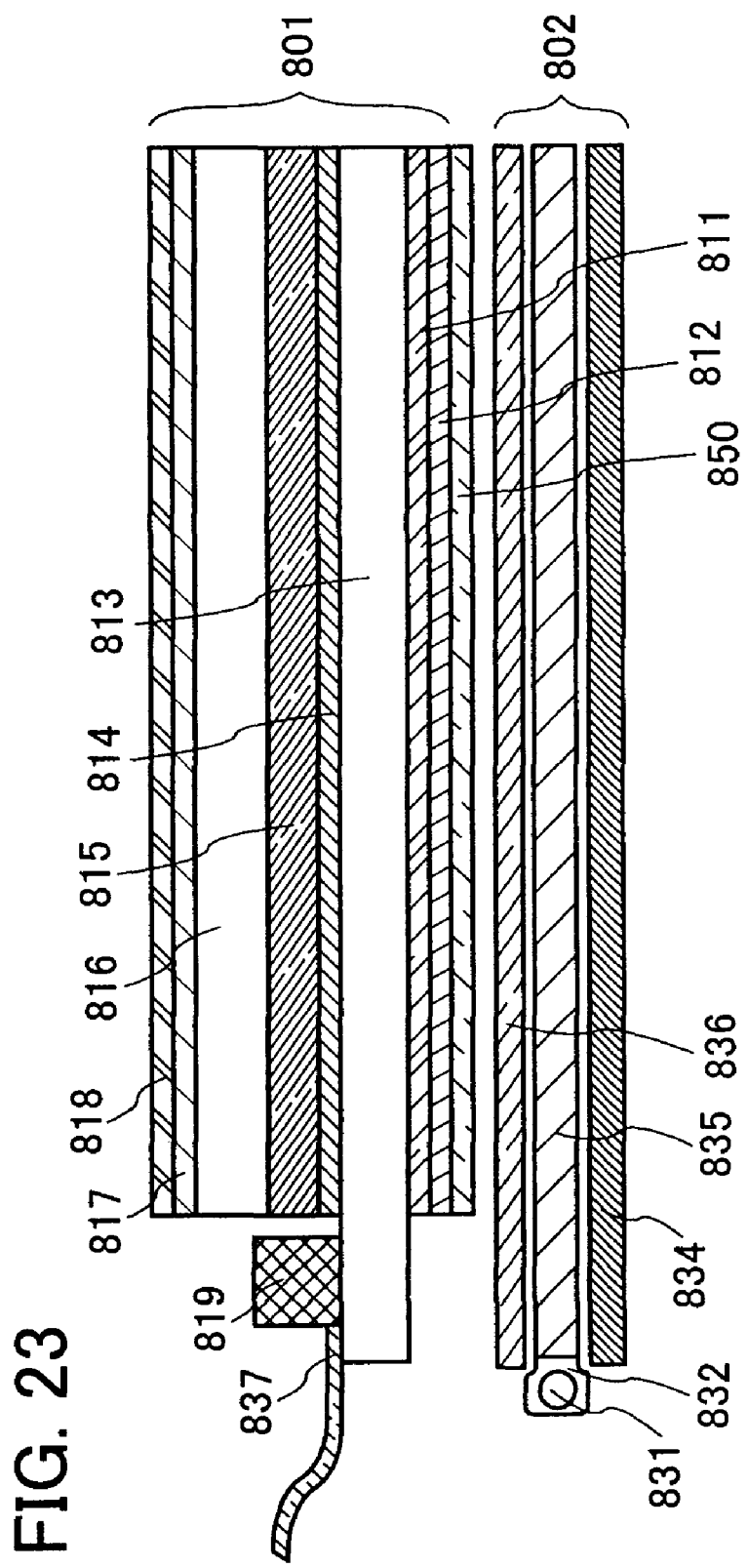
FIG. 23 is a cross-sectional view of a display device of the present invention.

This embodiment mode will be explained with reference to FIG. 23. FIG. 23 shows an example of forming a display device using a substrate 813 that is a TFT substrate manufactured by applying the present invention.

FIG. 23 shows a display device portion 801 and a backlight unit 802. The display device portion 801 includes the substrate 813, a pixel portion 814 including a TFT or the like, a liquid crystal layer 815, an opposite substrate 816, a first layer 817 including a polarizer, a second layer 818 including a polarizer, a third layer 811 including a polarizer, a fourth layer 812 including a polarizer, a slit (lattice) 850, a driver circuit 819, and an FPC 837. The backlight unit 802 includes a light source 831, a lamp reflector 832, a reflector plate 834, a light conducting plate 835, and a light diffuser plate 836.

The display device of the present invention shown in FIG. 23 makes it possible to perform three-dimensional display without any need for special equipment such as glasses. The slit 850 with an opening that is arranged on the backlight unit side transmits light that is incident from the light source and made to be a striped shape. Then, the light is incident on the display device portion 801. This slit 850 can make parallax in both eyes of a viewer on the viewing side. The viewer sees only a pixel for the right eye with the right eye and only a pixel for a left eye with a left eye simultaneously. Therefore, the viewer can see three-dimensional display. That is, in the display device portion 801, light given a specific viewing angle by the slit 850 passes through each pixel corresponding to an image for the right eye and an image for the left eye, thereby the image for the right eye and the image for the left eye are separated into different viewing angles, and three-dimensional display is performed.

The third layer 811 including a polarizer and the fourth layer 812 including a polarizer are provided and stacked between the substrate 813 and the backlight that is the light source. The first layer 817 including a polarizer and the second layer 818 including a polarizer are provided and stacked over the opposite substrate 816. The third layer 811 including a polarizer and the fourth layer 812 including a polarizer which have different wavelength distributions of extinction coefficients from each other, which are provided on the backlight side, are arranged so as to be in a parallel Nicols state. The first layer 817 including a polarizer and the second layer 818 including a polarizer which have different wavelength distributions of extinction coefficients from each other, which are provided on the viewing side, are arranged so as to deviate from a parallel Nicols state. In such a structure, one of a pair of the layers including a stacked polarizer, preferably, the stacked polarizer on the viewing side, has a polarizer that deviates. Thus, even slight light leakage can be prevented and the contrast ratio can be enhanced.

An electronic device such as a television device or a cellular phone is manufactured with the use of a display device of the present invention, thereby an electronic device with high performance and high image quality, which can perform three-dimension display, can be provided.

Embodiment Mode 13

Figure 20:
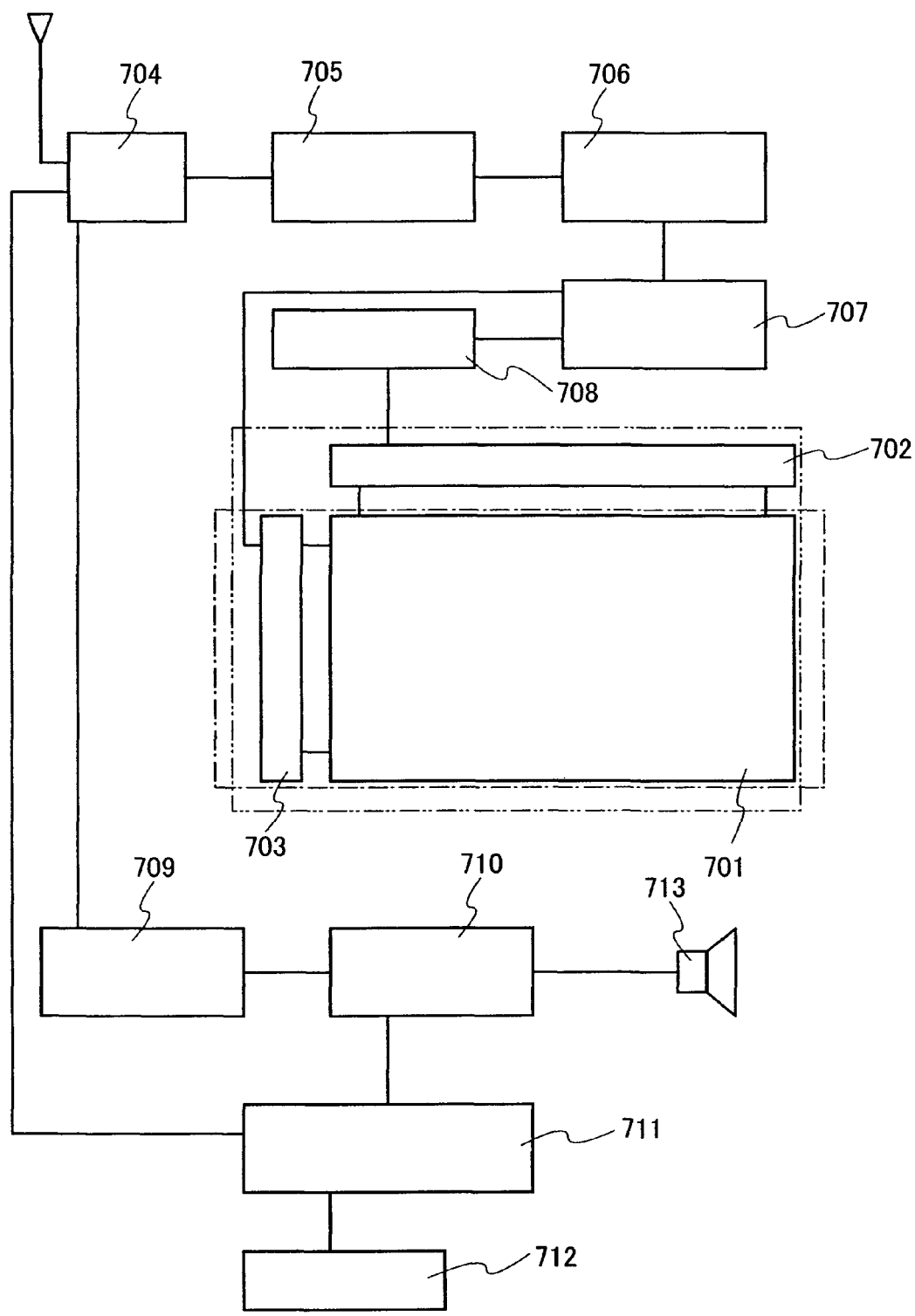
FIG. 20 is a block diagram illustrating a basic structure of an electronic device to which the present invention is applied.

By a display device formed by the present invention, a television device (also, referred to as a television simply or a television receiver) can be completed. FIG. 20 shows a block diagram of a main structure of a television device. As for a display panel, any modes of the following may be employed: as the structure shown in FIG. 16A, a case where only a pixel portion 701 is formed and a scanning line driver circuit 703 and a signal line driver circuit 702 are mounted by a TAB method as shown in FIG. 17B; a case where only the pixel portion 701 is formed and the scanning line driver circuit 703 and the signal line driver circuit 702 are mounted by a COG method as shown in FIG. 17A; a case where a TFT is formed as shown in FIG. 16B, the pixel portion 701 and the scanning line driver circuit 703 are formed over the same substrate, and the signal line driver circuit 702 is independently mounted as a driver IC; a case where the pixel portion 701, the signal line driver circuit 702, and the scanning line driver circuit 703 are formed over the same substrate as shown in FIG. 17C; and the like.

In addition, as another structure of an external circuit, a video signal amplifier circuit 705 that amplifies a video signal among signals received by a tuner 704, a video signal processing circuit 706 that converts the signals output from the video signal amplifier circuit 705 into chrominance signals corresponding to each colors of red, green, and blue, a control circuit 707 that converts the video signal into an input specification of a driver IC, or the like are provided on an input side of the video signal. The control circuit 707 outputs signals to both a scanning line side and a signal line side. In a case of digital driving, a signal dividing circuit 708 may be provided on the signal line side and an input digital signal may be divided into m pieces to be supplied.

An audio signal among signals received by the tuner 704 is transmitted to an audio signal amplifier circuit 709 and is supplied to a speaker 713 through an audio signal processing circuit 710. A control circuit 711 receives control information of a receiving station (reception frequency) or sound volume from an input portion 712 and transmits signals to the tuner 704 or the audio signal processing circuit 710.

Figure 21A:
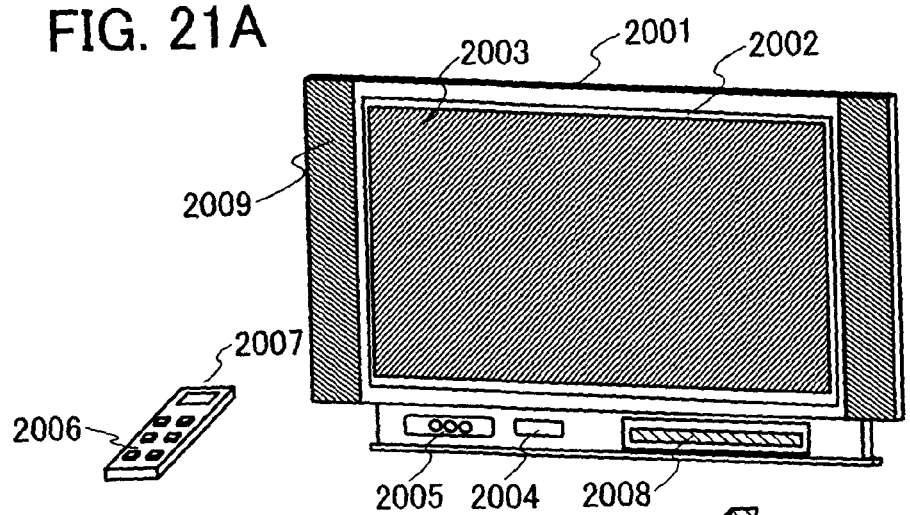
FIGS. 21A to 21C illustrate electronic devices of the present invention.
Figure 21B:
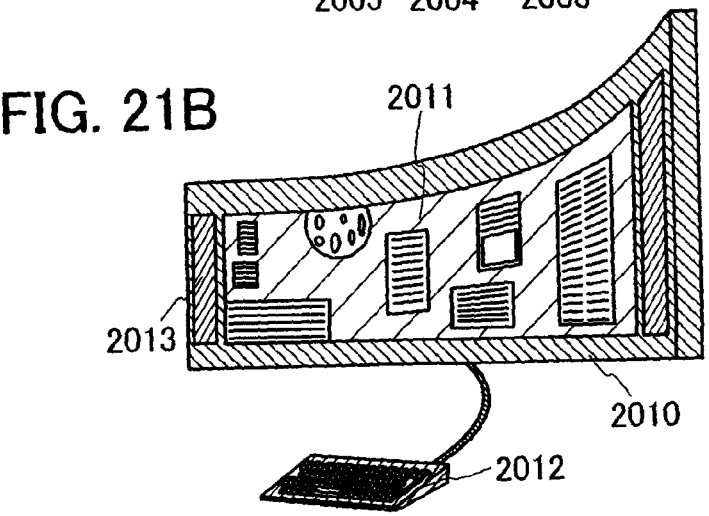
Figure 21C:
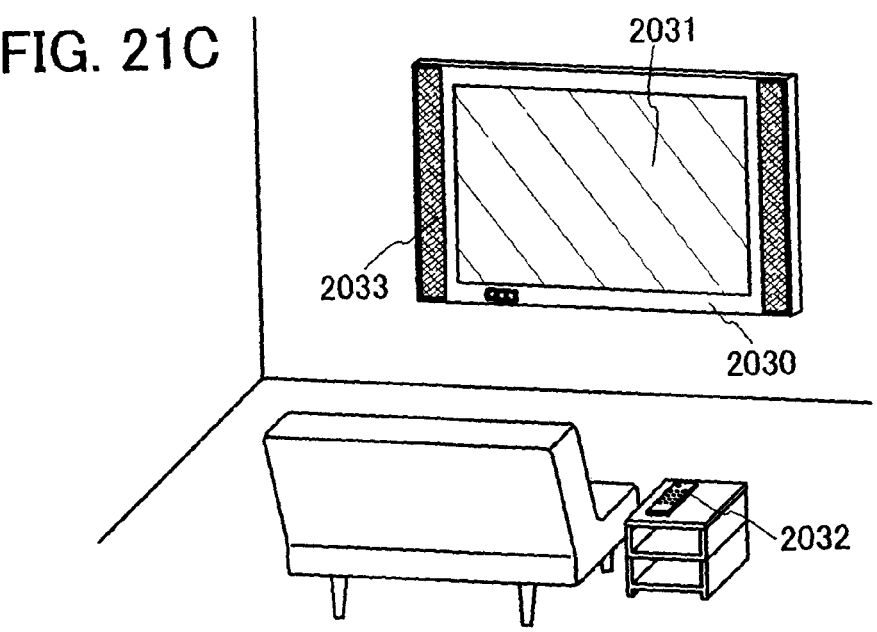

Such liquid crystal display modules are incorporated into each chassis as shown in FIGS. 21A to 21C, thereby a television device can be completed. When a liquid crystal display module shown in FIGS. 18A and 18B are used, a liquid crystal television device can be completed. When a display device having a three-dimension display function as Embodiment Mode 11 is used, a television device that can perform three-dimension display can be manufactured. A main screen 2003 is formed by a display module, and a speaker portion 2009, an operation switch, and the like are provided as accessory equipment. In such a manner, a television device can be completed by the present invention.

As shown in FIG. 21A, a display panel 2002 is incorporated in a chassis 2001, and general TV broadcast can be received by a receiver 2005. In addition, by connecting to a communication network by wired or wireless connections via a modem 2004, one-way (from a sender to a receiver) or two-way (between a sender and a receiver or between receivers) information communication can be carried out. The television device can be operated by using a switch built in the chassis or a remote control unit 2006. A display portion 2007 for displaying output information may also be provided in the remote control unit 2006.

Further, the television device may include a sub-screen 2008 formed using a second display panel to display channels, volume, or the like, in addition to the main screen 2003. In this structure, the main screen 2003 and the sub-screen 2008 can be formed using a liquid crystal display panel of the present invention. The main screen 2003 may be formed using an EL display panel having a superior viewing angle, and the sub-screen 2008 may be formed using a liquid crystal display panel capable of displaying sub-images with lower power consumption. In order to reduce the power consumption preferentially, the main screen 2003 may be formed using a liquid crystal display panel, and the sub-screen 2008 may be formed using an EL display panel such that the sub-screen can flash on and off. By using the present invention, even when many TFTs and electronic parts are used with such a large-sized substrate, a highly reliable display device can be formed.

FIG. 21B shows a television device having a large display portion with a size of, for example, 20 to 80 inches. The television device includes a chassis 2010, a display portion 2011, a keyboard portion 2012 that is an operation portion, a speaker portion 2013, and the like. The present invention is applied to the manufacturing of the display portion 2011. The display portion of FIG. 21B uses a substance capable of being bent, and therefore, the television device has a bent display portion. Since the shape of the display portion can be designed freely as described above, a television device having the desired shape can be manufactured.

FIG. 21C shows a television device having a large display portion with a size of, for example, 20 to 80 inches. The television device includes a chassis 2030, a display portion 2031, a remote control unit 2032 that is an operation portion, a speaker portion 2033, and the like. The present invention is applied to the manufacturing of the display portion 2031. The television device shown in FIG. 21C is a wall-hanging type so does not require a large installation space.

Birefringence of liquid crystal changes depending on a temperature. Therefore, the polarization of light passing through the liquid crystal changes, and a light leakage condition from a polarizer on the viewing side changes. As a result, a change in the contrast ratio is generated depending on the temperature of the liquid crystal. It is desirable that a driving voltage be controlled so as to keep the contrast ratio constant. In order to control the driving voltage, an element for detecting the transmittance may be arranged and the driving voltage may be controlled based on the detection results. As the element for detecting the transmittance, a photosensor including an IC chip can be used. In the display device, an element for detecting the temperature may be arranged and the driving voltage may be controlled based on the detection results and the change in the contrast ratio with respect to the temperature of the liquid crystal element. As the element for detecting the temperature, a temperature sensor including an IC chip can be used. In this case, the element for detecting the transmittance and the element for detecting the temperature are preferably arranged so as to be hidden in the chassis of the display device.

For example, the element for detecting the temperature may be arranged near a liquid crystal display element in a display device of the present invention, which is mounted on the television devices shown in FIGS. 21A to 21C, and then, information about the change in temperature of the liquid crystal may be fed back to a circuit for controlling the driving voltage. Since the element for detecting the transmittance is preferably set in a position closer to the viewing side, the element may be arranged on a surface of the display screen to be covered with the chassis. Then, information about the change in the transmittance that is detected may be fed back to the circuit for controlling the driver voltage in a way similar to the information about the temperature.

The present invention can adjust the contrast ratio minutely by displacing absorption axes of stacked polarizers having different wavelength distributions of extinction coefficients. Therefore, the present invention can deal with a slight deviation of the contrast ratio with respect to the temperature of the liquid crystal, and an optimal contrast ratio can be made. Thus, polarizers are stacked so that the polarizers having different wavelength distributions of extinction coefficients are deviated from each other in advance so that an optimal contrast ratio can be made depending on the conditions (inside or outside of a room, climate, or the like) where the display device of the present invention is used, thereby a television device or an electronic device with high performance and high image quality display can be provided.

As a matter of course, the present invention is not limited to the television device. The present invention can be applied to various applications such as a monitor of a personal computer, particularly large-sized display media typified by an information display board at train stations, airports, or the like, and an advertising display board on the street.

Embodiment Mode 14

An electronic device of the present invention includes: a television device (also simply referred to as a TV or a television receiver), a camera such as a digital camera and a digital video camera, a mobile phone set (also simply referred to as a cellular phone set or a cellular phone), a portable information terminal such as a PDA, a portable game machine, a monitor for a computer, a computer, an audio reproducing device such as a car audio set, an image reproducing device provided with a recording medium such as a home-use game machine, and the like. Specific examples thereof will be explained with reference to FIGS. 22A to 22E.

Figure 22A:
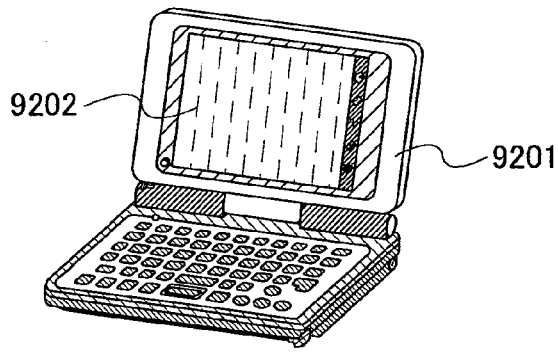
FIGS. 22A to 22E illustrate electronic devices of the present invention.

A portable information terminal shown in FIG. 22A includes a main body 9201, a display portion 9202, and the like. The display device of the present invention can be applied to the display portion 9202. Thus, a portable information terminal with a high contrast ratio can be provided.

Figure 22B:
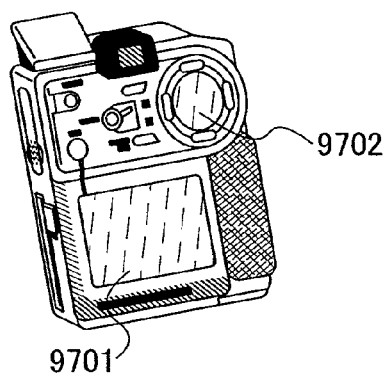

A digital video camera shown in FIG. 22B includes a display portion 9701, a display portion 9702, and the like. The display device of the present invention can be applied to the display portion 9701. Thus, a digital video camera with a high contrast ratio can be provided.

Figure 22C:
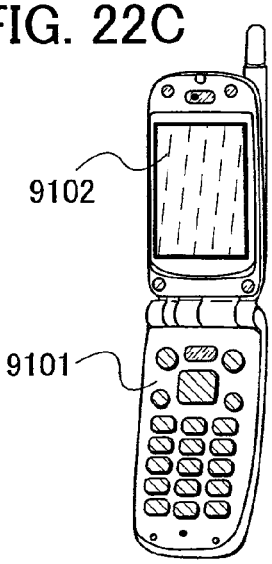

A cellular phone set shown in FIG. 22C includes a main body 9101, a display portion 9102, and the like. The display device of the present invention can be applied to the display portion 9102. Thus, a cellular phone set with a high contrast ratio can be provided.

Figure 22D:
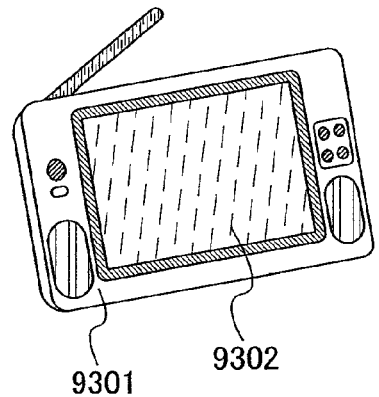

A portable television set shown in FIG. 22D includes a main body 9301, a display portion 9302, and the like. The display device of the invention can be applied to the display portion 9302. Thus, a portable television set with a high contrast ratio can be provided. The display device of the present invention can be applied to various types of television sets including a small-sized television mounted on a portable terminal such as a cellular phone set, a medium-sized television that is portable, and a large-sized television (for example, 40 inches in size or more).

Figure 22E:
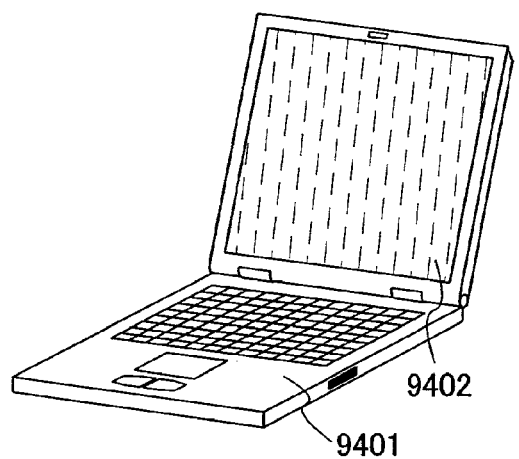

A portable computer shown in FIG. 22E includes a main body 9401, a display portion 9402, and the like. The display device of the present invention can be applied to the display portion 9402. Thus, a portable computer with a high contrast ratio can be provided.

By the display device of the present invention, an electronic device with a high contrast ratio can be provided.

Embodiment 1

In this embodiment, for a case of a transmission type liquid crystal display device of a TN mode, the result of optical calculation will be explained, in which polarizers each of which has a different wavelength distribution of extinction coefficient with respect to the absorption axis are stacked and the outermost polarizer on the viewing side deviates from a crossed Nicols state with respect to a polarizer on a backlight side. It is to be noted that the contrast ratio indicates the ratio of transmittance in white display (also referred to as white transmittance) to transmittance in black display (also referred to as black transmittance) (white transmittance/black transmittance). Transmittance in white display and transmittance in black display were each calculated, and then the contrast ratio was calculated.

As for the calculation in this embodiment, a liquid crystal optical calculation simulator LCD MASTER (made by Shintech Inc.) was used. Optical calculations of transmittance were conducted using the LCD MASTER. The optical calculations were conducted with a 2×2 matrix optical calculation algorithm where the wavelength range is from 380 nm to 780 nm, in which multiple interference between elements was not taken into account.

As shown in FIG. 31 and FIG. 32, optical arrangement of an optical calculation object has a structure in which a polarizer 1, a polarizer 2, a retardation film B2, a retardation film A2, a glass substrate, liquid crystal, a glass substrate, a retardation film A1, a retardation film B1, a polarizer 2, and a polarizer 1 are sequentially stacked from a backlight. The polarizer 1 and the polarizer 2 on the backlight side are polarizing plates having different wavelength distributions of extinction coefficients and each absorption axis thereof is at an angle of 135 degrees, so that two polarizers are in a parallel Nicols state. The polarizer 2 and the polarizer 1 on the viewing side are polarizing plates having different wavelength distributions of extinction coefficients, and the angle of the absorption axis of the polarizer 2 on the viewing side is 45 degrees so that the polarizer 2 is in a crossed Nicols state with the polarizer 1 on the backlight side. First, in order to calculate the angle of an absorption axis of the polarizer 1 on the viewing side at which the contrast ratio is the highest, calculation of the contrast ratio was performed when the angle of the absorption axis of the polarizer 1 on the viewing side was turned by 30 degrees to 50 degrees. Here, when a voltage that was applied to the liquid crystal was 0 V or 5 V, the contrast ratio indicates the ratio of transmittance of 0 V (white) to transmittance of 5 V (black) (transmittance at 0 V/transmittance at 5 V). It is to be noted that the calculation in this embodiment was performed to obtain contrast ratio of light extracted to the viewing side with respect to the luminance of the backlight.

Table 1 and Table 2 show property values of the polarizers 1 and 2 respectively. A thickness of each polarizer was 30 μm. Table 3 shows birefringence values of the liquid crystal and Table 4 shows other property values and orientation state of the liquid crystal 1. Table 5 shows physical property values and arrangement of the retardation film A1 and the retardation film A2. Table 6 shows physical property values and arrangement of the retardation film B1 and the retardation film B2. Each of the retardation films A1, A2, B1, and B2 is a retardation film having a negative uniaxial property.

TABLE 1

| wavelength (nm) | refraction index of transmission axis | refraction index of absorption axis direction | extinction coefficient of transmission axis direction | extinction coefficient of absorption axis direction |
|---|---|---|---|---|
| 380 | 1.5 | 1.5 | 0.00565 | 0.0092 |
| 390 | 1.5 | 1.5 | 0.002 | 0.0095 |
| 400 | 1.5 | 1.5 | 0.001 | 0.0093 |
| 410 | 1.5 | 1.5 | 0.0006 | 0.0095 |
| 420 | 1.5 | 1.5 | 0.0004 | 0.01 |
| 430 | 1.5 | 1.5 | 0.0003 | 0.011 |
| 440 | 1.5 | 1.5 | 0.00029 | 0.0113 |
| 450 | 1.5 | 1.5 | 0.00026 | 0.0115 |
| 460 | 1.5 | 1.5 | 0.00024 | 0.0117 |
| 470 | 1.5 | 1.5 | 0.00022 | 0.0118 |
| 480 | 1.5 | 1.5 | 0.00021 | 0.012 |
| 490 | 1.5 | 1.5 | 0.0002 | 0.0119 |
| 500 | 1.5 | 1.5 | 0.000196 | 0.0123 |
| 510 | 1.5 | 1.5 | 0.0002 | 0.01225 |
| 520 | 1.5 | 1.5 | 0.0002 | 0.0123 |
| 530 | 1.5 | 1.5 | 0.0002 | 0.01225 |
| 540 | 1.5 | 1.5 | 0.0002 | 0.0123 |
| 550 | 1.5 | 1.5 | 0.0002 | 0.012 |
| 560 | 1.5 | 1.5 | 0.0002 | 0.0116 |
| 570 | 1.5 | 1.5 | 0.0002 | 0.0113 |
| 580 | 1.5 | 1.5 | 0.0002 | 0.0112 |
| 590 | 1.5 | 1.5 | 0.0002 | 0.0112 |
| 600 | 1.5 | 1.5 | 0.0002 | 0.012 |
| 610 | 1.5 | 1.5 | 0.0002 | 0.0115 |
| 620 | 1.5 | 1.5 | 0.0002 | 0.011 |
| 630 | 1.5 | 1.5 | 0.0002 | 0.0106 |
| 640 | 1.5 | 1.5 | 0.0002 | 0.0103 |
| 650 | 1.5 | 1.5 | 0.0002 | 0.0102 |
| 660 | 1.5 | 1.5 | 0.0002 | 0.0101 |
| 670 | 1.5 | 1.5 | 0.0002 | 0.01005 |
| 680 | 1.5 | 1.5 | 0.0002 | 0.01002 |
| 690 | 1.5 | 1.5 | 0.00018 | 0.01 |
| 700 | 1.5 | 1.5 | 0.00018 | 0.0099 |
| 710 | 1.5 | 1.5 | 0.00018 | 0.0091 |
| 720 | 1.5 | 1.5 | 0.00018 | 0.008 |
| 730 | 1.5 | 1.5 | 0.00018 | 0.0065 |
| 740 | 1.5 | 1.5 | 0.00018 | 0.0057 |
| 750 | 1.5 | 1.5 | 0.00016 | 0.005 |
| 760 | 1.5 | 1.5 | 0.00015 | 0.0042 |
| 770 | 1.5 | 1.5 | 0.00014 | 0.0035 |
| 780 | 1.5 | 1.5 | 0.00012 | 0.003 |

TABLE 2

| wavelength (nm) | refraction index of transmission axis | refraction index of absorption axis direction | extinction coefficient of transmission axis direction | extinction coefficient of absorption axis direction |
|---|---|---|---|---|
| 380 | 1.5 | 1.5 | 0.00565 | 0.008 |
| 390 | 1.5 | 1.5 | 0.002 | 0.0082 |
| 400 | 1.5 | 1.5 | 0.001 | 0.0079 |
| 410 | 1.5 | 1.5 | 0.0006 | 0.0079 |
| 420 | 1.5 | 1.5 | 0.0004 | 0.0077 |
| 430 | 1.5 | 1.5 | 0.0003 | 0.0079 |
| 440 | 1.5 | 1.5 | 0.00029 | 0.008 |
| 450 | 1.5 | 1.5 | 0.00026 | 0.0085 |
| 460 | 1.5 | 1.5 | 0.00024 | 0.0086 |
| 470 | 1.5 | 1.5 | 0.00022 | 0.0087 |
| 480 | 1.5 | 1.5 | 0.00021 | 0.0096 |
| 490 | 1.5 | 1.5 | 0.0002 | 0.0095 |

TABLE 2-continued

| wavelength (nm) | refraction index of transmission axis | refraction index of absorption axis direction | extinction coefficient of transmission axis direction | extinction coefficient of absorption axis direction |
|---|---|---|---|---|
| 500 | 1.5 | 1.5 | 0.000196 | 0.0095 |
| 510 | 1.5 | 1.5 | 0.0002 | 0.01 |
| 520 | 1.5 | 1.5 | 0.0002 | 0.0106 |
| 530 | 1.5 | 1.5 | 0.0002 | 0.011 |
| 540 | 1.5 | 1.5 | 0.0002 | 0.01105 |
| 550 | 1.5 | 1.5 | 0.0002 | 0.0115 |
| 560 | 1.5 | 1.5 | 0.0002 | 0.0126 |
| 570 | 1.5 | 1.5 | 0.0002 | 0.0136 |
| 580 | 1.5 | 1.5 | 0.0002 | 0.014 |
| 590 | 1.5 | 1.5 | 0.0002 | 0.0146 |
| 600 | 1.5 | 1.5 | 0.0002 | 0.0147 |
| 610 | 1.5 | 1.5 | 0.0002 | 0.0148 |
| 620 | 1.5 | 1.5 | 0.0002 | 0.0148 |
| 630 | 1.5 | 1.5 | 0.0002 | 0.0147 |
| 640 | 1.5 | 1.5 | 0.0002 | 0.0148 |
| 650 | 1.5 | 1.5 | 0.0002 | 0.0146 |
| 660 | 1.5 | 1.5 | 0.0002 | 0.0143 |
| 670 | 1.5 | 1.5 | 0.0002 | 0.014 |
| 680 | 1.5 | 1.5 | 0.0002 | 0.0135 |
| 690 | 1.5 | 1.5 | 0.00018 | 0.0125 |
| 700 | 1.5 | 1.5 | 0.00018 | 0.0124 |
| 710 | 1.5 | 1.5 | 0.00018 | 0.012 |
| 720 | 1.5 | 1.5 | 0.00018 | 0.011 |
| 730 | 1.5 | 1.5 | 0.00018 | 0.0105 |
| 740 | 1.5 | 1.5 | 0.00018 | 0.0102 |
| 750 | 1.5 | 1.5 | 0.00016 | 0.01 |
| 760 | 1.5 | 1.5 | 0.00015 | 0.0096 |
| 770 | 1.5 | 1.5 | 0.00014 | 0.0092 |
| 780 | 1.5 | 1.5 | 0.00012 | 0.009 |

TABLE 3

| wavelength (nm) | birefringence $\Delta n$ |
|---|---|
| 380 | 0.1095635 |
| 390 | 0.107924 |
| 400 | 0.1064565 |
| 410 | 0.105138 |
| 420 | 0.1039495 |
| 430 | 0.102876 |
| 440 | 0.1019025 |
| 450 | 0.1010175 |
| 460 | 0.100212 |
| 470 | 0.0994755 |
| 480 | 0.098801 |
| 490 | 0.0981815 |
| 500 | 0.0976125 |
| 510 | 0.0970875 |
| 520 | 0.0966025 |
| 530 | 0.0961545 |
| 540 | 0.095739 |
| 550 | 0.0953525 |
| 560 | 0.094994 |
| 570 | 0.094659 |
| 580 | 0.094347 |
| 590 | 0.094055 |
| 600 | 0.0937825 |
| 610 | 0.0935265 |
| 620 | 0.093286 |
| 630 | 0.0930605 |
| 640 | 0.0928485 |
| 650 | 0.092649 |
| 660 | 0.0924605 |
| 670 | 0.092282 |
| 680 | 0.092114 |
| 690 | 0.091955 |
| 700 | 0.0918045 |
| 710 | 0.091661 |
| 720 | 0.0915255 |
| 730 | 0.0913975 |
| 740 | 0.091275 |
| 750 | 0.0911585 |
| 760 | 0.0910475 |
| 770 | 0.0909425 |
| 780 | 0.0908415 |

TABLE 4

| | |
|---|---|
| anisotropy of dielectric constant Δe | 5.0 |
| elastic constant K11 | 12 pN |
| elastic constant K22 | 6 pN |
| elastic constant K33 | 17 pN |
| rubbing direction of backlight side | 315 degrees direction |
| rubbing direction of viewing side | 45 degrees direction |
| pretilt angle of backlight side | 5 degrees |
| pretilt angle of viewing side | 5 degrees |
| chiral reagent | none |
| thickness of cell | 4 mm |

TABLE 5

| | |
|---|---|
| $\Delta n_{xy} \times d$ | 0 nm in all wavelength region |
| $\Delta n_{xz} \times d$ | 92.4 nm in all wavelength region |
| arrangement of retardation film A2 of backlight side | z axis with 45 degree tilt towered direction opposite to pretilt of liquid crystal on backlight side |
| arrangement of retardation film A1 of viewing side | z axis with 45 degree tilt towered direction opposite to pretilt of liquid crystal on viewing side |

TABLE 6

| | |
|---|---|
| $\Delta n_{xy} \times d$ | 0 nm in all wavelength region |
| $\Delta n_{xz} \times d$ | 73.92 nm in all wavelength region |
| arrangement of retardation film B2 of backlight side | z axis direction arranged vertically with respect to grass substrate |
| arrangement of retardation film B1 of viewing side | z axis direction arranged vertically with respect to grass substrate |

Figure 33:
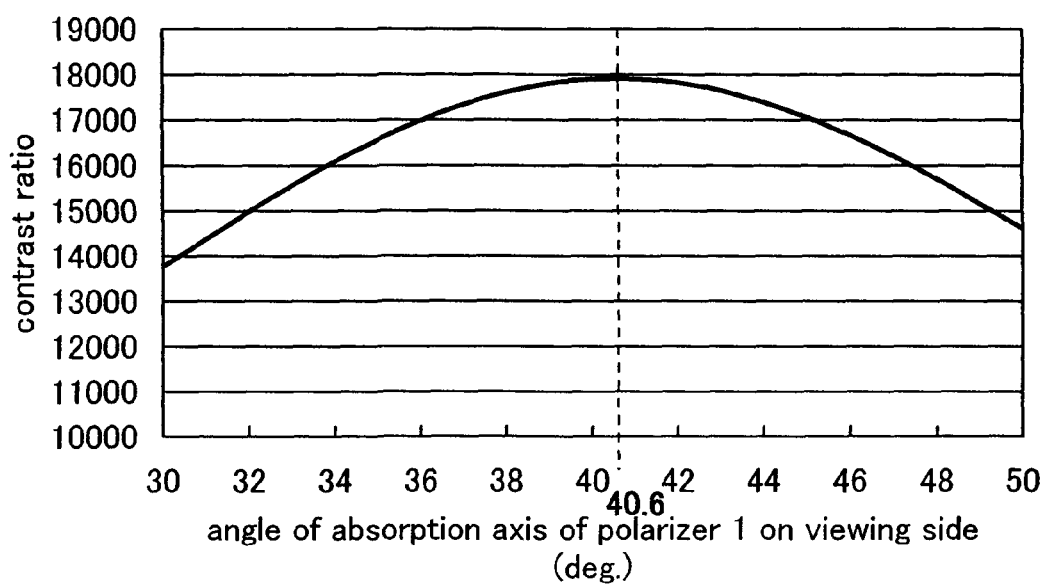
FIG. 33 is a graph showing an experimental result of Embodiment 1.

FIG. 33 shows results of the contrast ratio of the polarizer 1 on the viewing side when turned with a wavelength of 550 nm.

From FIG. 33, it is found that, when the angle of the absorption axis of the polarizer 1 on the viewing side is 40.6 degrees, the highest contrast ratio is obtained and the angle of the absorption axis deviates from the 45 degrees of a crossed Nicols state with the polarizer on the backlight side by 4.4 degrees.

Figure 35:
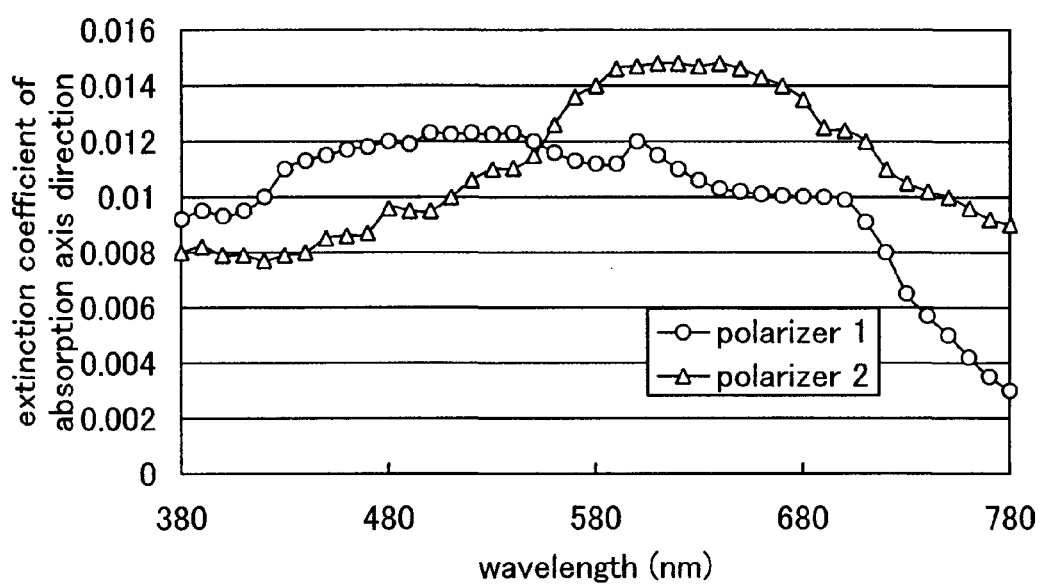
FIG. 35 is a graph showing an experimental result of Embodiment 1.

Next wavelength dependency of the contrast ratio was calculated. Structure A of FIG. 34(a) is a structure in which the absorption axis of the polarizer 1 on the viewing side in the structure of FIG. 32 is arranged at an angle of 40.6 degrees. Structure B of FIG. 34(b) is a structure in which the absorption axis of the polarizer 1 on the viewing side in the structure A forms an angle of 45 degrees with the polarizer on the backlight side in a crossed Nicols state. Structure C of FIG. 34(c) is a structure in which each polarizer used is the polarizer 1 and the outermost polarizer 1 on the viewing side is arranged at an angle of 40.6 degrees. FIG. 35 shows the wavelength distribution of the extinction coefficients of the polarizer 1 and the polarizer 2. It is shown that the extinction coefficient of the polarizer 1 is large in a shorter wavelength range and the extinction coefficient of the polarizer 2 is small in a larger wavelength range. Note that the property values of the polarizers 1 and 2; the property values of the liquid crystal, the retardation plates A1, A2, B1, and B2; and arrangement thereof are the same as in Table 1, Table 2, Table 3, Table 4, Table 5, and Table 6.

Figure 36:
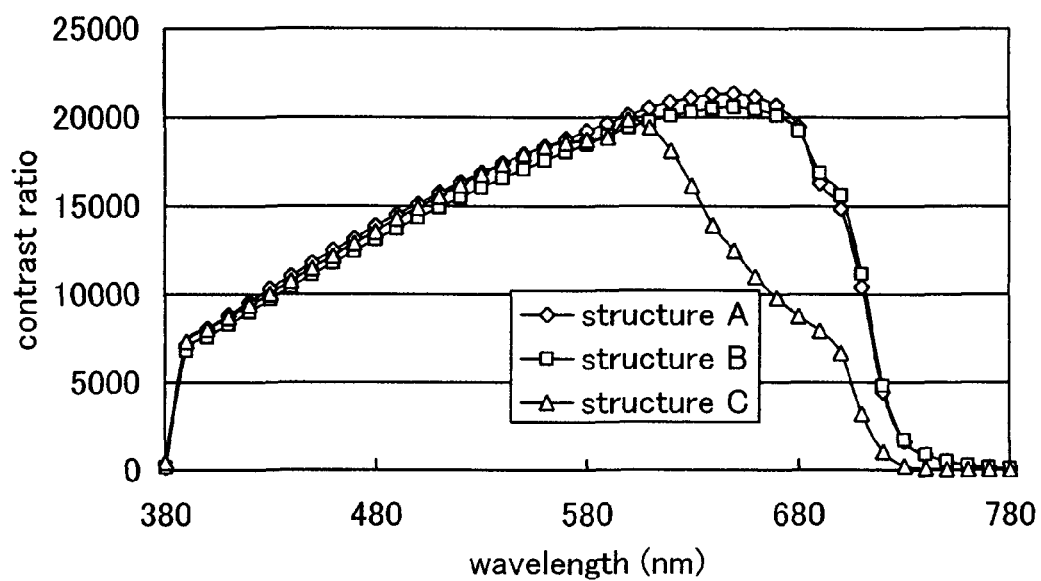
FIG. 36 is a graph showing an experimental result of Embodiment 1.
Figure 37:
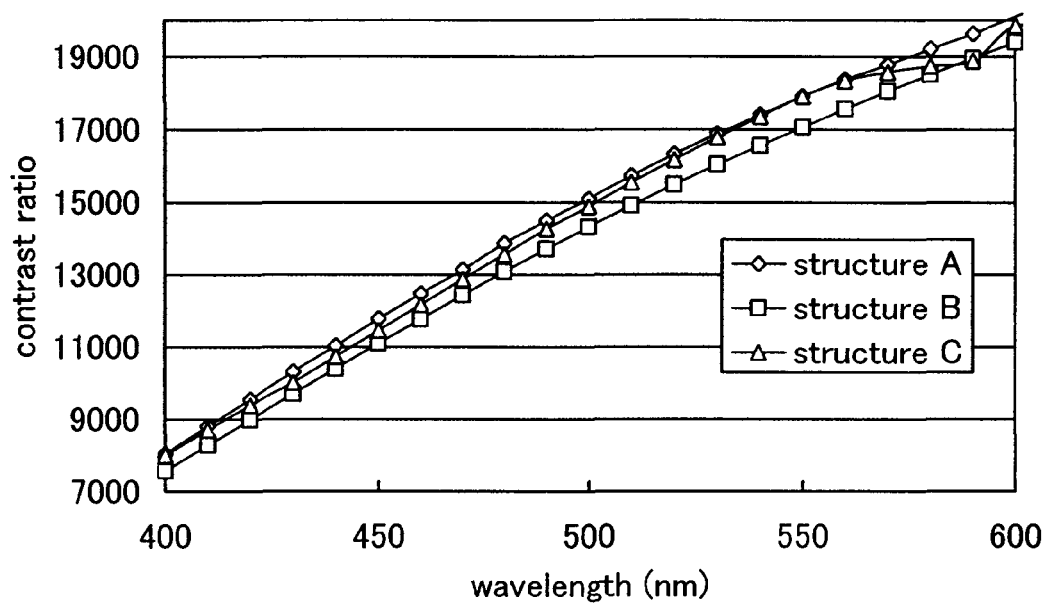
FIG. 37 is a graph showing an experimental result of Embodiment 1.

The results of the contrast ratios of the 0 V transmittance and 5 V transmittance on the viewing side in the structures A, B, and C are shown in FIG. 36, and the magnified view in the case of the wavelengths from 400 nm to 600 nm is shown in FIG. 37. When the structure A and the structure B are compared, the structure A in which the polarizing plates are stacked so as to deviate at a wavelength other than a longer wavelength range of 690 nm or more results in a higher contrast. Thus, it is found that the contrast can be increased by stacking polarizing plates so that the polarizing plates are deviated.

Further, when the structure A and the structure C are compared, in which polarizing plates are deviated and stacked, the structure A in which polarizers having different wavelength distributions of extinction coefficients from each other with respect to the absorption axes results in a higher contrast in a long wavelength region. This increases the contrast ratio because the extinction coefficient of the polarizer 1 is smaller than that of the polarizer 2 in a long wavelength region, and the structure A in which the polarizers 2 having a larger extinction coefficient in a long wavelength region are stacked results in lower transmittance when displaying black (5 V) in a long wavelength region as in FIG. 35.

From the above result, polarizers, each of which has different wavelength distributions of extinction coefficients with respect to the absorption axis, are stacked, and the polarizer on the viewing side deviates from a crossed Nicols state with respect to the polarizer on the backlight side, thereby the high contrast ratio can be obtained.

This application is based on Japanese Patent Application serial No. 2006-023853 filed in Japan Patent Office on Jan. 31 in 2006, the entire contents of which are hereby incorporated by reference.

What is claimed is:

1. A display device comprising:
a first light-transmitting substrate and a second light-transmitting substrate which are disposed to face each other;
a display element sandwiched between the first light-transmitting substrate and the second light-transmitting substrate; and
a layer including stacked polarizers on an outer side of the first light-transmitting substrate or the second light-transmitting substrate,
wherein:
the stacked polarizers are arranged so that their absorption axes are deviated from a parallel Nicols state,
a distribution of a degree to which a first one of the stacked polarizers absorbs light across a band of wavelengths differs from a distribution of a degree to which a second one of the stacked polarizers absorbs light across the band of wavelengths, and
the stacked polarizers are provided between a pair of protective layers arranged such that no protective layer is located between the stacked polarizers.

2. A display device according to claim 1, wherein the display element is a liquid crystal element.

3. A display device comprising:
a first light-transmitting substrate and a second light-transmitting substrate which are disposed to face each other;
a display element sandwiched between the first light-transmitting substrate and the second light-transmitting substrate; and
a layer including stacked polarizers on an outer side of the first light-transmitting substrate or the second light-transmitting substrate; and
a retardation plate provided between the layer including the stacked polarizers and the first light-transmitting substrate or the second light-transmitting substrate,
wherein:
the stacked polarizers are arranged so that their absorption axes are deviated from a parallel Nicols states
a distribution of a degree to which a first one of the stacked polarizers absorbs light across a band of wavelengths differs from a distribution of a degree to which a second one of the stacked polarizers absorbs light across the band of wavelengths, and
the stacked polarizers are provided between a pair of protective layers arranged such that no protective layer is located between the stacked polarizers.

4. A display device according to claim 3, wherein the display element is a liquid crystal element.

5. A display device comprising:
a first light-transmitting substrate and a second light-transmitting substrate which are disposed to face each other;
a display element sandwiched between the first light-transmitting substrate and the second light-transmitting substrate;
a first layer including first stacked polarizers on an outer side of the first light-transmitting substrate;
a second layer including second stacked polarizers on an outer side of the second light-transmitting substrate,
wherein:
the first stacked polarizers are arranged so that their absorption axes are deviated from a parallel Nicols state, the second stacked polarizers are arranged so that their absorption axes are in a parallel Nicols state, a distribution of a degree to which a first one of the first stacked polarizers absorbs light across a first band of wavelengths differs from a distribution of a degree to which a second one of the first stacked polarizers absorbs light across the first band of wavelengths, a distribution of a degree to which a first one of the second stacked polarizers absorbs light across a second band of wavelengths differs from a distribution of a degree to which a second one of the second stacked polarizers absorbs light across the second band of wavelengths, and the first stacked polarizers are provided between a first pair of protective layers arranged such that no protective layer is located between the first stacked polarizers, and the second stacked polarizers are provided between a second pair of protective layers.

6. A display device according to claim 5, wherein the display element is a liquid crystal element.

7. A display device according to claim 5, wherein the display device further comprises a light source on an outer side of the second stacked polarizers.

8. A display device comprising:
a first light-transmitting substrate and a second light-transmitting substrate which are disposed to face each other;
a display element sandwiched between the first light-transmitting substrate and the second light-transmitting substrate;
a first layer including first stacked polarizers on an outer side of the first light-transmitting substrate;
a second layer including second stacked polarizers on an outer side of the second light-transmitting substrate;
a first retardation plate between the first layer including the first stacked polarizers and the first light-transmitting substrate;
a second retardation plate between the second layer including the second stacked polarizers and the second light-transmitting substrate,
wherein:
the first stacked polarizers are arranged so that their absorption axes are deviated from a parallel Nicols state,
the second stacked polarizers are arranged so that their absorption axes are in a parallel Nicols state,
a distribution of a degree to which a first one of the first stacked polarizers absorbs light across a first band of wavelengths differs from a distribution of a degree to which a second one of the first stacked polarizers absorbs light across the first band of wavelengths,
a distribution of a degree to which a first one of the second stacked polarizers absorbs light across a second band of wavelengths differs from a distribution of a degree to which a second one of the second stacked polarizers absorbs light across the second band of wavelengths, and
the first stacked polarizers are provided between a first pair of protective layers arranged such that no protective layer is located between the first stacked polarizers, and the second stacked polarizers are provided between a second pair of protective layers.

9. A display device according to claim 8, wherein the display element is a liquid crystal element.

10. A display device according to claim 8, wherein the display device further comprises a light source on an outer side of the second stacked polarizers.

11. A display device comprising:
a first light-transmitting substrate and a second light-transmitting substrate which are disposed to face each other;
a display element sandwiched between the first light-transmitting substrate and the second light-transmitting substrate;
a first layer including first stacked polarizers on an outer side of the first light-transmitting substrate; and
a second layer including second stacked polarizers on an outer side of the second light-transmitting substrate,
wherein:
the first stacked polarizers are arranged so that their absorption axes are deviated from a parallel Nicols state,
the second stacked polarizers are arranged so that their absorption axes are in a parallel Nicols state,
the first layer including the first stacked polarizers has a first polarizer and a second polarizer which are sequentially stacked from the first light-transmitting substrate side,
the first stacked polarizers and the second stacked polarizers are arranged so that their absorption axes are in a crossed Nicols state
a distribution of a degree to which a first one of the first stacked polarizers absorbs light across a first band of wavelengths differs from a distribution of a degree to which a second one of the first stacked polarizers absorbs light across the first band of wavelengths,
a distribution of a degree to which a first one of the second stacked polarizers absorbs light across a second band of wavelengths differs from a distribution of a degree to which a second one of the second stacked polarizers absorbs light across the second band of wavelengths, and
the first stacked polarizers are provided between a first pair of protective layers arranged such that no protective layer is located between the first stacked polarizers, and the second stacked polarizers are provided between a second pair of protective layers.

12. A display device according to claim 11, wherein the display element is a liquid crystal element.

13. A display device according to claim 11, wherein the display device further comprises a light source on an outer side of the second stacked polarizers.

14. A display device comprising:
a first light-transmitting substrate and a second light-transmitting substrate which are disposed to face each other;
a display element sandwiched between the first light-transmitting substrate and the second light-transmitting substrate;
a first layer including first stacked polarizers on an outer side of the first light-transmitting substrate;
a second layer including second stacked polarizers on an outer side of the second light-transmitting substrate;
a first retardation plate between the first light-transmitting substrate and the first layer including the first stacked polarizers;
a second retardation plate between the second light-transmitting substrate and the second layer including the second stacked polarizers,
wherein:
the first stacked polarizers are arranged so that their absorption axes are deviated from a parallel Nicols state,
the second stacked polarizers are arranged so that their absorption axes are in a parallel Nicols state, the first layer including the first stacked polarizers has a first polarizer and a second polarizer which are sequentially stacked from the first light-transmitting substrate side, the first stacked polarizers and the second stacked polarizers are arranged so that their absorption axes are in a crossed Nicols states a distribution of a degree to which a first one of the first stacked polarizers absorbs light across a first band of wavelengths differs from a distribution of a degree to which a second one of the first stacked polarizers absorbs light across the first band of wavelengths, a distribution of a degree to which a first one of the second stacked polarizers absorbs light across a second band of wavelengths differs from a distribution of a degree to which a second one of the second stacked polarizers absorbs light across the second band of wavelengths, and the first stacked polarizers are provided between a first pair of protective layers arranged such that no protective layer is located between the first stacked polarizers, and the second stacked polarizers are provided between a second pair of protective layers.

15. A display device according to claim 14, wherein the display element is a liquid crystal element.

16. A display device according to claim 14, wherein the display device further comprises a light source on an outer side of the second stacked polarizers.

* * * * *

UNITED STATES PATENT AND TRADEMARK OFFICE
CERTIFICATE OF CORRECTION

PATENT NO. : 7,738,055 B2
APPLICATION NO. : 11/626115
DATED : June 15, 2010
INVENTOR(S) : Yuji Egi et al.

It is certified that error appears in the above-identified patent and that said Letters Patent is hereby corrected as shown below:

Column 32, line 8, replace "in-cell" with --π-cell--;

Column 32, lines 11-12, delete "this bent orientation becomes a white display";

Column 32, line 16, replace "realized" with --achieved--;

Column 40, line 46, in Table 4 replace "Δe" with --Δε--.

Signed and Sealed this

Fifth Day of October, 2010

David J. Kappos
*Director of the United States Patent and Trademark Office*